US009406166B2

(12) United States Patent
Futterer

(10) Patent No.: US 9,406,166 B2
(45) Date of Patent: Aug. 2, 2016

(54) DISPLAY DEVICE, IN PARTICULAR A HEAD-MOUNTED DISPLAY, BASED ON TEMPORAL AND SPATIAL MULTIPLEXING OF HOLOGRAM TILES

(75) Inventor: Gerald Futterer, Dresden (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 456 days.

(21) Appl. No.: 13/884,043

(22) PCT Filed: Nov. 4, 2011

(86) PCT No.: PCT/EP2011/069485
§ 371 (c)(1),
(2), (4) Date: May 8, 2013

(87) PCT Pub. No.: WO2012/062681
PCT Pub. Date: May 18, 2012

(65) Prior Publication Data
US 2013/0222384 A1    Aug. 29, 2013

(30) Foreign Application Priority Data

Nov. 8, 2010   (DE) .......................... 10 2010 043 557
Jun. 23, 2011  (DE) .......................... 10 2011 078 027
Sep. 16, 2011  (DE) .......................... 10 2011 053 710

(51) Int. Cl.
*G02B 27/14*    (2006.01)
*G06T 15/50*    (2011.01)
(Continued)

(52) U.S. Cl.
CPC . *G06T 15/50* (2013.01); *G02B 5/32* (2013.01); *G02B 27/0172* (2013.01);
(Continued)

(58) Field of Classification Search
CPC ......... G03H 1/0005; G03H 1/08; G03H 1/22; G03H 1/0244; G03H 1/04; G03H 1/30; G03H 2001/0033; G03H 2001/0066; G03H 2001/2263; G03H 2001/2271; G03H 2226/11; G03H 2210/562; G02B 2027/0178; G02B 27/0081
USPC ........................................ 359/1–35, 630–633
See application file for complete search history.

(56) References Cited

U.S. PATENT DOCUMENTS

| 5,521,724 | A  |   | 5/1996 | Shires |       |
| 6,760,135 | B1 | * | 7/2004 | Payne et al. ..................... 359/15 |

(Continued)

FOREIGN PATENT DOCUMENTS

| GB | 2350963 A | 12/2000 |
| GB | 2379347 A | 3/2003 |

(Continued)

OTHER PUBLICATIONS

International Search Report, dated Apr. 11, 2012, and Written Opinion, issued in priority International Application No. PCT/EP2011/069485.

(Continued)

*Primary Examiner* — Mahidere Sahle
(74) *Attorney, Agent, or Firm* — Saul Ewing LLP

(57) ABSTRACT

The invention relates to a display device, in particular a head-mounted display or hocular, having a spatial light modulator and a controllable light-deflecting device for generating a multiple image of the spatial light modulator, which consists of segments, the multiple image being produced at least with a predefinable number of segments which determines the size of a visible area within which a 3D-scene holographically encoded in the spatial light modulator can be reconstructed for observation by an eye of an observer.

25 Claims, 26 Drawing Sheets

(51) Int. Cl.
  *G02B 5/32* (2006.01)
  *G02B 27/01* (2006.01)
  *G02B 27/22* (2006.01)
  *G03H 1/26* (2006.01)
  *H04N 13/04* (2006.01)
  *G02F 1/29* (2006.01)
  *G03H 1/22* (2006.01)
  *G03H 1/04* (2006.01)

(52) U.S. Cl.
  CPC ......... *G02B 27/2214* (2013.01); *G03H 1/2294* (2013.01); *G03H 1/26* (2013.01); *H04N 13/044* (2013.01); *G02F 1/29* (2013.01); *G03H 1/2205* (2013.01); *G03H 2001/0491* (2013.01); *G03H 2001/2236* (2013.01); *G03H 2001/2284* (2013.01); *G03H 2001/2292* (2013.01); *G03H 2001/2297* (2013.01); *G03H 2001/2655* (2013.01); *G03H 2223/19* (2013.01); *G03H 2223/21* (2013.01); *G03H 2225/11* (2013.01); *G03H 2225/25* (2013.01); *G03H 2225/33* (2013.01); *G03H 2225/55* (2013.01); *G03H 2225/60* (2013.01); *G03H 2226/05* (2013.01)

(56) References Cited

U.S. PATENT DOCUMENTS

| | | | |
|---|---|---|---|
| 8,149,266 | B2 | 4/2012 | Haussler et al. |
| 2001/0013961 | A1* | 8/2001 | Klug et al. ............... 359/32 |
| 2007/0035809 | A1 | 2/2007 | Maram et al. |
| 2009/0040294 | A1 | 2/2009 | Smalley et al. |
| 2009/0180194 | A1 | 7/2009 | Yamaguchi et al. |
| 2010/0097671 | A1 | 4/2010 | Leister |
| 2010/0165430 | A1* | 7/2010 | Buschbeck ............... 359/9 |

FOREIGN PATENT DOCUMENTS

| | | |
|---|---|---|
| WO | 00/28369 | 5/2000 |
| WO | 2008/015283 A1 | 2/2008 |
| WO | 2008071588 A1 | 6/2008 |

OTHER PUBLICATIONS

Cakmakci et al., J. of display Technology, IEEE Service Center, pp. 199-216 (Sep. 1, 2006).
Ando et al., Mem. Fac. Eng., vol. 40, pp. 1-6 (Jan. 1, 1999).
Kurtz, Proc. of SPIE, vol. 58, pp. 130-137 (Jan. 1, 2005).
Hoppe et al., Proc. of SPIE, vol. 3779, pp. 146-153 (Jul. 10, 1999).

* cited by examiner

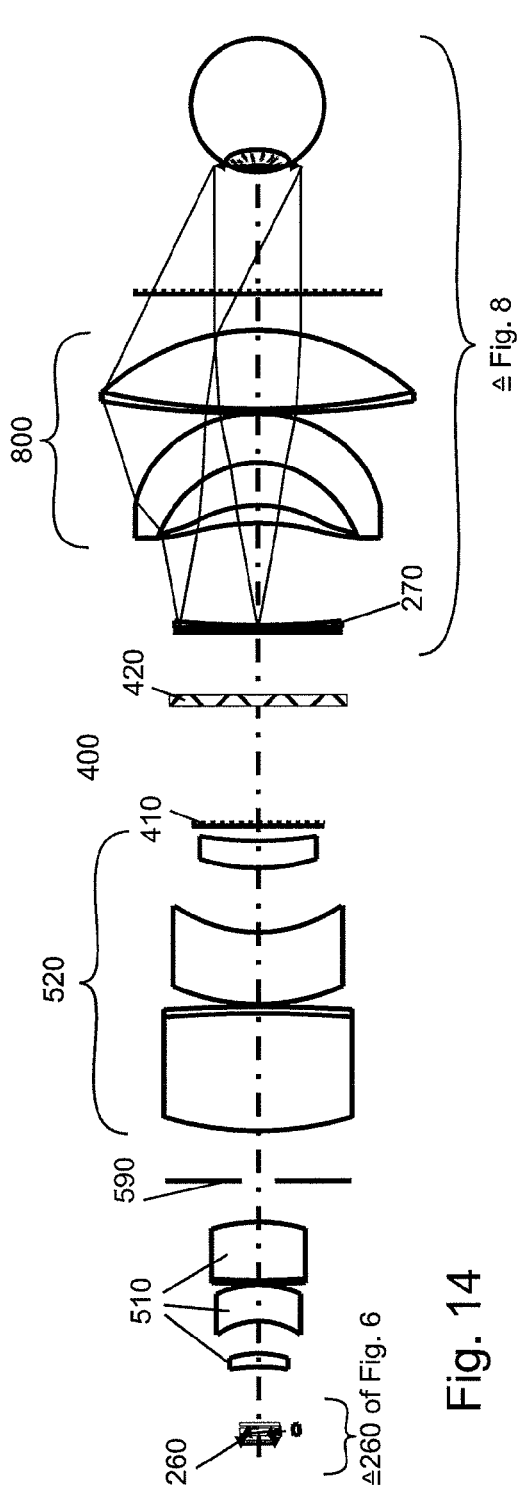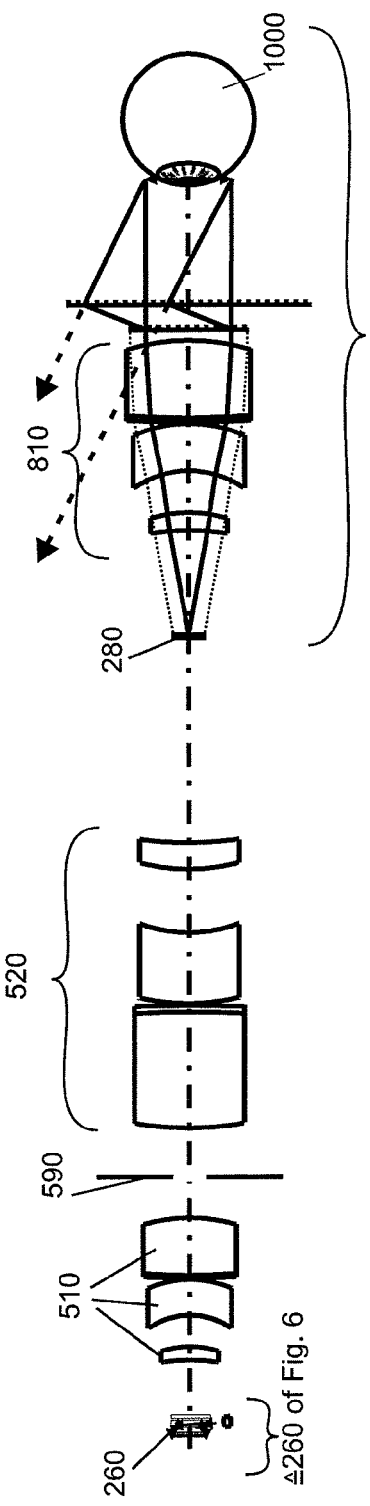

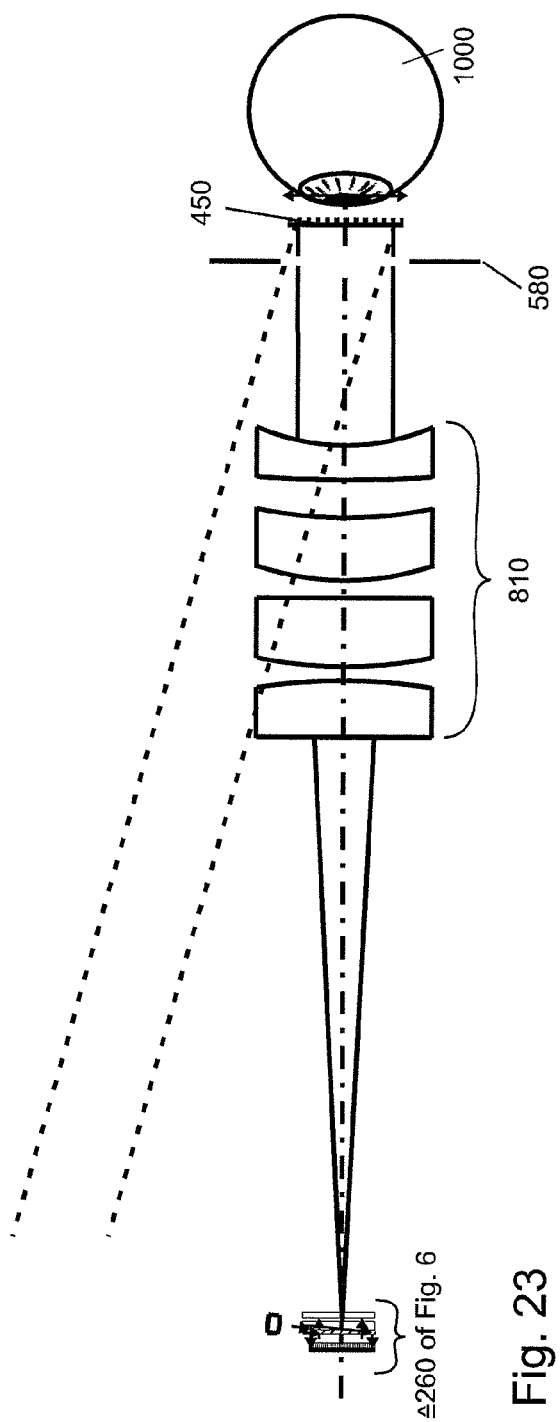
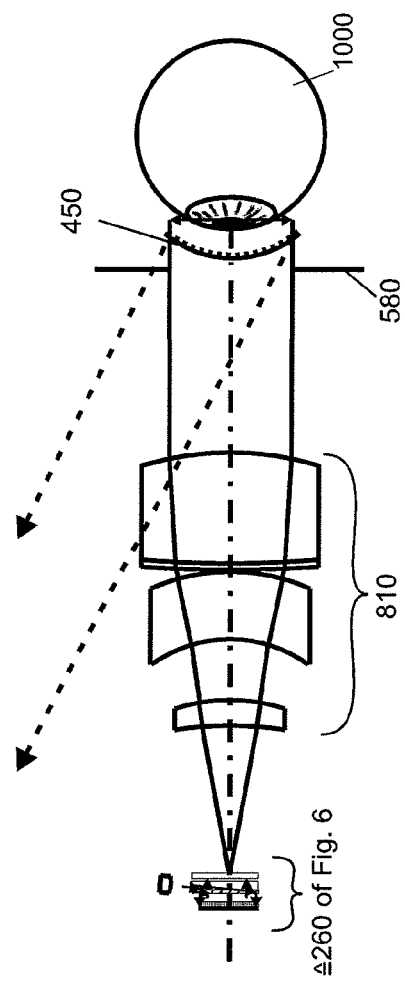
Fig. 23
Fig. 24

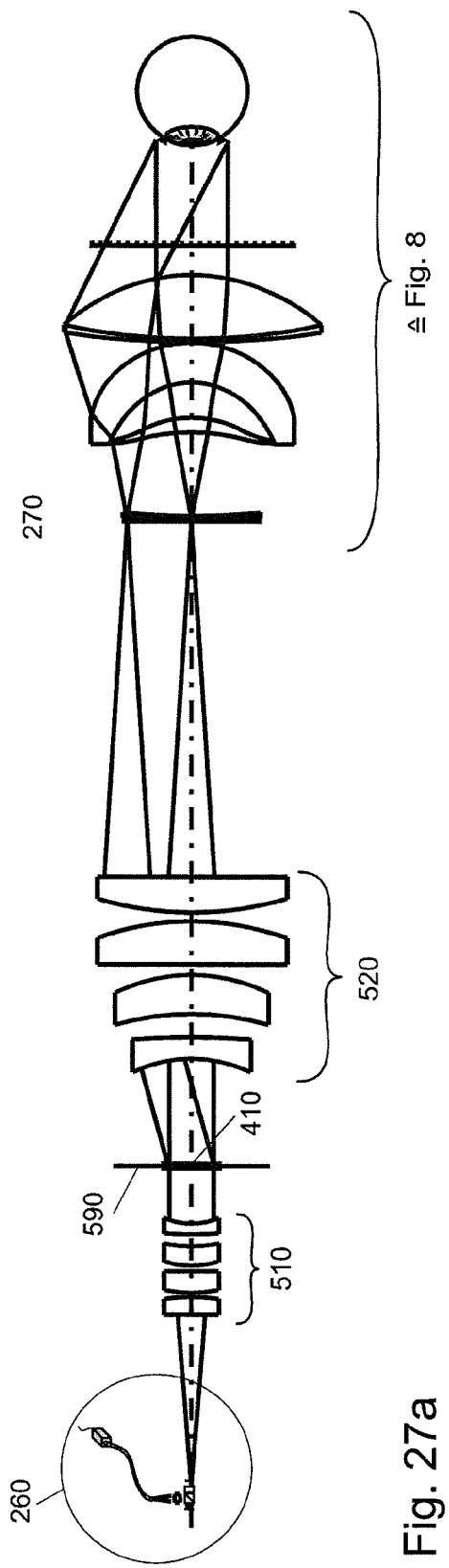
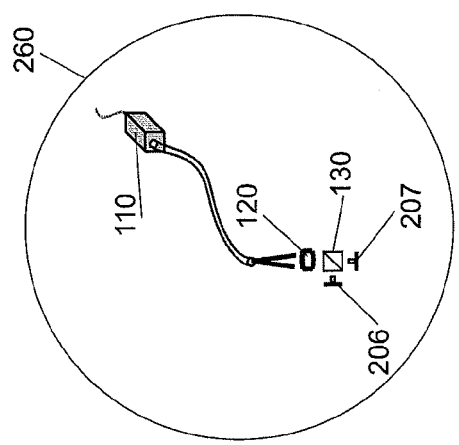
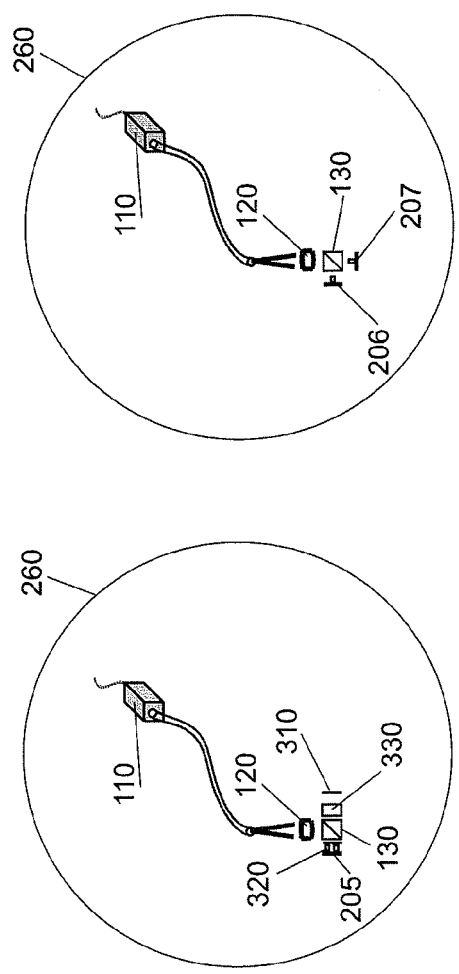
Fig. 27a
Fig. 27b
Fig. 27c

US 9,406,166 B2

DISPLAY DEVICE, IN PARTICULAR A HEAD-MOUNTED DISPLAY, BASED ON TEMPORAL AND SPATIAL MULTIPLEXING OF HOLOGRAM TILES

CROSS REFERENCE TO RELATED APPLICATIONS

This application claims the priority of PCT/EP2011/069485, filed on Nov. 4, 2011, which claims priority to German Application No. 10 2010 043 557.0, filed Nov. 8, 2010; German Application No. 10 2011 078 027.0, filed Jun. 23, 2011, and German Application No. 10 2011 053 710.4, filed Sep. 16, 2011, the entire contents of all of which are hereby incorporated in total by reference.

BACKGROUND OF THE INVENTION

The present invention relates to a display device which generates a holographic reconstruction in a relatively large reconstruction space (volume of view) with the help of a multiple compound image of a spatial light modulator (SLM).

Generally, visual display devices serve for users to watch, for example, two-dimensional video information, computer-generated stereo images or holographically generated information of a three-dimensional scene.

In addition to display devices where a generated image or a reconstructed 3D scene can be viewed directly, i.e. without optical magnification, as a real image, there are a number of display devices known in the art where a virtually generated image is viewed. Such display devices are also known as virtual image displays (VID).

Displays with virtual image generation are often used in display devices which are located close to the eyes, so-called near-to-eye displays. Such display devices are known for example as head-mounted displays (HMD) or helmet-mounted displays (HMD). They are also often referred to as data glasses'.

Head-mounted displays (HMD) are display devices which are put on by the users like glasses or which are worn on their head similar to a helmet. They can be made to serve one (monocular HMD) or both eyes of an observer (binocular HMD).

The invention shall not be limited to head-mounted displays. It also relates to any stationary or portable display device where the observer views the magnified representation of at least one display panel, or the magnified representation of a three-dimensional scene as reconstructed by a display device, through magnifying lenses which are situated near the eye (ocular). Such a holographic display device resembling an electronic 'raree show' shall be referred to as 'hocular' below. In contrast to an HMD, devices of this kind do not make such great demands on size and weight. They can preferably be used wherever 3D data sets with great spatial depth shall be viewed over long periods without causing fatigue. This is for example the case in medical equipment where three-dimensional computed tomography, magnetic resonance tomography, confocal microscopy or ultrasonic image data are watched.

The invention can further be applied to display devices which are situated in the observer's line of sight as front-view displays and which also generate a magnified virtual or real image (head-up displays).

Moreover, the invention can be applied to display devices which generate a magnified real image.

If not otherwise mentioned explicitly, the following explanations shall generally apply to display devices with generation of virtual images, such as head-mounted displays or hocular displays. To keep things simple, the term HMD will be used solely hereinafter, but devices with magnified real image generation shall not be excluded.

In an HMD, the observer can be shielded completely from the real environment, so that they only perceive the displayed information in the form of so-called virtual reality (VR). In other devices, the real environment is superimposed with the displayed information, for example through semi-transmissive mirrors, so that an augmented reality (AR) is created.

In a hocular device, the real environment can for example include a microscopic image of a real object, said image being generated through an additional optical path of the microscope. Some devices allow the degree of superimposition to be affected by controllable means. Fully shielded devices can also have at least one camera which is located near the eyes. Superimposing the camera image with the information to be displayed can also enable AR applications.

Various types of head-mounted displays, including glasses-type and helmet-type, have been disclosed in a number of documents.

A HMD device for the stereoscopic representation of 3D scenes is known, for example, from document US 2009/0180194 A1.

A display device in the form of an HMD for the holographic reconstruction of three-dimensional scenes is known for example from document WO 2008/071588 A1 filed by the applicant. In such an HMD, a 3D scene can only be reconstructed in a small volume of view. The viewing window (VW), also referred to as 'sweet spot', which is created in this device only has about the diameter of an eye pupil. The viewing window is not typically formed by a real aperture but is only generated virtually.

If the holographic information is encoded one-dimensionally on the SLM, the generated viewing window has an incoherent and a coherent direction. The coherent direction is defined by the distance between two diffraction orders which are generated by the effective grid of the modulator cells. The effective grid is the matrix of the SLM as perceived by the observer eye. The holographic reconstruction can be viewed between the two selected diffraction orders. Their distance must be larger than the diameter of the pupil of the observer eye so to prevent double images. In the case of vertical encoding the diffraction orders are generated in the horizontal direction. The size of the viewing window in the incoherent direction is defined by the angular spectrum of the illuminating light.

In order to avoid active tracking of the viewing window, it should be substantially larger than the eye pupil, for example 15 mm×15 mm. This requires a small pitch of the spatial light modulators that are used in the system, so that the large diffraction angles which are necessary for this can be created. A large light modulator with a high resolution is thus necessary to satisfy this condition while at the same time realising a large field of sight.

The observer eye pupil should normally lie between two diffraction orders in the viewing window of a holographic HMD.

In order to be able to watch the generated reconstruction at a given distance and with a given apex angle at a typical resolution of the human eye at high quality and brightness, an HMD device should have a spatial light modulator (SLM) with a very large number of modulator cells (pixels). This is particularly important where the modulator cells of the SLM shall only be encoded one-dimensionally. Small SLMs which are used in HMDs have a modulator cell matrix of $<3*10^6$ modulator cells, for example. To be able to provide a larger volume of view for the reconstruction to be generated, an SLM should have a modulator cell matrix of >20*10^6 modulator cells.

SUMMARY OF THE INVENTION

It is thus one object to modify an HMD device with a small number of modulator cells in the modulator cell matrix in such way to be able to generate a holographic reconstruction with a high resolution.

An additional object is to provide in holographic HMD devices a volume of view which is as large as possible, similar to that in a holographic direct-view display, so to superimpose a reconstruction which is as large as possible with the real environment at a matching distance.

The volume of view (VOV), which is part of the entire space perceived by the observer, can be defined as a truncated pyramid with a plane face instead of a peak (a frustum), said plane face representing a small viewing window which is generated in the entrance pupil of the observer eyes. It has a further plane whose dimensions and distance from the observer eye define the horizontal and vertical apex angles. This plane can for example be a magnified virtual image of an SLM which reconstructs a holographically encoded three-dimensional scene. The volume of view stretches from the observer eye towards infinite space. The volume of view does not necessarily have to have a square or rectangular cross-section. Depending on the shape of the SLMs used and on the shape of any field-of-sight-limiting apertures, it can also have a different cross-section; it can for example be circular, elliptic or hexagonal.

In holographic displays, and thus also in holographic HMDs, the space-bandwidth product (SBP), which is generally defined by the size of a viewing window (VW), should be reduced to a minimum. If the viewing window is as large as the entrance pupil (EP) of the eye, then the minimum SBP is achieved which still allows full object resolution. Although enlarging the viewing window beyond this size increases the SBP, it has the advantage that the viewing window does not have to be tracked.

If a spatial light modulator shall be encoded one-dimensionally with complex values, and if the viewing window has a size of for example VW=15 mm, then more than 700 modulator cells are required per angular degree)(°) in the coherent direction, while no more than 60 modulator cells are required per degree in the incoherent direction.

Of all the above-mentioned features, an HMD for reconstructing large 3D scenes should, for example, at least have a large volume of view, high contrast and a large distance to the observer eyes. The viewing window should be at least large enough for the observer's eye pupils to have some freedom of movement without the need to activate a tracking device in the display to track the viewing window to the observer eye.

The volume of view should have such an apex angle that a reconstruction which is generated in the HMD can be superimposed with the real environment at relatively high contrast. The observer shall thus perceive a three-dimensional representation of 3D scenes as it could be realised in a holographic direct-view display.

To provide a spatial light modulator with a resolution that is as high as possible, it is known in the art to join multiple spatial light modulators having a low resolution with as little gap as possible in one or two dimensions in order to realise such a modulator surface. This is done mostly by way of magnified imaging of the spatial light modulators. Such an arrangement has the disadvantage that it requires a large volume of the device. It is thus less suited for HMDs.

According to another method, the images of a low-resolution spatial light modulator are joined in one or two dimensions sequentially. Mechanical deflection means such as tilting mirrors or polygon mirrors are often used for this purpose. Such mechanical deflection means also require a great volume of the device and can cause disturbing noise, which also makes them rather unsuitable for HMDs. In stationary devices, however, they can be used successfully. It is suggested in document WO 00/28369 A2 to realise such joining with the help of switchable diffractive Bragg gratings. During manufacture of these switchable gratings, a fixed grating structure is typically created by polymerisation of a mix of liquid crystals and polymers while being exposed to a hologram. The refractive index of the liquid crystals is modified by changing the voltage that is supplied to an electrode structure such that the light either passes through the grating unimpeded or that it is diffracted by it and thus deflected. This arrangement has the disadvantage that only one diffraction angle can be realised because of the fixed grating structure. Furthermore, this angle is wavelength-dependent. So, if you want to join multiple modulator images so to get a large high-resolution modulator surface, then a separate grating must be provided for each partial image or segment, and these gratings must be arranged in a stack. Only one grating of that stack is then activated at any one time to deflect the light in the desired direction, while the light passes through the other, non-activated gratings unimpeded. In a colour display, owing to the wavelength dependence of the diffraction angle, a separate switchable diffraction grating is needed for each modulator image to be generated and for each colour component, red, green and blue; that is three gratings per partial image. Since such switchable diffraction gratings cannot be manufactured with a diffraction efficiency of 100%, the non-diffracted light, which passes through the grating stack while all gratings are switched off, cannot normally be used for image generation.

Joining three images in one dimension thus already requires a stack of nine switchable gratings with different fixed grating constants.

Grating stacks with such a thickness are both difficult to make and problematic during use, because each optical interface causes reflection. Moreover, since the light must pass through many transparent electrode structures, a substantial portion of the light is absorbed or diffused. Both effects reduce the intensity and cause undesired diffused light, in particular as a result of multiple reflections, thus causing the contrast to worsen.

The inventive concept is based on the assumption that a large volume of view (frustum) must be provided for generating large-volume scenes, but that only a spatial light modulator with a small number of modulator cells is available.

A spatial light modulator SLM shall here be understood to be a two-dimensional device for modifying optical properties of light in a locally controllable way on the modulator surface in order to encode holographic information. Depending on the type of encoding, amplitude-only, phase-only or simultaneous phase and amplitude modulation of the light is possible. The amplitude and/or phase modulation does not have to be effected directly—it can also be realised through additional components, such as polarisers, by modifying other properties of the light, such as its polarisation. Generally, a spatial light modulator is formed by a two-dimensional array of individually addressable modulator cells (pixels). The modulator cells can for example be addressed electrically or optically. The modulator cells can emit light by themselves controllably or work in transmissive or reflective mode to modulate light controllably. It is also possible to achieve a wavelength conversion of the modulated light.

A spatial light modulator can also be formed by a one-dimensionally scanning device of a one-dimensional spatial light modulator, for example of a one-dimensional grating light valve (GLV), or by a two-dimensionally scanning device of a point-shaped light modulator, for example of a laser light source.

To be able to create a large apex angle and thus a large numerical aperture (NA) for viewing the reconstructed scene, at least one spatial light modulator is imaged multiple times side by side horizontally and/or one atop the other vertically according to this invention. This sequential composition of the volume of view is performed at a speed which is high enough not to be perceived as such by the observer.

The multiple images can, however, also partly or fully overlap.

The object is to provide a holographic display which magnifies a spatial light modulator including a 3D scene encoded on it for use in a head-mounted display device or hocular, where lenses with the function of a field lens or magnifying lens are preferably introduced into the optical path really or in the form of a controllable optical means. The spatial light modulator shall lie in a transformation plane, according to the working principle of a holographic direct-view display, or be able to be imaged into one of the transformation planes.

Generally, optical imaging systems can be used which can comprise refractive, diffractive as well as reflective imaging means.

The viewing window shall lie in the plane of the eye pupil; and it shall not coincide with the image of the SLM there.

The object is solved according to this invention through the teachings of claim 1. Further preferred embodiments and continuations of the present invention are defined in the dependent claims.

The display device, in particular a head-mounted display or hocular, comprises a spatial light modulator, a light-deflecting device and at least one optical imaging system, where the spatial light modulator is illuminated with wave fronts which are coherent at least in one direction, where the light-deflecting device is designed such that a multiple image of the spatial light modulator is generated, said multiple image being composed of segments which are sequentially joined at least in one dimension in a controllable manner, where the segmented multiple image includes at least a defined number of segments of the multiple image and defines the size of a volume of view in which the 3D scene which is holographically encoded on the spatial light modulator is reconstructed to be viewed by an observer eye.

The multiple image of the SLM lies, for example, in the plane of an optical imaging system with the function of a field lens whose focal point lies in the observer eye. The focal plane is the Fourier plane of the SLM into which the light source is also imaged by the optical imaging system with field lens function. The back-transform of a hologram which is written to the SLM is generated in multiple diffraction orders in this plane. The region between two diffraction orders is chosen as viewing window. The wave front which is encoded in the hologram and which resembles the wave front which would be emitted by a 3D scene is perceived the observer eye. This means that the observer sees the reconstruction of the 3D scene in the reconstruction space which stretches between the viewing window and the virtually enlarged SLM. Where exactly the object appears, i.e. in front of or behind the SLM or around it, depends on the depth encoding of the 3D scene in the hologram.

Generally, the lens with the field lens function can be an optical imaging system which comprises multiple imaging means. The imaging properties can also be variable or controllable. This optical imaging system can preferably comprise further light-affecting means, such as apertures. The apertures can for example serve to minimise the effect of aberrations or suppress higher diffraction orders.

In a preferred embodiment of the display device for generating a magnified image, the controllable light-deflecting device is thus designed such that a segmented multiple image of the spatial light modulator is generated in the plane of a field lens.

The number of segments which are imaged after the passage of the coherent wave fronts through the controllable light-deflecting device, which can for example comprise controllable layers as light-deflecting means, depends on the number of viewing cone segments to be created for representing individual views of the 3D scene and/or on their size which is specified in a viewing cone. Controllable light-deflecting means for segmenting the spatial light modulator are controlled both spatially and temporally either one after another or simultaneously, where the spatial light modulator is generated in a virtually magnified manner in a viewing cone. The modulator plane is magnified according to the number of segments of the scanned SLM in the viewing cone in which the virtual images of the SLM are magnified.

The volume of view is formed by multiple segments each of which being created by a virtual image of the SLM. The virtual field lens and the virtual total image of all partial images of the SLM lie in a plane of the volume of view which corresponds, for example, with the plane of a direct-view display.

The field lens is a convex lens which generates a virtual viewing window between spatially separated diffraction orders, i.e. between spatially separated light source images. It is provided in the form of a virtual field lens, and thus as a virtual phase function, in a plane of a virtual SLM image and has a focal length which at least approximately corresponds to the distance of the virtual SLM image.

This necessary virtual phase function can be realised by designing the optical imaging system accordingly, i.e. there is no need for a real convex lens directly on the SLM or in its close proximity. It is, however, also possible for a real convex lens to be disposed near the SLM, where both lens and SLM are imaged into the plane of the virtual SLM image. This corresponds largely to the design of a non-holographic HMD which is optimised to achieve maximum brightness in the entrance pupil of the observer eye, i.e. which focuses all light of the SLM in the entrance pupil. The focal length of a virtually assumed field lens of such an HMD device is almost identical to the virtual observer distance.

The controllable light-deflecting device is designed such that a small object, for example a controllable spatial light modulator which is illuminated by plane coherent wave fronts, is imaged multiple times at least in one dimension so to form segments. The individual segments shall be joined with as little gap as possible or even partly overlap, where the overlapping can be allowed for when generating the holographic information. The images of the individual modulator segments are preferably magnified.

In a preferred embodiment, the light-deflecting device in the display device is designed such that the segments of the multiple virtual image of the spatial light modulator are joined substantially without gaps or that they partly overlap, where the overlapping areas can be allowed for when generating the holographic information.

The 3D representation can be imaged in a further magnified manner by imaging means which follow in the optical path. Additional imaging means can thus be provided in the optical path of the display device for generating a magnified image, said imaging means serving to further magnify the segmented multiple image of the spatial light modulator which is generated by the light-deflecting device.

The virtual compound image of the SLM lies in a plane in the line of sight and confines the viewing angle range of the 3D reconstruction. A reconstruction space is thus defined together with the observer eye, said space forming the volume of view (VOV). Only those parts of the 3D scene shall preferably be reconstructed which are situated in this volume of view.

It is assumed in the context of the present invention that a coherent wave front which is emitted by a preferably reflective spatial light modulator (SLM) represents a segment of the SLM in a major plane of a lens with field lens function. A light-deflecting device serves to image the SLM multiple times one after another or simultaneously as segments into the plane of this field lens.

The segments which are represented multiple times one after another or simultaneously generate individual parts of the volume of view one after another or simultaneously. The observer eye and the viewing window are situated in the focal point of the virtual field lens.

The viewing window is part of the plane which corresponds to the Fresnel transform of the virtual multiple image.

A controllable light-deflecting device images the SLM with the coherent wave front for example into the plane of the focusing system, in particular to a field lens plane of the focusing system, multiple times side by side. In another embodiment, the focusing system can comprise at least one lens with magnifying function.

The controllable light-deflecting device can also image an intermediate image of the SLM instead of the real SLM multiple times side by side at least in one dimension.

The SLM can be disposed near the field lens plane, i.e. in front of or behind it, and it can be real or virtual.

With the segments represented in the plane of the field lens, the SLM can be multiplied at least in one dimension through virtual images.

The number of segments that are generated by the light-deflecting device for the purpose of composing the multiple image of the spatial light modulator can be variable, for example in order to adapt the image size or content to the volume of view which is to be realised or to a given observer distance, i.e. distance between the eye pupils and magnified virtual image of the SLM.

In an embodiment of the display device, the light-deflecting device can be designed such that the number and/or size of segments of which the multiple image of the spatial light modulator is composed can be variable.

The SLM can be imaged multiple times by the light-deflecting device either in one or in two dimensions. For two-dimensional multiple imaging, the light-deflecting means can for example comprise at least two one-dimensional light-deflecting elements which are arranged such that their direction of deflection is crossed.

The display device for generating a magnified image preferably comprises a controllable light-deflecting device with at least one controllable light-deflecting means which has a controllable liquid crystal grating with variable grating period. This grating period is preferably controlled by modifying the voltage profile applied to an electrode structure.

The light-deflecting means which are used in the light-deflecting device, for example controllable liquid crystal gratings, multiplex volume gratings or controllable prisms with variable wedge angle, can, for example, fulfil the function of a cylindrical lens in order to achieve an anamorphic stretching of the bundles of rays. It is also possible to use prism pairs in order to achieve, for example, an anamorphic stretching of a bundle of rays or of wave fields in one dimension.

Multiplex volume gratings are volume holograms in which at least two different directions of deflection are inscribed during manufacture. The desired direction of deflection can then be selected by varying one or more properties of the incident light, for example direction of incidence, wavelength or polarisation.

In an embodiment of the display device according to this invention, the controllable light-deflecting device thus comprises at least one volume hologram which has at least two different diffraction angles which can be selected by at least two different angles of incidence and/or two different wavelengths of the light which illuminates the spatial light modulator.

A lean design of the display, which can then be mounted, for example, to the temple arms of a glasses frame, can, for example, be achieved by way of one-dimensionally expanding an SLM image with the help of a volume grating which is arranged such that only deflected light contributes to the image generation. The volume grating can additionally fulfil the function of a field lens. The arrangement can be modified such that a plane in which a compound image of an SLM is situated is expanded in one dimension for example by a factor of 10. However, it does not necessarily have to be precisely that plane. It is sufficient if an existing wave front is expanded.

The volume of view of the HMD can generally be defined by a given size of the viewing window and a specifiable distance from an observer's eye pupils to the virtual multiple image of the SLM. This distance can for example lie between 1 m and 3 m.

In a further embodiment, a spatial frequency filter can be disposed in the optical path of the HMD that serves to filter out higher diffraction orders of the wave fronts emitted by the SLM. In its most simple physical form, the filter is a static aperture mask, but in another embodiment it can also be a controllable aperture function and form the viewing window whose image to the observer eye represents the entrance pupil. The filter can, for example, be disposed in the central focal plane of a telescopic optical imaging system. By filtering high spatial frequencies of the SLM, the viewing window which is imaged onto the eye appears without neighbouring higher diffraction orders. This filtering can preferably be used if the viewing window is only about as large as the observer's eye pupil.

In another embodiment of the display device according to this invention, at least one filter is disposed in the optical path that serves to filter out higher diffraction orders of the wave fronts emitted by the spatial light modulator.

The filter is particularly preferably disposed in the central focal plane of a telescopic optical imaging system.

In small viewing windows, for example measuring only 3 mm, the viewing window is preferably tracked to the eye movement controlled by that movement. The eye position can for example be detected with a camera which is integrated into the HMD device. The tracking can be performed by a separate controllable tracking device with separate light-deflecting means, where the multiple image is typically tracked as a whole to the eye position. This tracking device can be designed involving, for example, liquid crystal gratings, controllable electrowetting cells which realise a variable prism function, liquid crystal prism cells, variable large prism cells, or, in a more spacious design, scanning mirrors.

In another embodiment of the display device according to this invention, a controllable tracking device is thus provided which serves to track a viewing window to the eye movement controlled by that movement.

This tracking, however, can also be performed entirely or partly by the light-deflecting device that generates the multiple image of the spatial light modulator which is composed of segments. Then, the segments are already generated in such way that the multiple image follows the eye movement.

In a particularly preferred embodiment of the display device according to this invention, the light-deflecting device is thus designed such that—in addition to generating a multiple image of the spatial light modulator which is composed of segments—a virtual viewing window is tracked to the eye movement controlled by that movement or that the controllable tracking device is supported.

Further, there may be adjustment means for adjusting the viewing window manually or automatically to the position of the eye pupils, and thus to provide for the individual eye separation, for example. For this purpose, there may be sensors which detect the centre position of the eye pupil, so that the optical system of the display device is adapted, for example, to the eye separation with the help of suitable actuators, so that the observer can see the reconstruction of the 3D scene optimally.

In another embodiment of the display device according to this invention, adjustment means are thus provided for adjusting the viewing window manually or automatically to the position of an eye pupil of an observer eye, and so to provide for the individual eye separation, for example.

The function of the adjustment means can also be integrated partly or wholly into the light-deflecting device or into the tracking device. For this purpose, there can also be sensors for detecting the position of the eye pupils. In an initialisation phase, or continuously during the use of the display device, the light-deflecting device and/or the tracking device can thus introduce a fixed displacement factor so to enable the observer to perceive the reconstruction of a 3D scene optimally. Additional actuators can then preferably be omitted.

In a particularly preferred embodiment of the display device according to this invention, the light-deflecting device and/or the tracking device is thus designed such that it adjusts the viewing window in a controllable manner to the position of the eye pupil or that it supports other adjustment means which serve that purpose.

The light-deflecting means of the light-deflecting device can also be disposed on a surface that is curved in one or two spatial dimensions in order to generate the segments the multiple image is composed of. The sequential deviation of the position of the segments of the multiple compound image of the spatial light modulator with respect to a plane compound image can then be corrected when holographically encoding the 3D objects, so that they are represented correctly and without bias in the virtual volume of view. Such a curvature can also be caused by further optical imaging means during the generation of the segments. Moreover, the multiple compound image which is composed of segments can be imaged in a curved manner by further imaging means, for example a curved mirror, in the optical path so to get a magnified virtual modulator surface. This curvature can again be compensated during the holographic encoding of the 3D objects.

In one embodiment of the display device according to this invention, the light-deflecting device and/or further optical components of the optical imaging system for generating and/or imaging the segments of the multiple compound image of the spatial light modulator are thus designed such that this multiple image which is composed of segments is generated or imaged in a curved manner, and that this curvature is allowed for when encoding the three-dimensional scene.

Depending on the desired total magnification and on the pitch of the SLM, the image can be magnified, demagnified or projected 1:1 in the first stage. Anamorphic expansion is also possible. The SLM image is composed of segments by the light-deflecting device, i.e. the SLM is, for example, imaged multiple times into the object plane of an optical imaging system with magnifying lens as a compound intermediate image. The light-deflecting device here comprises a controllable liquid crystal grating with variable spacing as an example of a first light-deflecting means, and a multiplex volume grating as an example of a second light-deflecting means, where individual volume gratings are inscribed into the multiplex volume grating for each partial image and for each imaging wavelength. The volume grating which is required for the particular image and wavelength is then selected by the diffraction angle of the first light-deflecting means and by the wavelength of a colour-division multiplex light modulator unit. Anamorphic imaging can also be performed or supported by the light-deflecting device in that, for example, the light-deflecting means do not only deflect the light but simultaneously expand the angular spectrum.

In an embodiment of the display device according to this invention, the optical imaging system and the light-deflecting device are thus designed such that the segmented multiple image of the spatial light modulator is imaged anamorphically.

A light-deflecting device which only comprises one controllable light-deflecting means is preferably disposed in the common focal plane of a telecentric imaging system. This light-deflecting means only has to tilt the optical path in a controlled manner here in order to generate a multiple image which is composed of segments. This tilting can be achieved, for example, by a controllable prism or by a controllable diffractive deflection grating. The position of the light-deflecting means which tilts the optical path can also differ from the position of the focal plane, for example in order to fulfil an additional field lens function. Any overlapping of light modulator images which may thereby occur can be allowed for when generating the hologram.

In an embodiment of the display device according to this invention, at least one telecentric imaging system is thus provided in whose object-side focal plane a light-deflecting device is disposed which tilts the light which is emitted by the spatial light modulator in a controlled manner.

Another continued embodiment of the temporally and/or spatially segmented provision of image contents in a large volume of view is characterised by a combination—which is variable in respect to the solid angle—of an incoherent 2D representation and/or a 3D stereo representation with a dynamically encoded, at least partially coherent holographic 3D representation.

This possible embodiment is based on a number of aspects.

The eye can particularly well focus on regions with high contrast, such as dots, edges or more differentiated structures.

On the contrary, unstructured regions in space only show low contrast, for example. It is more difficult for the eye to focus on them. As a consequence, there is the possibility to limit the dynamically encoded holographic 3D representation to instances of edges and structures, i.e. highly effective focus points, while generating surfaces and object segments with less effective focus points with the help of a 2D or 3D stereo representation. This means that dynamically encoded holographic 3D representation and 2D or 3D stereo representation are interleaved. This can be done either through the entire solid angle range of a non-segmented or temporally or spatially segmented volume of view, or only in parts thereof.

The embodiment can be limited to only extend the marginal region of the central viewing window outwards, thereby providing a more comprehensive spatial impression of the dynamically encoded holographic representation of the 3D scene.

In a simple embodiment, where only the vertical viewing angle is considered here to keep things simple, the central angular range of 0.±13°, i.e. 26°, which corresponds to a central segment of the SLM in the plane of the field lens can, for example, be generated by way of dynamically encoded holographic 3D representation. The angular ranges of between +13° and +39° and −13° to −39° which are adjacent to the central range at the top and bottom, respectively, are generated by way of 2D or 3D stereo representation.

This is because of the fact that the user can perceive a strong 3D impression of his natural environment at a high resolution only in a limited solid angle range. If a very large solid angle is available to the user, then the features of a high resolution and strong 3D impression only exist in a partial region of the entire solid angle. This is the region on which the user can concentrate. Owing to the fact that this region can move around in space depending on the observer eye movement, it makes sense to provide this spatial region with its strong focus and 3D features in a variable way too. For this purpose, detection of the eye position and/or viewing direction must be provided. Even if the viewing window has a size of for example 15 mm, so that it would not be necessary to track the entire viewing window, it is preferable to track the spatial region with its strong focus and 3D features to the observer eye, if this region only represents a part of the entire volume of view.

The holographic representation and the 2D representation and/or 3D stereo representation can be combined such that they are interleaved, fading into each other or abutting. Calibration and a look-up table (LUT) can be used to eliminate perceivable disturbance in the frustum.

As far as costs are concerned, it can be preferable to provide one SLM for holographic encoding and one for classic 2D representation. It can also be provided to use laser diodes for illuminating an SLM for holographic encoding and light-emitting diodes (LED) for illuminating an SLM for classic 2D representation. Alternatively, an actively light-emitting SLM, for example an OLED display, can be used for the 2D or 3D stereo representation.

Properties such as polarisation, wavelength and/or spatial thinning out of the object scene can be used for reducing speckle and coherent cross-talking of neighbouring object points which are perceived in the volume of view.

The light sources of an illumination device, which illuminate, for example, two SLMs which reconstruct a joint object point region, can, for example, be designed for different narrow-band wavelength ranges within an RGB colour space. The colour shift which thereby occurs can be allowed for when encoding the object points which are then assigned to a certain SLM. Using light with different polarisation (e.g. horizontally and vertically polarised or right-handed and left-handed circularly polarised) is also possible. Again, different intensities of the light portions can be allowed for when encoding the object points.

Both possibilities can be combined.

The temporal and spatial coherence can be reduced to a minimum in that volume gratings are combined with different light source arrangements, for example with laser diodes, according to the options described above.

In particular when setting up a stationary device, it is preferable to implement the principle of thinning out object points with multiple SLMs, where the object point clusters of the individual parts of the reconstructed 3D scene of these SLMs are interleaved. In doing so, the individual SLMs can be illuminated, for example, with light sources which have the same wavelength but which are mutually incoherent. These light sources can also have wavelengths which differ slightly, where these colour differences should be allowed for when generating the holographic information so to get an unbiased colour reconstruction.

In a preferred embodiment of the display device according to this invention, another light-deflecting device is thus provided which generates another segmented multiple image of another spatial light modulator. The segmented multiple images of the individual light modulators are interleaved and/or twisted against each other and/or offset against each other and/or staggered in depth; together with the eye pupil of the observer eye they define a common volume of view. Their sub-regions abut each other or overlap partly or wholly, where this overlapping can be incoherent, partly coherent or coherent. Each sub-region contains a 2D representation and/or a 3D stereo representation and/or a holographic 3D reconstruction.

In a preferred embodiment, the SLM is combined with a controllable component which can include a lens with field lens function and a controllable light-deflecting device in one component.

This controllable component can also be a static volume grating which can have different optical paths which are either inscribed in one plane in an interleaved manner or which are inscribed in individual planes.

Such a static light-deflecting element is combined with a further switchable or controllable light-affecting means, for example with a switchable or controllable shutter array, so that only light of one direction of deflection is transmitted at any one time.

Further, the field lens of the focusing system can be provided in the form of a single volume grating or as a controllable grating based on liquid crystals (LC).

The light-deflecting device, a field lens and an optionally applicable tracking device can be disposed such that the zeroth diffraction orders of diffractive light-deflecting means do not contribute to the image generation. This makes it possible to also use diffractive light-deflecting and imaging means which only have a low diffraction efficiency, so that disturbing light portions remain in the zeroth diffraction order if the desired direction of light deflection is selected.

In one embodiment of the display device according to this invention, a controllable liquid crystal grating with variable grating period and/or a multiplex volume grating is disposed in the controllable light-deflecting device such that light of the zeroth diffraction order passes through it unused and is isolated from the further active optical path.

The individual functions of these components can also be combined in the form of a controllable liquid crystal grating.

Optical paths can be inscribed for the purpose of polarisation splitting an/or wavelength splitting and angle splitting and combination. The same features, i.e. polarisation, wavelength and angle, and the corresponding technical means can be used for reading and separating the optical paths inscribed in such a multiplex volume grating.

In the case of a volume grating whose reconstruction geometry can be switched electrically, the volume grating comprises, for example, a liquid crystal material with a variably controllable orientation.

Owing to the thickness in which they can be realised, volume gratings are suited to combine optical paths in a compact way, and they are a suitable means for reducing the display size and/or thickness and weight in the context of the present invention.

Static volume gratings, i.e. volume gratings with fixed reconstruction geometry or with temporally unchanged grating parameters can be made, for example, of dichromate gelatine (DCG), photorefractive glass or photopolymer.

Volume gratings where the refractive index changes with the depth, i.e. where the refractive index is a function of z, can very preferably be used. Thanks to such a Z apodisation, side peaks of the angle and wavelength selectivity can be suppressed specifically and the angle, polarisation and/or wavelength selectivity can be adjusted specifically to the function that is optimal for the particular design. This can be applied to both transmissive and reflective volume gratings, where different volume gratings can be inscribed, for example, one behind the other, i.e. in different depths, or in an interleaved, i.e. at least partly overlapping, manner in a thick layer, where the apodisation function is, for example, chosen such that at least the side peaks of the angle and wavelength selectivity are suppressed and that the transition between the individual segments of the multiple image of the SLM is optimised to the particular design.

Multiplex volume gratings can also be made by way of gluing together multiple layers which show separate diffraction patterns. Each layer can include a multiplex volume grating and be optimised, for example, for a certain wavelength range or angular range.

The controllable layers of the light-deflecting means can comprise a liquid crystal material which is provided in the form of a volume grating or liquid crystal grating in the light-deflecting device and which can be controlled to fulfil phase-profile-affecting functions in order to modulate optical paths or coherent wave fronts or to change their direction of propagation.

Electrically controllable volume gratings are for example known as polymer dispersed liquid crystal gratings (PDLCG); they achieve very high switching speeds.

When generating a reconstruction, encoding with depth-significant patterns and features can preferably be limited to a region of the compound modulator image. This region preferably lies in the line of sight of the observer eye and can be found, for example, by way of detecting the position of the eye pupil.

An incoherent 2D or 3D stereo representation can be superimposed with the holographic reconstruction. This superimposition can be congruent or fading into each other in that holographic information is written to at least one segment of the spatial light modulator while stereo images are written to the other segments, where the holographic reconstruction is for example generated in the central segment. The 3D scene can, for example, be represented two- or three-dimensionally in other segments.

The HMD device can be provided with a spatial light modulator SLM to which the holographic code of a 3D scene is written, or be combined with a spatial light modulator SLM which provides stereo images for 2D or 3D representation.

The application of the head-mounted display according to this invention as defined in the independent claim can be continued such to be used as a 2D HMD, stereoscopic 3D HMD and holographic 3D HMD which, however, does not require magnifying means.

Thanks to the variable enlargement of the SLM plane, the HMD which is designed according to this invention can be modified to suit other stereoscopic display applications; it can for example serve as a display of a holographic direct-view display device or of a holographic TV set.

Embodiments where at least one linear spatial light modulator is scanned are particularly suited for hocular devices. The segments of the multiple compound image of the spatial light modulator are then preferably generated one-dimensionally in the form of scanning stripes across the scanning direction. Scanning can be performed, for example, by galvanometer mirrors, which can also be provided in the form of micromechanical elements, or by polygon mirrors. Controllable diffractive gratings can also preferably be used for this purpose.

In a preferred embodiment of the display device according to this invention, the spatial light modulator is provided in the form of a linear spatial light modulator, which is scanned by a light-deflecting means across its linear extent and whose scanning image is repeated multiple times one above the other in the direction of its linear extent sequentially by the controllable light-deflecting device.

If a polygon mirror is used for scanning, it can be designed such that neighbouring mirror surfaces are twisted against each other in the direction of the rotation axis such that individual scanning stripes are joined in an abutting or slightly overlapping manner. This overlapping can be allowed for when generating the hologram values.

In a particularly preferred embodiment of the display device according to this invention with a linear spatial light modulator, a polygon mirror is thus provided with at least two mirror surfaces being twisted against each other such that their respective scanning stripes lie one above the other perpendicular to the scanning direction or are slightly overlapped.

In a preferred embodiment, a micro-lens array can be disposed in front of or behind the spatial light modulator of the display device in order to increase the luminous efficacy of the spatial light modulator and/or to reduce edge effects in the transitional regions between individual modulator cells of the spatial light modulator.

To this end, the micro-lens array can also be provided at the position of an intermediate image of the spatial light modulator or at the position of a intermediate compound image of the spatial light modulator.

The micro-lens array can additionally be fitted with an apodisation mask in order to suppress higher diffraction orders which are caused by the grid of modulator cells as far as possible. An apodisation can, however, also be achieved in that the foci of the micro-lenses doe not lie precisely in the plane of the modulator cells, but are rather slightly maladjusted in relation to it. A slight defocus can serve to adapt the above-mentioned effects of the corresponding micro-lens to the size of the active area. Moreover, the lens shape can be optimised with view to its optical transfer function. It can even be plane and show a gradient index profile.

When using a transmissive light modulator, a micro-lens array can also be disposed in the optical path between a backlight and the modulator cells so to focus the non-modulated light which is emitted by the backlight on the active area of the modulator cells.

An apodisation mask can also be applied for the purpose of suppressing higher diffraction orders where no micro-lenses are used.

In an embodiment of a display device according to this invention, an apodisation mask can be disposed on the side of the spatial light modulator that faces the observer eye. It can also be disposed at the position of an intermediate image and/or at the position of a segmented intermediate image of the spatial light modulator.

The HMD device can further comprise additional colour filters in the optical path for generating a colour reconstruction, where the colour filters serve, for example, the three primary colours, red, green and blue.

Both transmissive and reflective SLMs can be used for writing the complex hologram values. A reflective SLM requires a flat frontlight or, alternatively, an illumination device comprising a projection system for illuminating it at an oblique angle. The light modulators used can be systems which modulate the amplitude or, preferably, the phase of light. It is also possible that such a system comprises complex modulators which directly modulate both amplitude and phase of the light.

Depending on the type of encoding, the light of two—for example in the case of the two-phase encoding method—or more modulator cells can be combined to form a complex hologram value by a beam combiner, for example as known from document DE 10 2009 044 910 A1 filed by the applicant.

BRIEF DESCRIPTION OF THE DRAWINGS

Now, there are a number of possibilities for embodying and continuing the teachings of the present invention and/or to combine the individual embodiments described above—as far as this is possible. To this end, reference is made on the one hand to the dependent claims that follow claim 1, and on the other hand to the description of the preferred embodiments of this invention below including the accompanying drawings. Generally preferred physical forms and continuations of the teaching will be explained in conjunction with the description of the preferred embodiments of the invention and the accompanying drawings. The Figures are schematic drawings, where FIG. 14 illustrates the use of a light-deflecting device for multiple imaging between a telescopic imaging system for imaging the light modulator and an optical imaging system with magnifying lens, FIG. 15 illustrates the use of a light-deflecting device for multiple imaging behind the two-stage imaging of the light modulator with a telescopic imaging system and an optical imaging system with magnifying lens, FIG. 23 illustrates the use of a light-deflecting device in the immediate vicinity of the entrance pupil (EP) of the observer eye for multiple imaging, FIG. 24 illustrates the use of an at least one-dimensionally curved light-deflecting device in the immediate vicinity of the entrance pupil of the observer eye for multiple imaging, FIGS. 27a-c illustrate the use of a light-deflecting device with a controllable deflection grating in the aperture plane of a telecentric imaging system for multiple imaging in a two-stage optical imaging system, combined with a one-dimensional light modulator.

DETAILED DESCRIPTION OF THE INVENTION

Figure 1A:
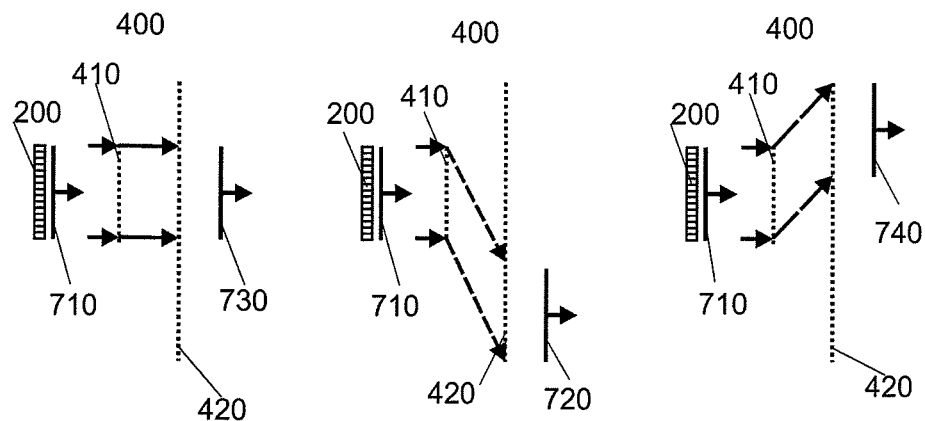
FIG. 1a illustrates the light-deflecting device with the example of three switching states.
Figure 1B:
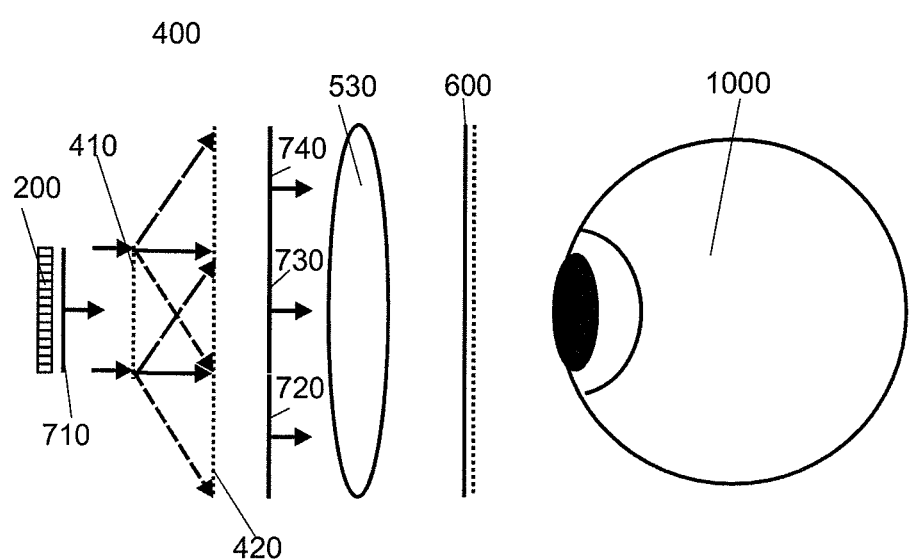
FIG. 1b illustrates the use of the light-deflecting device in a first exemplary embodiment.

FIGS. 1a and 1b each show a light-deflecting device 400 with several general functions as shall be used in the HMD device according to this invention.

Referring to FIG. 1a, the light-deflecting device 400 comprises two controllable light-deflecting means 410, 420 which image a spatial light modulator SLM 200 multiple times with multiple coherent wave fronts 720, 730, 740. The SLM 200 is illuminated with collimated light by an illumination device (not shown). After the modulation of the light by the SLM 200 a modulated coherent wave front 710 is emitted by the SLM.

In a modified preferred embodiment, the SLM 200 is illuminated with a converging wave front. An optional beam combiner (not shown) is then adapted to that type of illumination.

If the beam combiner is based, for example, on a birefringent coplanar plate (Savart plate), as proposed by the applicant in document DE 10 2009 044910 A1, the thickness of this plate shall be modified depending on the position of the SLM such that the wave fronts of the adjacent pixels which are to be combined are fully congruent.

Such spherical illumination can be implemented easily in a flat frontlight unit which comprises at least one volume grating. The field lens, or part thereof, is integrated into the illumination device such that refractive surfaces can be omitted. In a transmissive SLM, a convergent backlight unit can also be used to this end.

In the left diagram in FIG. 1a, a modulated plane wave front 710 is only passed on through the controllable light-deflecting means 410, 420 as a modulated wave front 730, and it is not deflected. The spatial light modulator can be imaged as a segment into a subsequent field lens plane. The two other diagrams show the deflection of the modulated wave front 710 in two different directions as modulated wave fronts 720, 740. The deflection can be invariable and effected by at least one light-deflecting element. Alternatively, multiple layers can be used each of which realising different deflection angles if addressed accordingly. Modulated wave fronts can also be deflected and passed on by combining deflection elements of a controllable deflection unit with an invariable deflection unit. The controllable light-deflecting means can, for example, contain two controllable liquid crystal materials.

FIG. 1b shows the general layout of an inventive head-mounted display (HMD) as claimed by this patent, involving a light-deflecting device 400 as shown in FIG. 1a. An SLM 200 which is to be imaged multiple times is followed in the optical path by the light-deflecting device 400 and a magnifying lens 530, which are disposed at relatively small distance to each other. The 3D reconstruction of the holographic information which is written to the SLM 200 can be tracked to the movements of the eye pupil of an observer eye 1000 with an optional tracking device 600. This is particularly preferable if the diameter of the generated viewing window does not differ much from the diameter of the eye pupil of the observer eye.

Sub-holograms with different views of a three-dimensional scene can be generated with the SLM 200, which comprises, for example, a matrix with individually addressable modulator cells, through sequential modulations $M_i$ of wave fronts $WF_i$. The modulator cells are illuminated with collimated light which is emitted by a light source (not shown), which exhibits coherence in at least one direction and which has a plane wave front. The wave front 710 which is sequentially modulated by the spatial light modulator 200 is deflected by the light-deflecting device 400 in different directions as modulated wave fronts 720, 730, 740. The light-deflecting device 400 projects the spatial light modulator 200 sequentially segment by segment into the plane of a magnifying lens 530 where these segments together represent a virtual compound or tiled spatial light modulator of high resolution. Here, the magnifying lens 530 fulfils the function of a field lens.

Thanks to the segments of the spatial light modulator 200, which can be represented multiple times side by side in one or two dimensions, virtual light modulator images which correspond to these segments are visible in the volume of view, where modulated wave fronts 720-740 correspond to the light modulator images at the points of time of the respective light deflection through the light-deflecting device 400. The observer can thus perceive the entire volume of view as a whole and watch the three-dimensional representation therein. The volume of view defines the reconstruction space within which a three-dimensional reconstruction can be perceived.

The SLM 200 can be imaged multiple times into the plane of a magnifying lens 530 sequentially or statically side by side by the modulated wave front 710 which passes through the light-deflecting device 400, as shown in FIG. 1b, where the modulated wave fronts 720-740 are generated.

The magnifying lens 530, which can preferably be provided in the form of a system of multiple lenses, is generally not the field lens, due to its distance from the observer eye 1000. It serves merely as a magnifying lens with the compound SLM being disposed inside the focal length of the lens system. Given an invariable focal length of the magnifying lens 530, the position of the virtual image of the compound modulator image which is perceived by the eye can be adapted by changing the distance of the compound modulator image to the object-side major plane of the magnifying lens 530. At the same time, this defines the volume of view for the holographic reconstruction.

The real or virtual field lens is situated in the plane of a real or virtual (multiple compound) SLM. Its function can be implemented in the entire optical system and it can include multiple passive and/or active imaging elements.

The magnifying lens 530 can, however, be designed such that it also fulfils the function of the field lens. In this case, the compound modulator image is situated in the major plane of the magnifying lens 530 and at the same time represents the virtual image of the compound modulator which is perceived by the eye and which defines the volume of view. In this case, it is a mere field lens which is disposed in front of the entrance pupil of the observer eye at the distance of its focal length. It does not effect any magnification.

Figure 2:
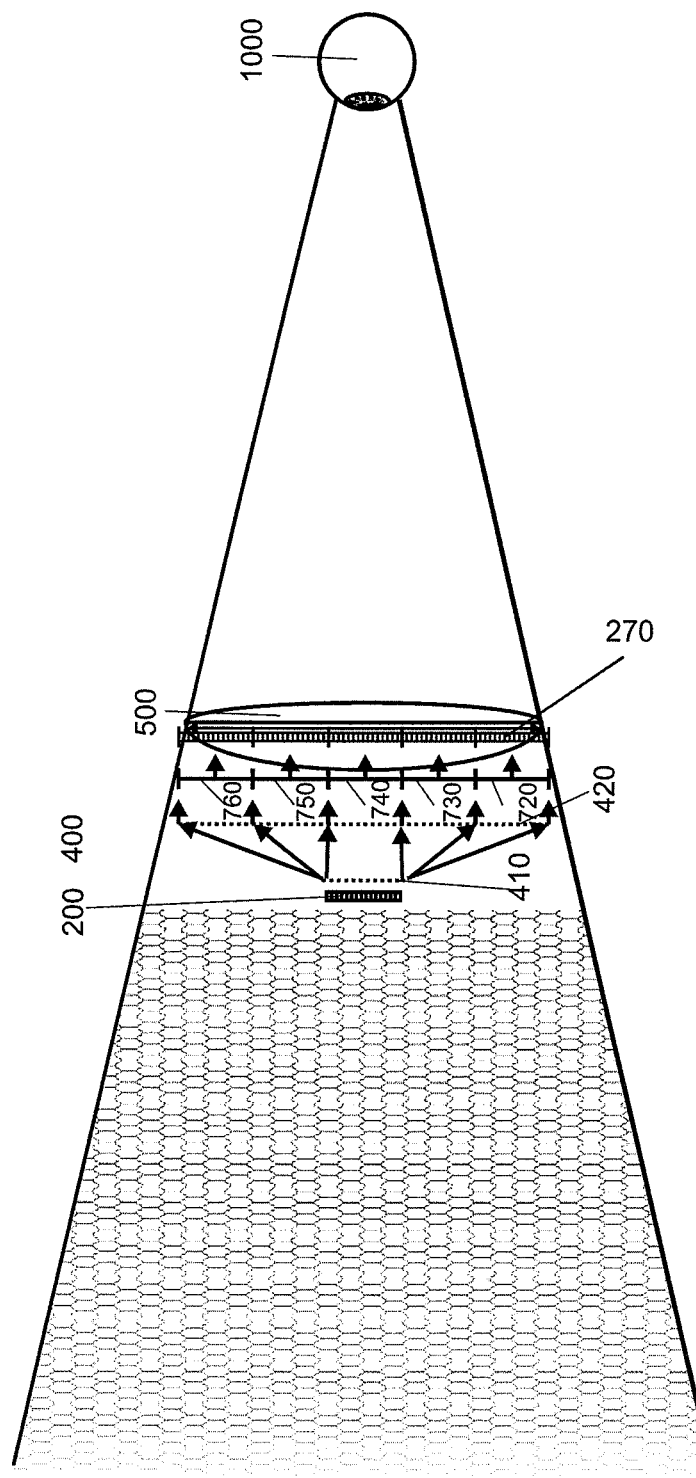
FIG. 2 shows the extended volume of view that is generated by the arrangement shown in FIG. 1b.

This is illustrated in a simplified drawing in FIG. 2. This drawing shows the most important means which a head-mounted display comprises for implementing the above-mentioned inventive principle. Scanning the SLM 200 with the light-deflecting device 400 and the lens with field lens function 500, which are disposed one after the other in the direction of light propagation, is shown in a very basic layout.

The SLM 200 can be represented or copied at least one-dimensionally, for example, five times one after another in the order 1, 2, 3, 4 and 5 by subsequent coherent wave fronts, while carrying different holographic information, through the light-deflecting device 400, which comprises, for example, at least one controllable liquid crystal grating, so to represent multiple segments in the plane of the field lens, thereby generating a compound image 270 of the light modulator.

The controllable liquid crystal gratings are preferably provided in the form of active liquid crystal polarisation gratings, which are known as such in the art, whose grating constant can be modified by changing a voltage profile supplied to an electrode arrangement, and thus by changing the inscribed phase profile.

The subsequently generated segmented wave fronts 720-760 are directed at the eye pupils by imaging means. The imaged segments of the SLM 200 together generate a volume of view which spans from the eye pupils to infinite space.

The spatial light modulator 200 can also be scanned statically by the wave fronts; then the SLM 200 as such is segmented, i.e. multiple spatial light modulators are disposed close to each other or that they are composed by the light-deflecting device 400 to form one large virtual high-resolution light modulator.

Alternatively to a sequential multiple imaging of the SLM 200 in the plane of the lens with the field lens function 500, a simultaneous multiple imaging in the plane of the lens with the field lens function 500 is possible as well. This can be achieved, for example, with the help of volume gratings in which multiple directions of propagation are inscribed statically. At any one time, the code is correct for one segment only but not for the four other segments, for example. A further propagation of the light from those segments towards the eye can be suppressed, for example, by electrically switched shutters. Such switchable shutter arrays can for example be provided in the form of a liquid crystal shutter display. The advantage of their use in the HMD device is that the only components used in conjunction with the SLM 200 and the light source are segmented and fast switching shutters.

The basic layout of an inventive HMD device as described above allows, for example, to magnify a controllable spatial light modulator with 4000×2000 modulator cells five times. The volume of view (VOV) can have an apex angle of, for example, 26°, and the viewing window can have a size of 15 mm with this design.

The optical imaging system with filed lens function 500 can be of a refractive, diffractive or reflective type. Combinations are possible as well, for example a combination of a refractive system with diffractive correction.

To reduce the flickering effect, the SLM 200 can preferably be addressed in the order 2, 4, 1, 3, 5 for segmenting instead of the order 1, 2, 3, 4, 5.

The reconstruction sequence of the 3D scene to be generated can be optimised with respect to the segment of the SLM 200 and with respect to colour.

Figure 3:
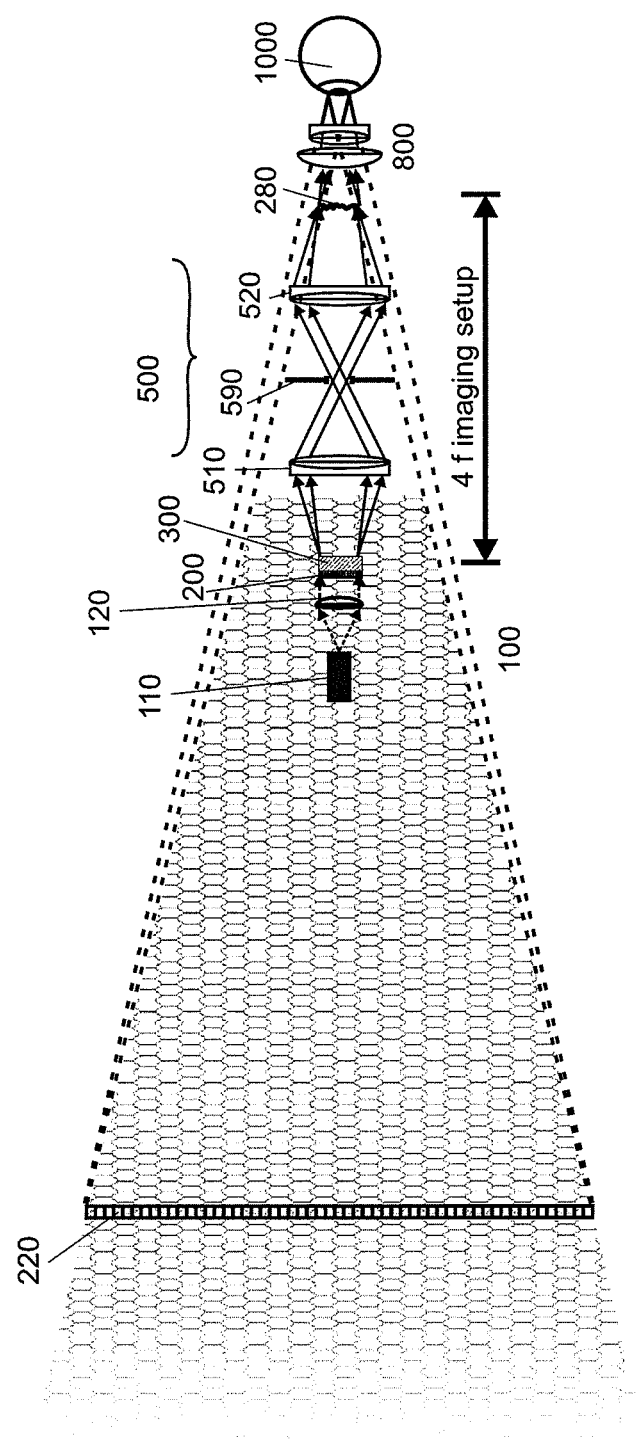
FIG. 3 illustrates the principle of generating a magnified virtual light modulator image by a 4f imaging system and an additional magnifying lens.
Figure 4:
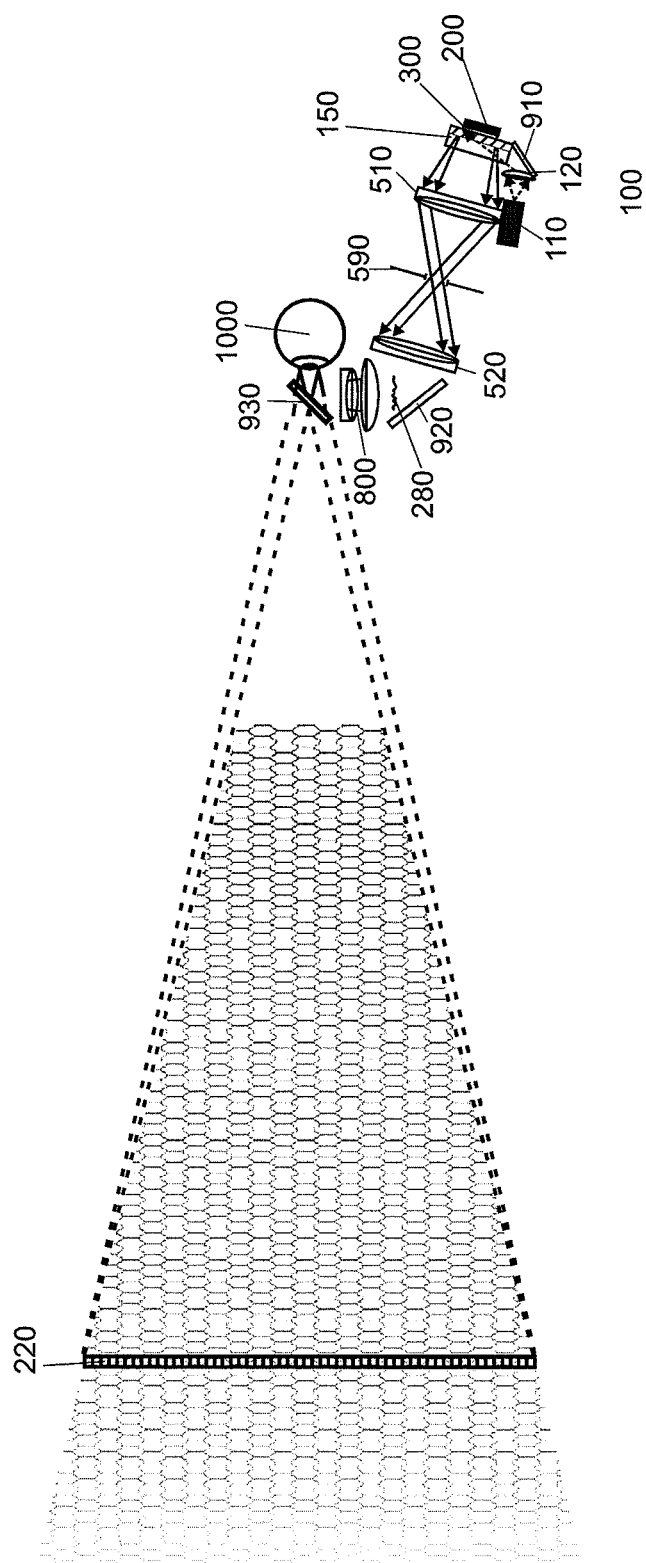
FIG. 4 shows the use of a reflective SLM and the principle of reducing the structural depth through the use of mirrors in a 4f imaging system with an additional magnifying lens.
Figure 5:
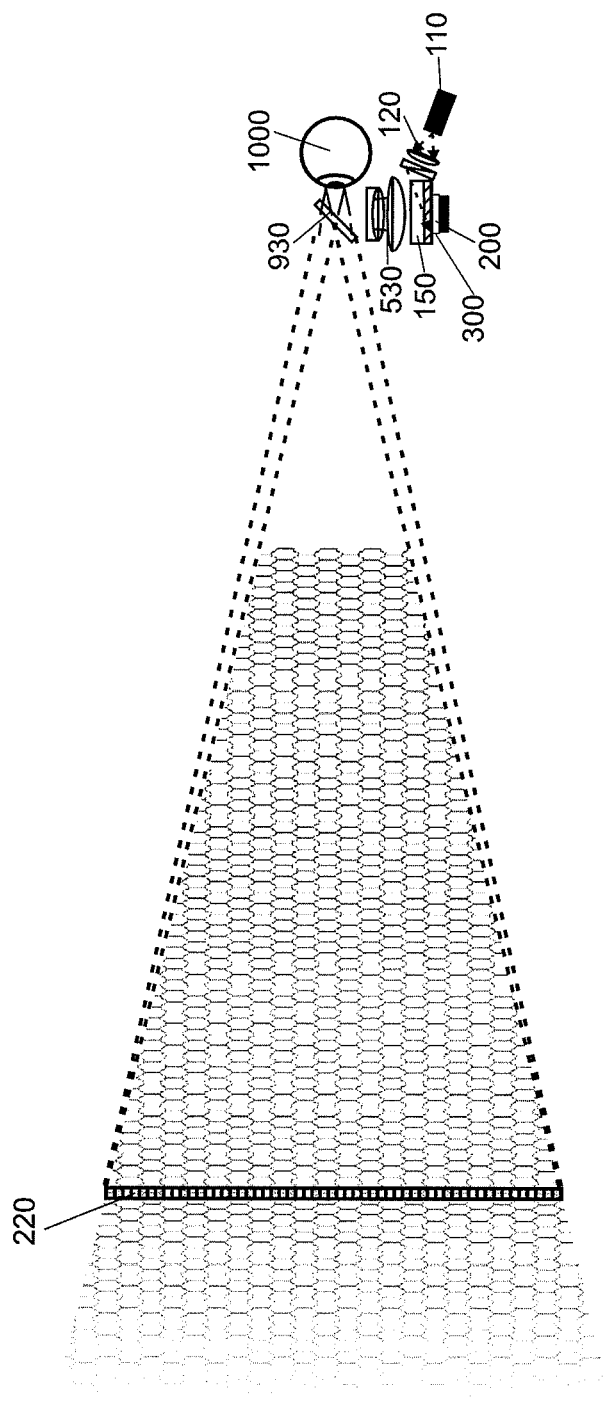
FIG. 5 illustrates the principle of reducing the structural depth through the use of a mirror in front of an optical magnifying system which includes the function of a field lens.

FIGS. 3 to 5 show schematically several typical optical paths for generating a magnified virtual light modulator image as known from the prior art.

FIG. 3 is a top view which illustrates the principle of generating a magnified virtual image 220 of the SLM 200 in the volume of view of a head-mounted display (HMD) or hocular with the example of a non-folded optical path by way of multiple imaging including filtering of higher diffraction orders. The HMD comprises an illumination device 100 which includes a light source 110, for example a laser diode, and a collimation element 120, for example a lens, for collimating the light which is emitted by the light source 110, said illumination device 100 directing plane coherent wave fronts at the controllable spatial light modulator SLM 200. A 4f imaging system 500, which comprises the two lens systems 510 and 520 in this example, is disposed following the SLM 200. It images the SLM 200 as an intermediate image 280. The lens system 500 preferably fulfils a spatial filtering function for higher diffraction orders of the wave fronts which are dynamically modulated by the SLM 200. Suppressing the higher diffraction orders which are caused by the pixel matrix of the SLM 200 is preferable if there is the chance that these diffraction orders get to the entrance pupil EP of the observer eye 1000, which would significantly disturb the quality of the reconstruction. A filter 590 which is necessary for this can, for example, be provided in the form of an aperture mask which is disposed in the common focal point of the lens systems 510, 520.

The 4f imaging system 500 with which the observer eye 1000 sees the image 280 of the SLM 200 as a magnified virtual image 220 is followed in the optical path towards the eye pupil by an optical imaging system with magnifying lens 800.

Alternatively, a compound light modulator image which is generated by the light-deflecting device can also be situated in the place of the SLM 200.

Such a controllable light-deflecting device can preferably comprise at least two controllable layers which can be provided in the form of two controllable liquid crystal layers. One of the layers can optionally comprise a volume hologram with inscribed optical paths.

Moreover, the light-deflecting device can, optionally, partly or fully comprise other light-deflecting elements. These can include, for example, elements with controllably variable wedge angle, as known from applications for image stabilisation in photographic lenses.

Two- and three-dimensional images or reconstructions can be represented in individual regions or in the entire volume of view.

FIG. 4 is another top view which shows the HMD arrangement of FIG. 3 with folded optical path. To achieve this folding, two additional mirrors 920 and 930 are disposed in the optical path for reflecting the coherent wave fronts. Here, the SLM 200 is of a reflective type, for example a reflective liquid-crystal-based light modulator with a silicon substrate (liquid crystal on silicon, LCoS) or a micro-mirror arrangement (micro-electro-mechanical system, MEMS; digital micro-mirror device, DMD) which is illuminated by a flat frontlight unit FLU 150. The coherent light which is emitted by the light source 110, here for example a laser light source, is injected into a wedge-shaped waveguide of the flat frontlight unit 150 through the collimation lens 120 and a tilted mirror 910. The SLM 200 can, in the case of a phase-modulating light modulator, optionally comprise a beam combiner BC 300 in order to obtain complex modulation values for hologram reconstruction.

Again, a compound light modulator image which is generated by the light-deflecting device can alternatively be situated in the place of the SLM 200.

A light-deflecting device can preferably be disposed in a conjugated plane of the SLM.

FIG. 5 illustrates the principle of a single-stage virtual magnification of the SLM 200 in a compact HMD arrangement. A tracking device can be omitted because of the closely spaced situation of the individual components, because of a combination of functions of individual components in at least one common controllable layer and because of the large size of the viewing window. As in FIG. 4, the light which is emitted by the light source 110 and collimated by the collimation lens 120 is directed at the SLM 200 through a flat frontlight unit 150. An optional beam combiner 300 can be disposed in front of the SLM 200 to combine the light which has been modulated by multiple modulator cells to form a common complex hologram value. The spatial light modulator SLM 200 is imaged into a plane within the focal length of a magnifying lens, which is preferably provided in the form of a magnifying optical imaging system. The wave fronts propagate further along the optical path through the mirror 930 to the eye pupil of the observer eye 1000 which perceives the virtual image 220 of the SLM 200 in a plane which serves as a screen in the volume of view. Diffractive optical systems in the form of volume gratings are well suited, for example, for compact optical paths which implement the foregoing principle.

As shown in FIGS. 3 and 4, a compound light modulator image which is generated by a light-deflecting device can alternatively be situated in the place of the SLM 200.

If the mirror 930 in FIGS. 4 and 5 is of a semi-transmissive or controllably semi-transmissive type, then AR applications are possible as well.

Figure 6:
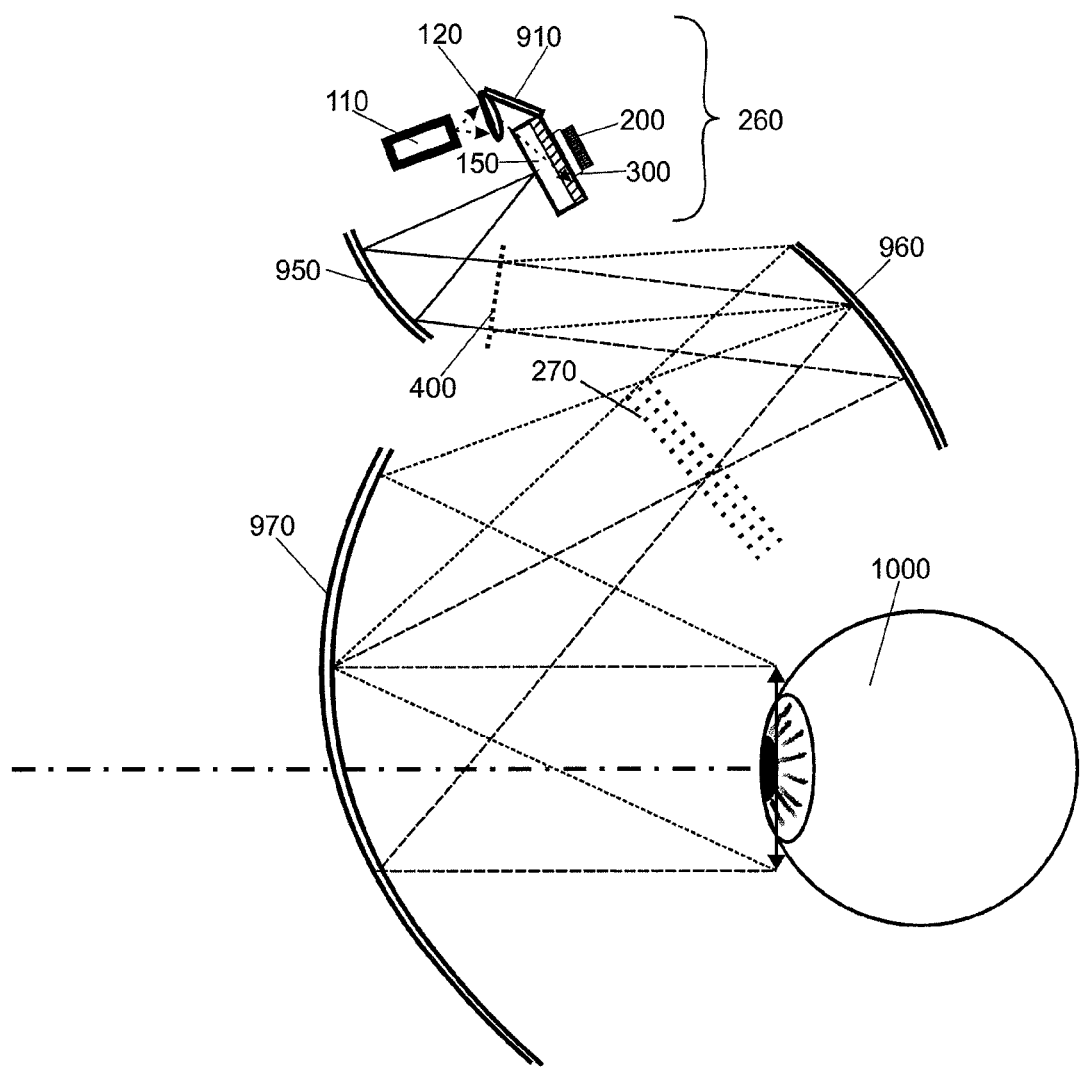
FIG. 6 shows an embodiment of the invention with curved mirrors for reducing the structural depth, FIGS. 7, 8 serve to compare the required size of the device when a light-deflecting device is disposed in front of and behind an optical magnifying system which includes the function of a field lens, respectively.

FIG. 6 shows a holographic projection system. The SLM 200 is illuminated with light which emitted by the light source 110 and which propagates through the collimation lens 120, the tilted mirror 910 and a flat frontlight unit 150, just to give an example. A beam combiner 300 can, optionally, be disposed in front of the SLM 200. The magnified virtual compound image of the SLM 200, which is not shown in this drawing, appears, for example, in the size of a 42" display at a distance of 1 m. In that plane, it represents, for example, a dynamic 3D picture frame.

The optical path comprises a system of mirrors 950, 960, 970 and a controllable light-deflecting device 400 which serves to at least duplicate the spatial light modulator SLM 200. Here, the light-deflecting device 400 is preferably as a single layer, because the light modulator image only has to be deflected, not to be offset. In the intermediate image 270, the individual light modulator images are situated side by side.

The light-deflecting device 400 can also be designed to comprise a static light-deflecting device in conjunction with a controllable segmented shutter panel.

The projection system can still further be designed to have a shutter array in the plane of the viewing window in order to suppress higher diffraction orders.

The mirror 970 can, for example, be replaced by a refractive component. The beams which come from the SLM 200 and which hit that component are in this case reflected towards the entrance pupil EP of the observer eye by way of total internal reflection (TIR). This way, a (semi-)transmissive display is realised. A shutter which can be switched on as the case may be can serve to activate and deactivate this option.

The function of the system if mirrors 970 can, for example, also be realised with the help of a reflective volume hologram. The angular and wavelength selectivity can be limited such that a transmissive display is realised. Again, an additional shutter may be used here.

Figure 7:
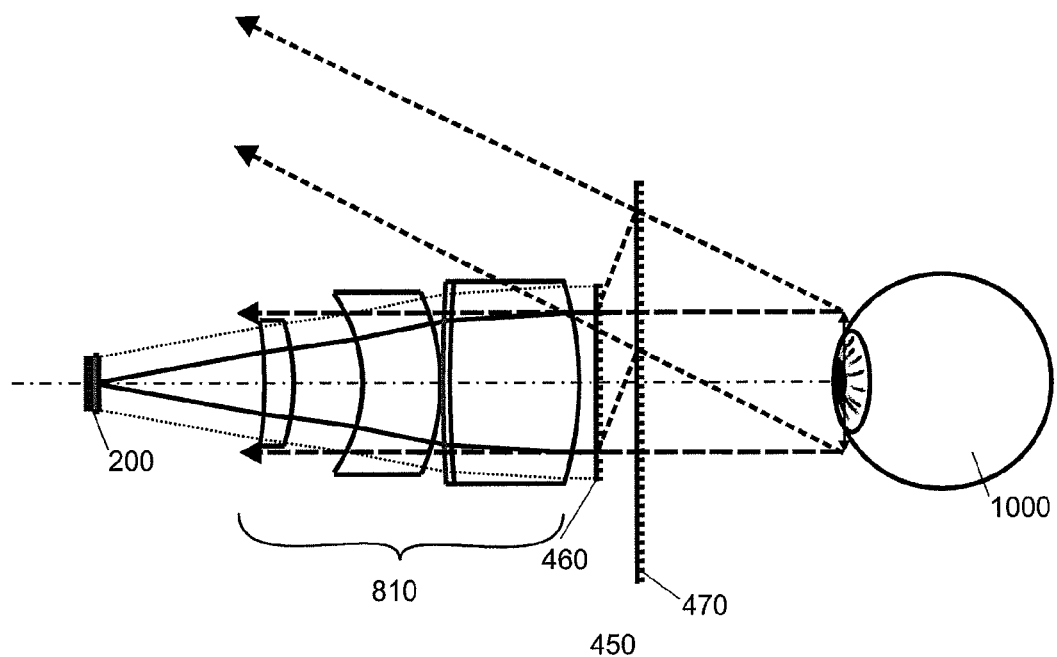

FIG. 7 shows schematically another embodiment where a light-deflecting device 450 is disposed behind a field lens. The light-deflecting device 450 contains, as for example in FIG. 1 or FIG. 2, a first and a second light-deflecting means 460 and 470, of which at least one is of a controllable type.

The light-deflecting device 450 can also be combined with a tracking device which tracks the viewing window to the eye or eye pupil movements of the observer eye 1000 to form a light-deflecting and tracking unit. With such an arrangement, a magnifying lens 810 that is disposed between the SLM 200 and the light-deflecting device 450 can be kept very small, compared to an arrangement where a light-deflecting device is disposed in front of a lens system.

It is also possible to dispose a real field lens in the plane of the SLM 200.

Figure 8:
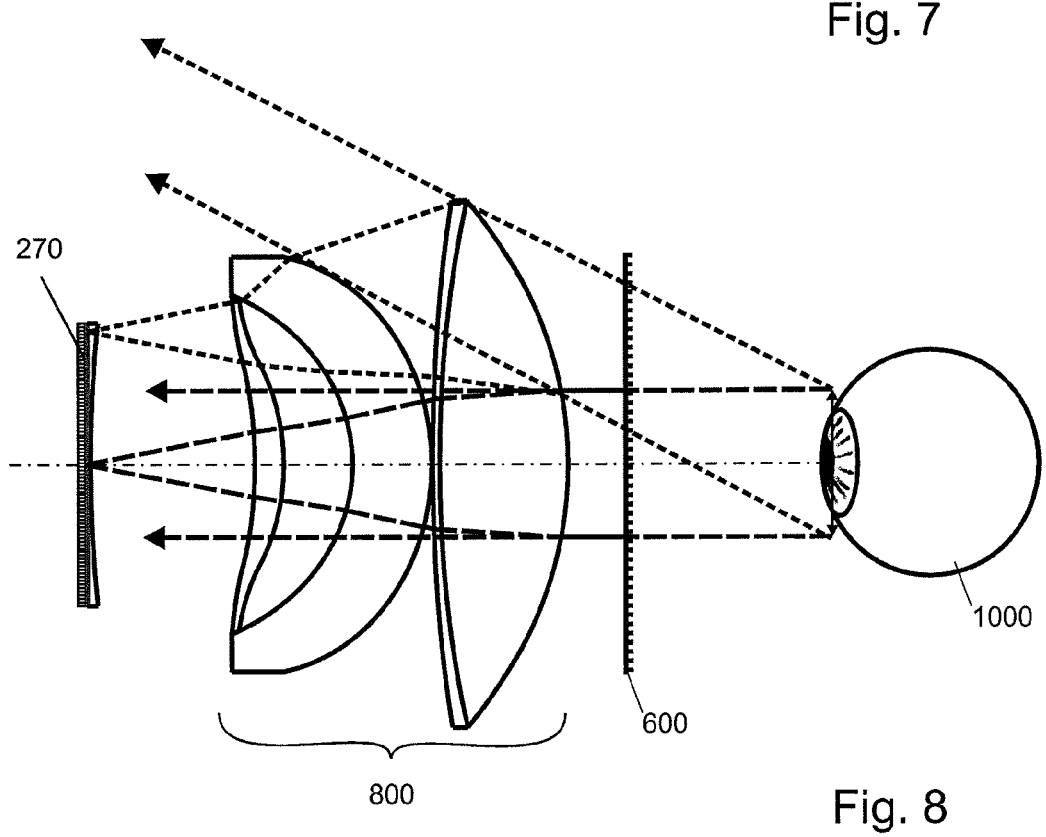

FIG. 8 illustrates the structural dimensions of an optical imaging system with magnifying lens 800 as used in the embodiments described in conjunction with FIGS. 3 and 4. Owing to the fact that it is already the compound intermediate image 270 of an SLM (not shown) that is imaged by this system, the required lens diameter is much larger at a comparable size of the SLM and at comparable imaging relations.

An optional tracking device 600 can be disposed in the optical path between the optical imaging system with magnifying lens 800 and the observer eye 1000.

Figure 9:
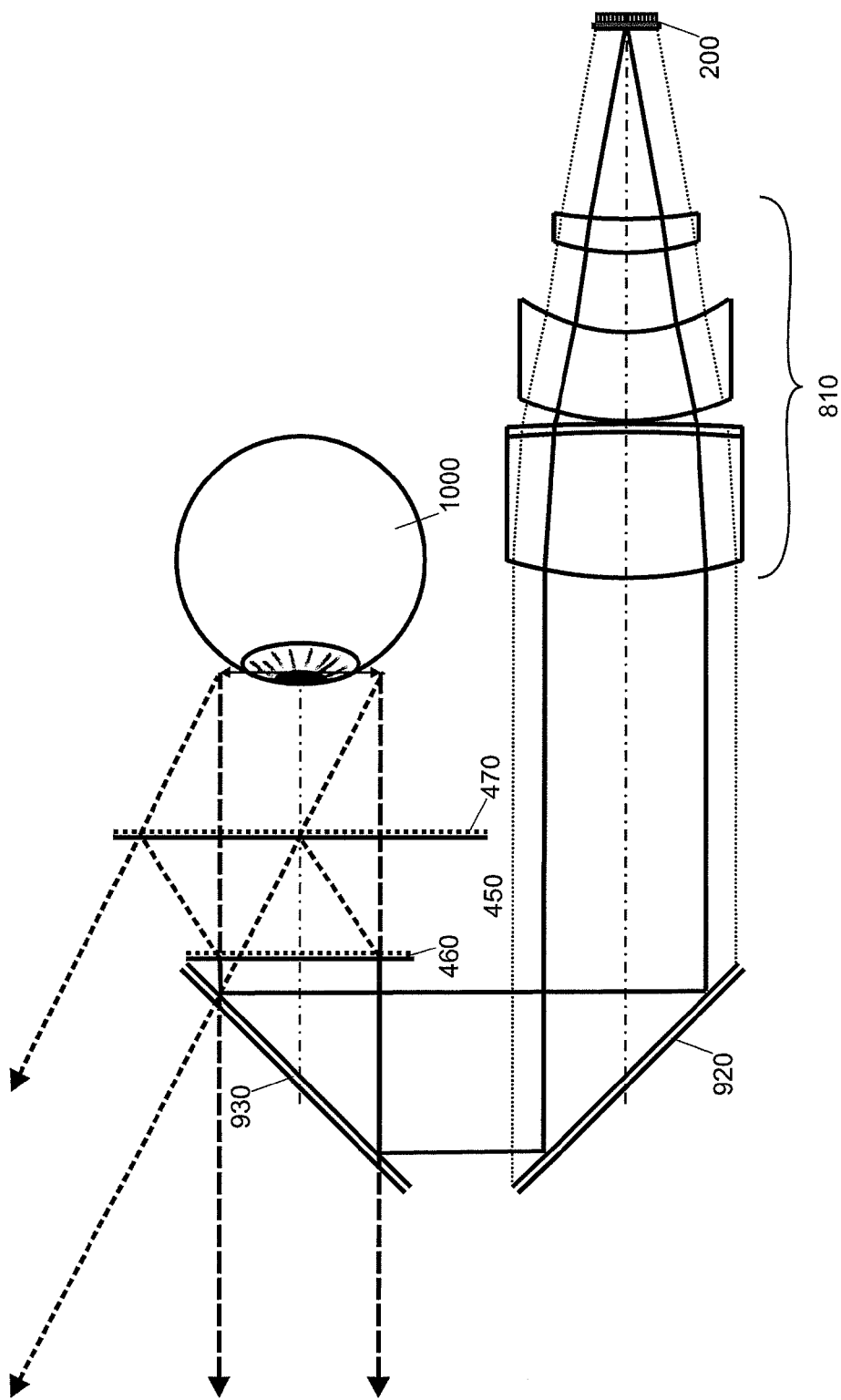
FIG. 9 illustrates the use of tilted mirrors to reduce the structural depth in an arrangement where a light-deflecting device is disposed behind a magnifying lens.

FIG. 9 shows schematically how the structural depth can be reduced through the use of two mirrors 920, 930 in an embodiment where the light-deflecting device 450 is disposed behind the magnifying lens 810 for the SLM 200. Here again, the magnifying lens 810 and the mirrors 920, 930 for beam deflection only need to have very small diameters, because the multiple imaging of the SLM 200 through the light-deflecting device 450 is only performed downstream of these components. The tilted mirror 930 can also be of a semi-transmissive or switchably or controllably semi-transmissive type so to provide for AR applications.

Figure 10:
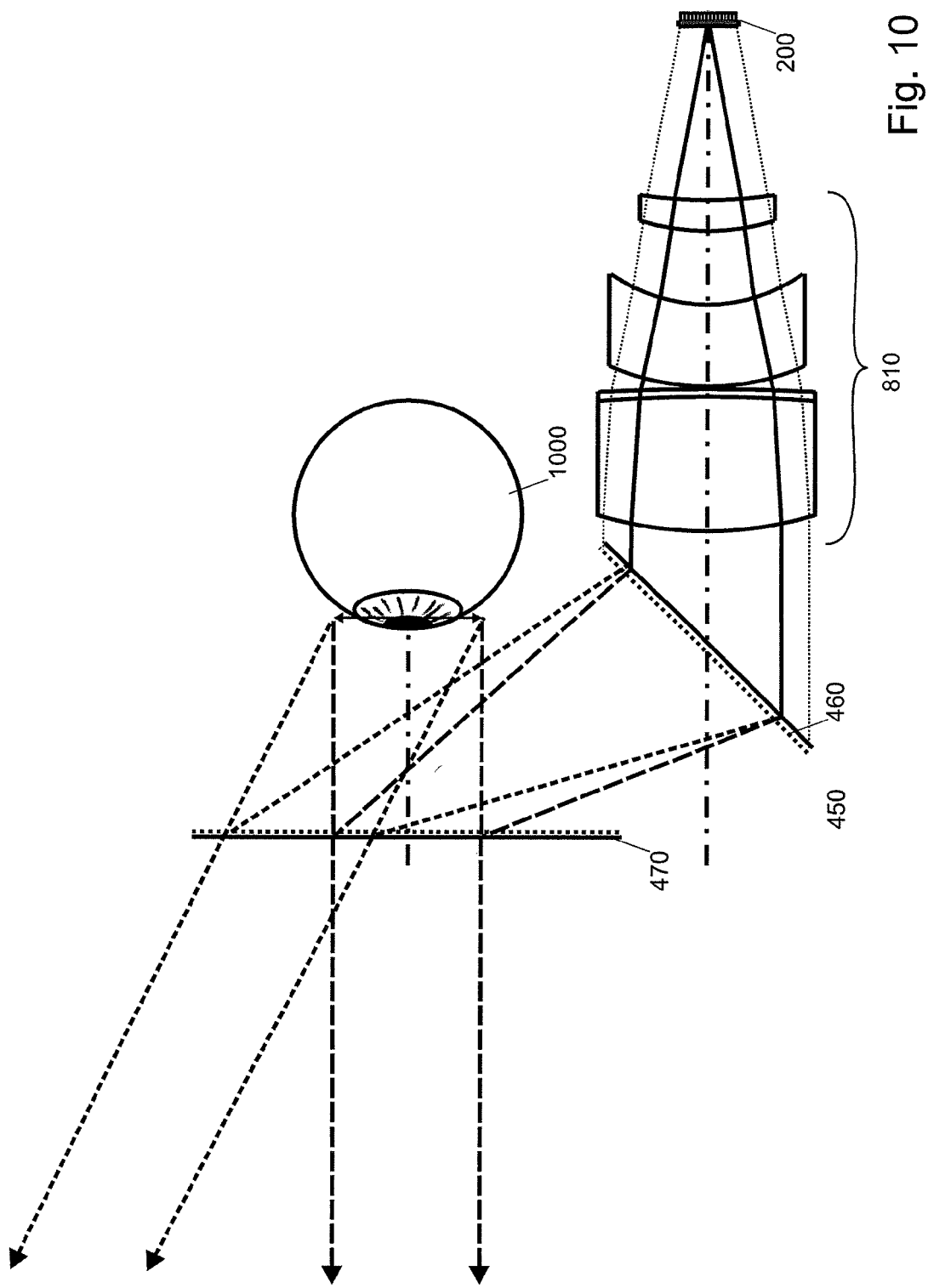
FIG. 10 illustrates the use of light-deflecting means of a light-deflecting device for reducing the structural depth, where the zeroth diffraction order is not used.

FIG. 10 illustrates a particularly preferable embodiment, where the tilted mirrors are at the same time part of the light-deflecting device 450. At least one light-deflecting means 460, 470 of the light-deflecting device 450 is of a controllable type so to provide for multiple imaging of the SLM 200 in time division multiplexing mode. This is preferably the light-deflecting means 460, while the component 470 is a reflective hologram which includes multiple reconstruction geometries. The magnifying lens 810 arranges for the observer eye 1000 to perceive the multiple image at the defined virtual observer distance. The light which passes through the light-deflecting means 460, 470 without being deflected, i.e. the zeroth diffraction order, is not used and can be suppressed with the help of suitable absorbing or filtering means so that it does not proceed to the observer eye 1000. This makes it possible to use fixed or variable diffraction gratings which only have a low diffraction efficiency in the light-deflecting means 460, 470. The light-deflecting means 460 is provided in the form of a transmissive hologram into which several directions of deflection are inscribed. Alternatively, it can deflect light in a controllable manner. These light-deflecting means 460, 470 can also comprise matrix arrangements of a multitude of cells which are controllable or switchable in one or two dimensions in order to enable and to support additional field lens or correction functions. It is again possible to dispose a real field lens in the plane of the real SLM 200.

Diffractive or refractive deflection means can also be used instead of volume gratings. Such layers can for example comprise switchable or controllable electrowetting cells which fulfil a variable wedge function.

Figure 11:
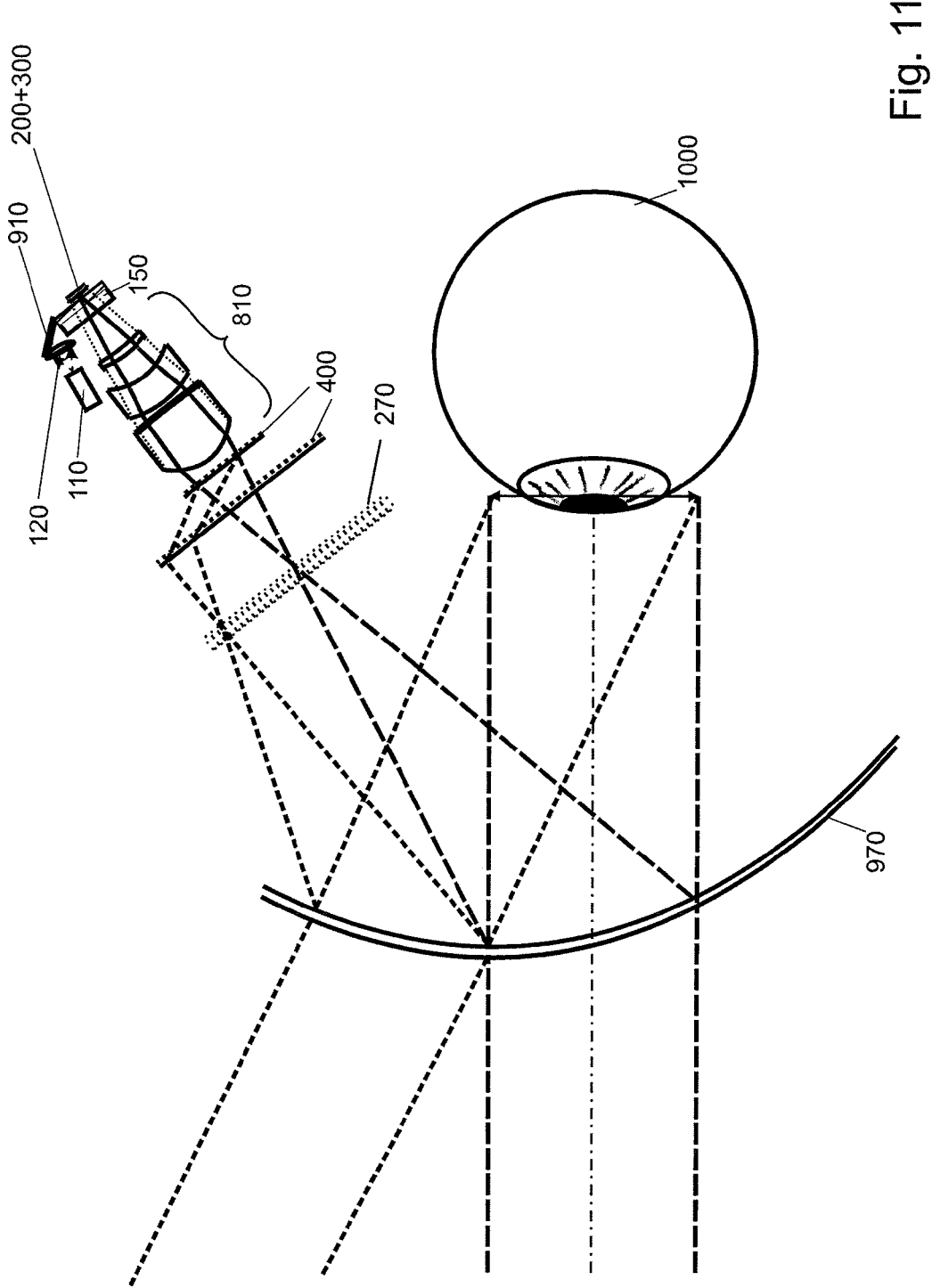
FIG. 11 illustrates the use of curved mirrors to reduce the structural depth combined with a light-deflecting device which is disposed behind the magnifying lens.

FIG. 11 shows schematically the use of a curved mirror 970 for the purpose of reducing the structural depth in conjunction with the light-deflecting device 400 for multiple imaging of the SLM 200 behind the magnifying lens 810. Just to give an example, the SLM 200, which is of a reflective type here, is illuminated with light which is emitted by the light source 110, that can, for example, be a laser light source, and which propagates through the collimation lens 120, the tilted mirror 910 and the flat frontlight unit 150. The SLM 200 is imaged multiple times side by side in one or two dimensions by the magnifying lens 810 and the light-deflecting device 400 so to form a real compound intermediate image 270 which represents a high-resolution spatial light modulator. The holographic reconstruction which is generated by the compound spatial light modulator is perceived in an even more magnified fashion through the curved mirror 970. To be able to generate a high-quality holographic reconstruction, the SLM 200 can be followed by a beam combiner 300, as in all the other embodiments, in order to obtain complex modulation values of high quality.

Figure 12A:
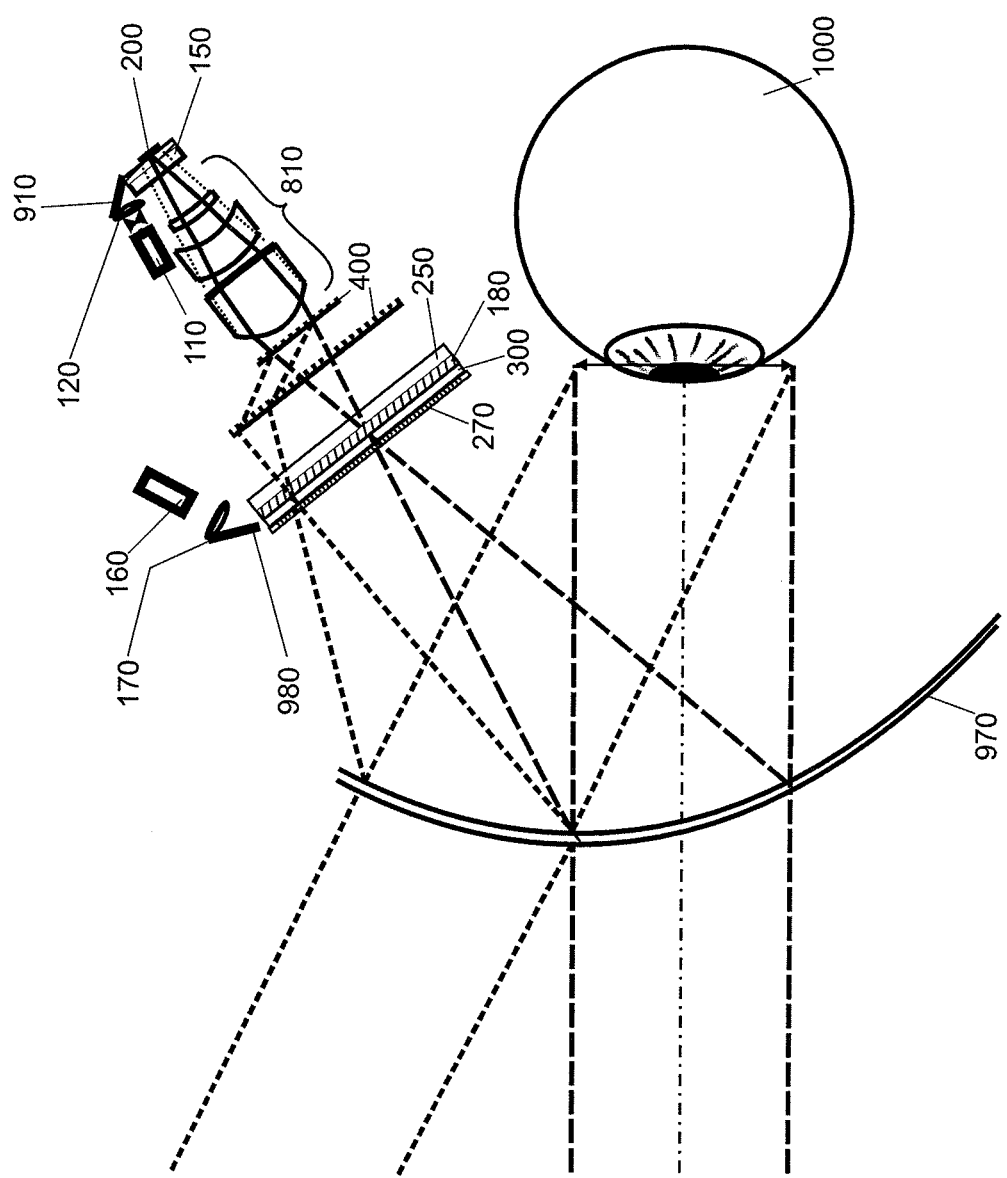
FIG. 12a illustrates the use of a light-deflecting device for multiple imaging of an amplitude-modulating light modulator onto an optically addressable spatial light modulator.

FIG. 12a shows an embodiment which is slightly modified compared to that in FIG. 11. Here, an optically addressable spatial light modulator (OASLM) 250 is disposed at the position of the intermediate image 270. The SLM 200 is sequentially imaged multiple times side by side onto it by the optical imaging system 810 and the light-deflecting device 400. The light-deflecting device 400 can additionally have imaging properties or even replace the entire optical imaging system 810. The optical imaging system or the additional imaging function can also demagnify the image in order to realise a narrow imaging grid on the OASLM 250.

The OASLM 250 forms a secondary high-resolution spatial light modulator. The holographic information which is written to the OASLM 250 by way of multiple imaging of the SLM 200 is perceived by the observer eye 1000 in a magnified fashion as a reconstruction of a three-dimensional scene through the curved mirror 970. A coherent light source 160, which is preferably a laser light source, illuminates the OASLM 250 through a collimation lens 170, an optional tilted mirror 980 and a flat frontlight unit 170 for reading out the compound information that was written by the SLM 200 for holographically reconstructing the three-dimensional scene.

When using a transmissive OASLM, a backlight unit (BLU) can be used instead of the frontlight unit. The OASLM can be followed in the direction of propagation by a beam combiner 300.

Figure 12B:
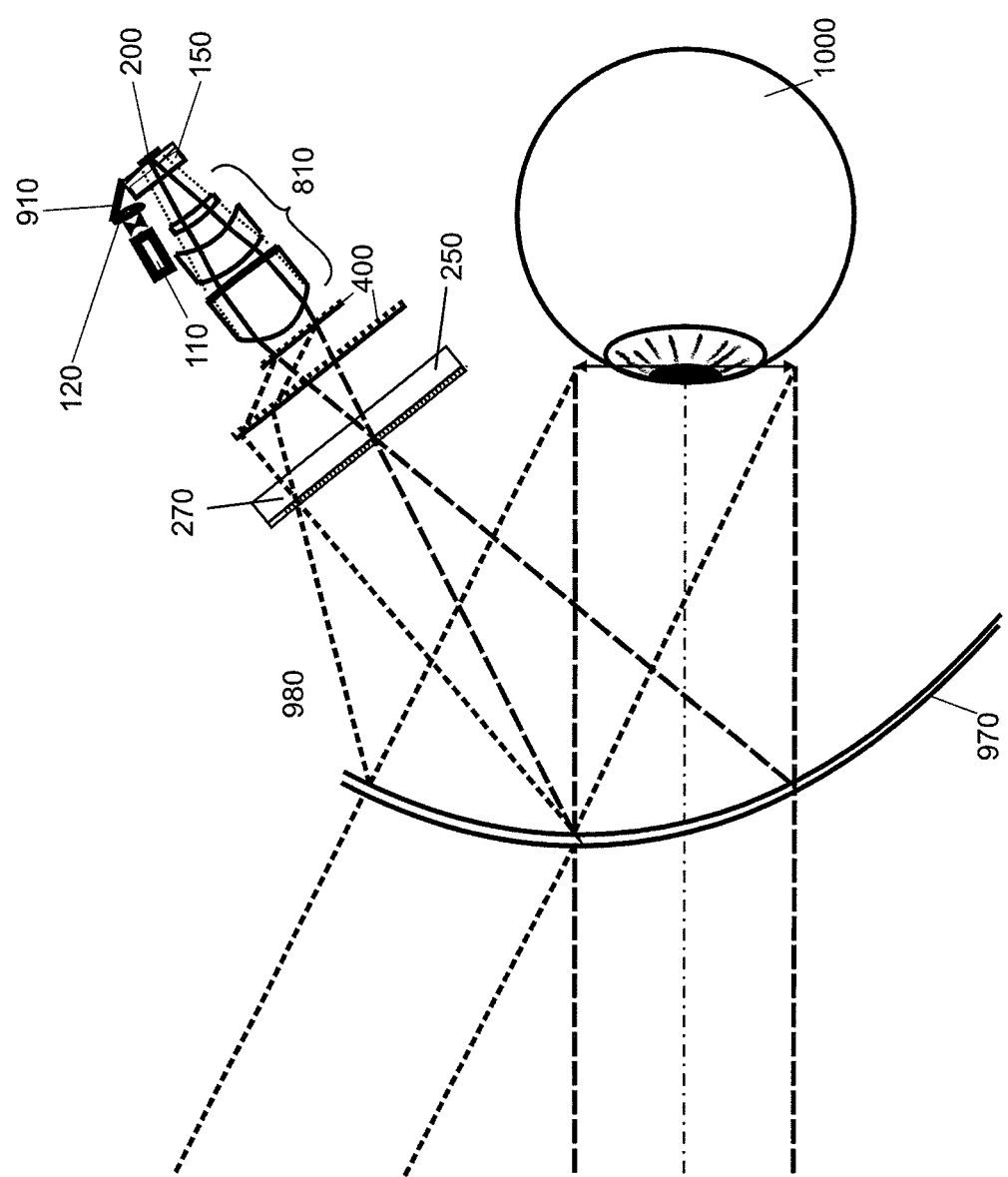
FIG. 12b illustrates the use of a light-deflecting device for multiple imaging of an amplitude-modulating light modulator onto an optically addressable spatial light modulator, which—together with the electrically addressable spatial light modulator which writes the phase values onto the optically addressable spatial light modulator—represents a complex light modulator during readout.

In a particularly preferred embodiment, which is illustrated in FIG. 12b, the OASLM 250, which comes in the form of a transparent phase-modulating light modulator, is read out by the SLM 200, which is an amplitude-modulating light modulator and which serves for both writing phase values to the OASLM 250 and reading out corresponding phase values with the amplitude values written to the SLM 200. Both modulators together thus form a complex-valued light modulator. This makes a beam combiner redundant. At the same time, the spatial resolution rises because it is no longer necessary to use multiple modulator cells of the SLM 200 to write one complex value.

Writing the phase values can be performed using a different wavelength than that used for reading out the phase values with the amplitude values. The photoconductor of the OASLM 250 can then be sensitive to the inscription wavelength only, which can be in the near UV range, for example. The individual regions of the OASLM 250 into which the SLM 200 is sequentially imaged can also be designed such that they are individually sensitised for a writing operation or that they can be switched to inactive mode during readout while the inscribed phase information remains stored. The OASLM 250 is preferably designed such that it can be deleted wholly or in individual segments through a deletion pulse after having completed a readout operation. Alternatively, readout operations can be performed using very short light pulses. The photoconductor then has enough time for the 'old' charge carriers to be discharged, e.g. during the time when one or all the other segments and written and/or read out, because this region of the OASLM 250 is not illuminated during that period of time. In a colour representation, which is the preferred type of representation, the individual colour layers are also generated sequentially.

Figure 13:
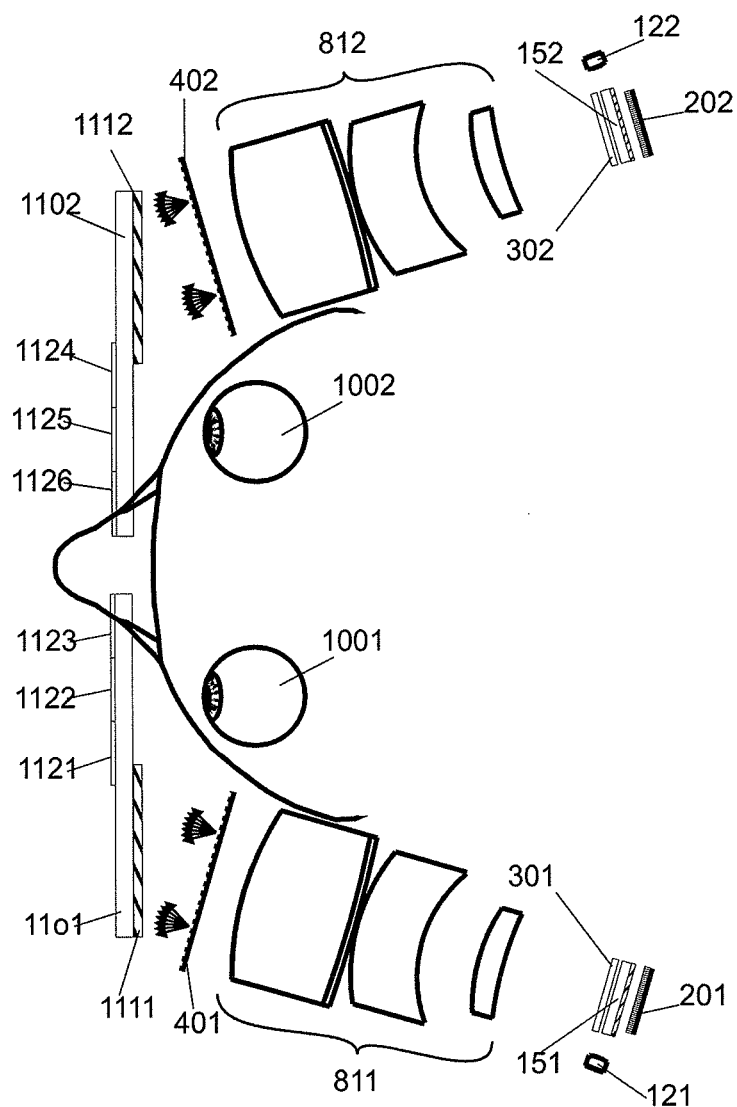
FIG. 13 illustrates the use of a light-deflecting device for multiple imaging through a thin waveguide.

FIG. 13 shows schematically how a virtual high-resolution compound SLM image is generated for an observer's left and right eye 1001, 1002 through respective thin waveguides 1101, 1102. A binocular arrangement, as shown here, is the preferred option of a holographic HMD and all embodiments described herein.

The optical components for the left and right observer eye 1001, 1002 are largely identical, or of mirror-symmetrical design. For this reason, only the channel for the left observer eye 1001 will now be described exemplarily. An SLM 201, which is here, for example, of a reflective type, is illuminated through a flat frontlight unit 151. For this purpose, coherent light which is emitted by a light source (not shown) is injected into the frontlight unit through a collimation lens 121. The SLM 201 can be followed in the direction of propagation by a beam combiner 301. The modulated wave front which is emitted by the SLM 201 propagates through a magnifying lens 811 to a light-deflecting device 401. The latter sequentially generates different angular spectra which are injected into the thin waveguide 1101, which is known as such in the prior art, at a flat angle through an optical input coupling component 1111, which is preferably a volume grating, so that the light of all input coupling angles propagates in the direction of the waveguide 1101 by way of total internal reflection at the two parallel interfaces of the waveguide 1101. The waveguide 1101 does not necessarily have to be fully plane, it can alternatively also have a curved surface. The light of a certain angular spectrum which is generated by the light-deflecting device 401 is coupled out of the waveguide 1101 through multiple reflective volume gratings 1121-1123, each of which serving a different angular range, towards the observer eye 1101. The observer eye 1101 now perceives the reconstruction of the holographic information which is written to the SLM 201. This reconstruction is sequentially generated through the magnified virtual compound image of the SLM 201.

The light-deflecting device 401 can here only comprise one light-deflecting means, which preferably includes a controllable diffractive liquid crystal grating with a variable grating period. The reflective output coupling gratings 1121-1123 form the second layer of the light-deflecting device 401. They can also be provided in the form of dielectric layer stacks. Their function is to give light of a defined angle of incidence a defined exit angle, i.e. a defined output coupling angle, at any defined position along the waveguide 1101.

The input coupling grating 1111 can also be of a reflective type, it is then disposed on the far side of the thin waveguide 1101 seen from the light-deflecting device 401. Further, the output coupling gratings 1121-1123 can be of a transmissive type, they are then disposed on the side of the thin waveguide 1101 which faces the observer eye.

The light-deflecting device 401 can alternatively be disposed between the optical imaging system 811 and the SLM 201, which, however, would cause an increase in the size of the optical imaging system. If the light-deflecting device 401 is made up of two layers at that position, it can directly generate the temporally and spatially shifted multiple image, which would, however, in turn require a larger input coupling grating 111. If the light-deflecting device 401 is of a single-stage design at that position, then the virtual images of the SLM segments will, in contrast to the diagram in FIG. 8, not lie in one plane but be tilted by a certain angle with respect to each other. This must be allowed for when generating the hologram values.

In the arrangements according to FIG. 13, the SLMs 201, 202 can also each be followed by a beam combiner for generating complex hologram values.

As in FIG. 12, OASLMs can be used here too for generating the holographic reconstructions. In the case of fast electrically addressable SLMs for inscribing the OASLM or, as described in FIG. 12, for generating complex hologram values, the multiple imaging process can also comprise two stages with one light-deflecting device being disposed between the electrically addressable SLM and optically addressable SLM and another one following the OASLM. The OASLMs used shall then also have a very high switching frequency, i.e. they must be able to work at a high refresh rate.

In a particularly preferred embodiment of the display device, the light-deflecting device 400, 401, 402, 450 is designed such that an at least one-dimensionally segmented multiple image of the spatial light modulator 200, 201, 202, 206, 207, 250 is generated sequentially in a controlled manner in a flat waveguide.

Now, a number of further embodiments will be described schematically which are particularly suited for stationary or portable holographic display devices where the observer eye is situated near an ocular (hocular). Owing to the fact that the these devices do not make such high demands on compactness, it is at least partly possible to use preferably non-folded optical paths and systems with multi-stage imaging solutions. Aberrations can then be corrected more easily, in particular in the case of very large magnification.

FIG. 14 shows schematically the use of a light-deflecting device 400 in a system with multi-stage imaging solution.

A light modulator unit 260, for example as shown in more detail in FIG. 6, is disposed in front of a telescopic imaging system, which comprises the two lens arrangements 510, 520 and in whose common focal plane an aperture mask 590 is disposed. This optical imaging system images the SLM of the light modulator unit 260 into the object plane of the optical imaging system with magnifying lens 800, which corresponds substantially to that shown in FIG. 8 and which is situated in front of the observer eye 1000.

Depending on the desired total magnification and on the pitch of the SLM, the image can be magnified, demagnified or projected 1:1 in the first stage. Anamorphic imaging is also possible. The SLM is imaged multiple times into the object plane of the optical imaging system with magnifying lens 800 as a compound intermediate image 270 by the light-deflecting device 400. The light-deflecting device 400 here comprises a controllable liquid crystal grating with variable spacing as an example of the first light-deflecting means 410, and a multiplex volume grating as an example of the second light-deflecting means 420, where individual volume gratings are inscribed into the multiplex volume grating for each partial image or segment and for each imaging wavelength. The volume grating which is required for the particular image segment and wavelength is then selected by the diffraction angle of the first light-deflecting means 410 and by the wavelength of a colour-division multiplex light modulator unit 260. The light-deflecting device 400 can also perform or at least support anamorphic imaging.

If a light modulator unit 260 comprises, for example, holographic optical elements (HOE), which are preferably provided in the form of volume gratings, then it is, for example, also possible that, as an alternative to collimated illumination, an angular spectrum of plane waves, as is required for one-dimensional holographic encoding, is used specifically in conjunction with a collimation unit. Moreover, the illuminating wave field can also comprise curved wave fronts, including, for example, spherical waves, which does not only increase the luminous intensity that propagates through the optical system, but also provides an opportunity to correct aberrations in the system. A local deviation of the wave front normal on the SLM can, for example, specifically be corrected with the illuminating wave front. Spherical aberrations and/or erroneous brightness distributions in the compound light modulator image can be corrected this way, for example.

The light-deflecting device 400 can generally fulfil additional correction and wave front forming functions. The required volume gratings can be manufactured by way of inscribing a hologram directly in the assembled optical arrangement, where the desired output distribution serves as a reference wave for exposure. Any kind of aberration which occur in the system can be allowed for during such an in-situ exposure or inscription. If aberrations are known, for example, from simulations of an optical design programme that was used, then it is possible to obtain corrective computer-generated holograms (CGH) based on information on those aberrations and on the reference values. These CGHs can, for example, be used when inscribing the volume holograms or be disposed directly in the optical path.

In contrast to FIG. 14, FIG. 15 illustrates the situation where a light-deflecting device is disposed between an observer eye 1000 and the magnifying lens 810 in a two-stage imaging solution. The magnifying lens of the second imaging stage is here largely identical to that in FIG. 7. However, it does not image the SLM directly in a magnified manner, but rather an intermediate image 280 of it. This intermediate image 280 of the SLM of the light modulator unit 260 is generated by the telescopic imaging system which comprises the lens arrangements 510, 520. Again, an aperture mask 590 can preferably be disposed in the common focal plane of the lens arrangements 510, 520 for suppressing higher diffraction orders which are caused by the SLM grid. The first stage here is largely identical to the first stage in FIG. 14.

As shown in FIG. 7 in contrast to FIG. 8, the numerical aperture of the second stage of FIG. 15 can be reduced compared with that in FIG. 14, because the light-deflecting device is only disposed behind that lens arrangement.

The first stage of imaging the SLM of the light modulator unit 260 to generate the intermediate image 280 can, for example, also be realised by the first lens arrangement 510, which is corrected to infinite space, and the second lens arrangement 520, which generates an image similar to a tubular lens used in modern microscopes. The aperture mask 590 which serves to filter the viewing window can, for example, be disposed in the rear focal plane of the first lens arrangement 510 and thus in the first Fourier plane of the SLM.

Since the 3D object is represented holographically, it is possible to allow for aberrations such as field curvature when encoding the object points, for example to be able to represent flat, non-warped plane surfaces.

Aberrations, which may be different in each segment of the multiple image of an SLM, can also be compensated when encoding the 3D scene or using additional correction elements, which are not shown here. These elements can, for example, also correct the amplitude in addition to correcting the phase and locally occurring angular deviations. Such a correction element can, for example, be disposed near the intermediate image 280. It can, for example, be a phase correction plate, which exhibits an adapted corrective amplitude distribution in addition to an adapted corrective phase distribution.

Besides the preferable use of controllable diffractive gratings, which can also be used in combination with multiplex volume gratings, other suitable light-deflecting means can be used or combined in the light-deflecting device 400.

Prisms with controllable wedge angle, as those used in image stabilisation applications, can, for example, well be used as controllable light-deflecting elements. They can also preferably be used for the above-mentioned tracking of the viewing window to the eye movements if the viewing window is too small to provide for comfortable viewing of 3D reconstructions.

Figure 16:
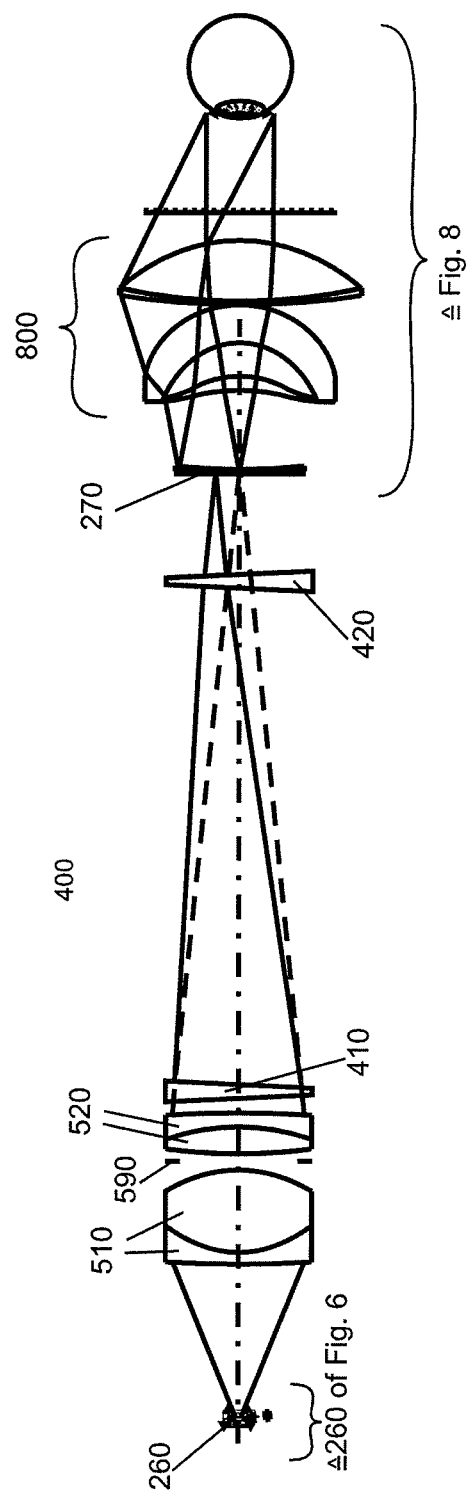
FIG. 16 illustrates the use of at least two variable wedges in a light-deflecting device for multiple imaging between a telescopic imaging system for imaging the light modulator and an optical imaging system with magnifying lens.

FIG. 16 illustrates schematically such a device with a first and a second controllable light-deflecting means 410, 420 in a light-deflecting device 400, which are provided in the form of controllable prisms with variable wedge angle. To achieve multiple imaging of the SLM of a light modulator unit 260, they are disposed between a telescopic imaging system, which comprises the two lens arrangements 510, 520, and an optical imaging system with magnifying lens 800 as shown in FIG. 8. The multiple image is generated in the form of an intermediate image 270. The telescopic imaging system can again include an aperture mask 590. The sequentially segmented generation of a volume of view can be achieved solely with refractive elements, as is shown here. The controllable wedge angle range of the variable prisms can be reduced by way of extending the structural depth of the device.

In devices which only require the optical path to be tilted and not to be shifted, one such light-deflecting means will be sufficient.

Lenses which can be shifted controllably can be used as a further light-deflecting means. These lenses can preferably also be provided in the form of diffractive optical elements in order to realise low moments of inertia and thus high acceleration of a translatory or rotary movement. It can here be preferable to image the SLM onto the shiftable diffractive optical elements in a demagnified manner with the aim of further reducing the size and thus the weight of the device.

Further, it is possible to use arrangements with tilted or lifted mirrors or arrangements with rotating polygon mirrors in order to achieve multiple imaging of an SLM in conjunction with synchronised illumination.

Figure 17:
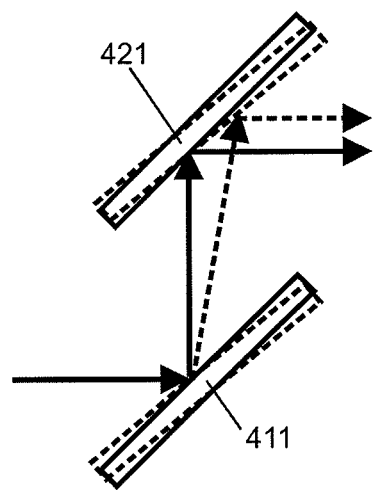
FIG. 17 illustrates an arrangement used to achieve a fast offset of pencils of rays using two tilted mirrors which can be twisted concordantly in a controlled manner for use in a light-deflecting device for multiple imaging.

FIG. 17 illustrates the principle of a beam offset with the help of two controllable tilted mirrors 411, 421, which can be twisted concordantly at high speed.

Figure 18:
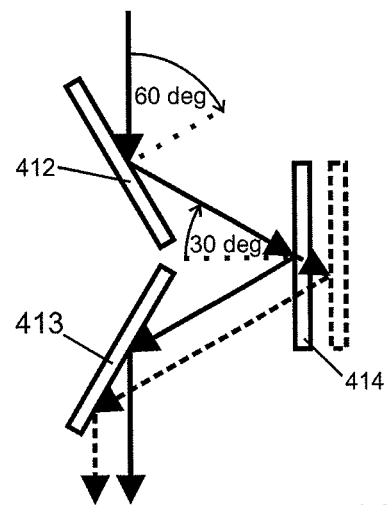
FIG. 18 illustrates an arrangement used to achieve a fast offset of pencils of rays using a fast lifted mirror for use in a light-deflecting device for multiple imaging.

FIG. 18 illustrates an arrangement used to achieve a fast offset of pencils of rays using a fast controllable lifted mirror 414 for use in a light-deflecting device for multiple imaging. The controllable tilted mirror 414 is disposed in front of two tilted mirrors 412, 413.

The arrangements according to FIGS. 17 and 18 can also be combined in order to achieve an additional tilting of the optical path in a controllable way. This can, for example, provide for additional tracking.

Figure 19:
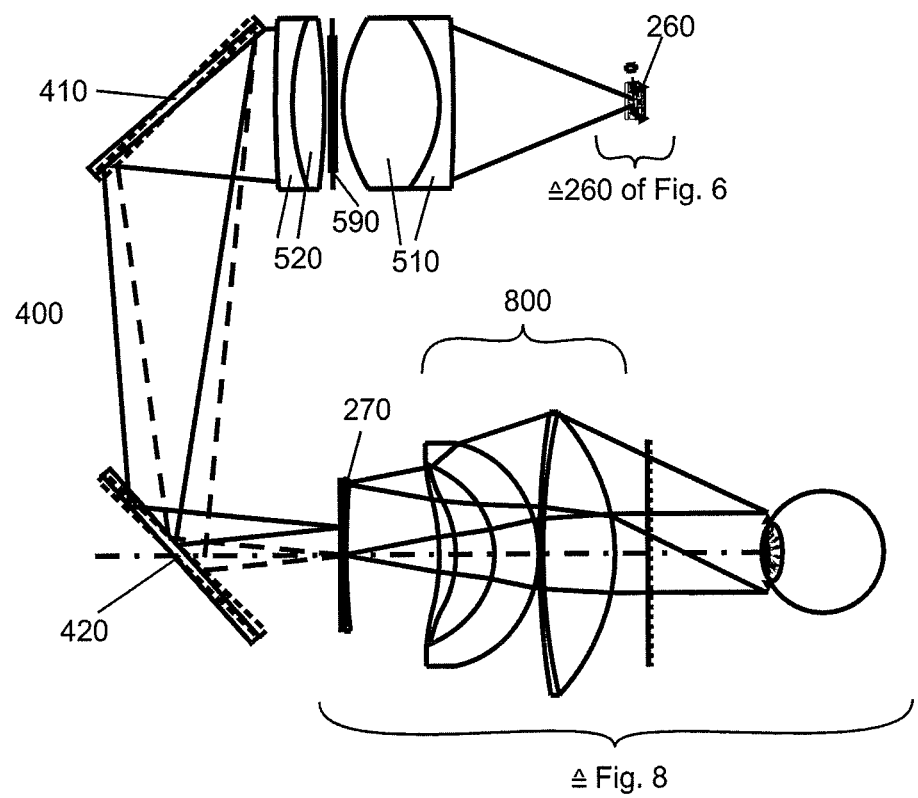
FIG. 19 illustrates the use of a light-deflecting device for multiple imaging with two controllable tilted mirrors which can be twisted concordantly in a two-stage optical imaging system.

FIG. 19 shows schematically the use of two light-deflecting means 410, 420 to form the light-deflecting device 400 in a two-stage optical imaging system, said light-deflecting means being provided in the form of twistable tilted mirrors. They are also twisted concordantly, as shown in FIG. 17, but reverse the direction of light propagation in contrast to the former. Similar to the situation shown in FIG. 16, they are disposed between a telescopic imaging system with the two lens arrangements 510, 520 and an optical imaging system with magnifying lens 800 as shown in FIG. 8, to achieve multiple imaging of the SLM of a light modulator unit 260. Again, an additional aperture mask 590 may be used here. The multiple image is generated in the form of an intermediate image 270. The arrangement with the two tilted mirrors 410, 420 allows the optical path to be folded and thus the structural depth of the device to be reduced.

If such folding is not required, then it is also possible to use a controllably rotatable coplanar plate to achieve this beam offset. This plate is preferably of an achromatic type. Rotation angle, refractive power and thickness of the plate define the beam offset. If a lens, which can also be of an achromatic type, is used instead of the coplanar plate, then it is possible to realise an additional field lens function in one or two directions. Such an arrangement is also well suited, if necessary, for tracking the viewing window to the eye movement, because it only requires lower manipulating speeds.

Figure 20:
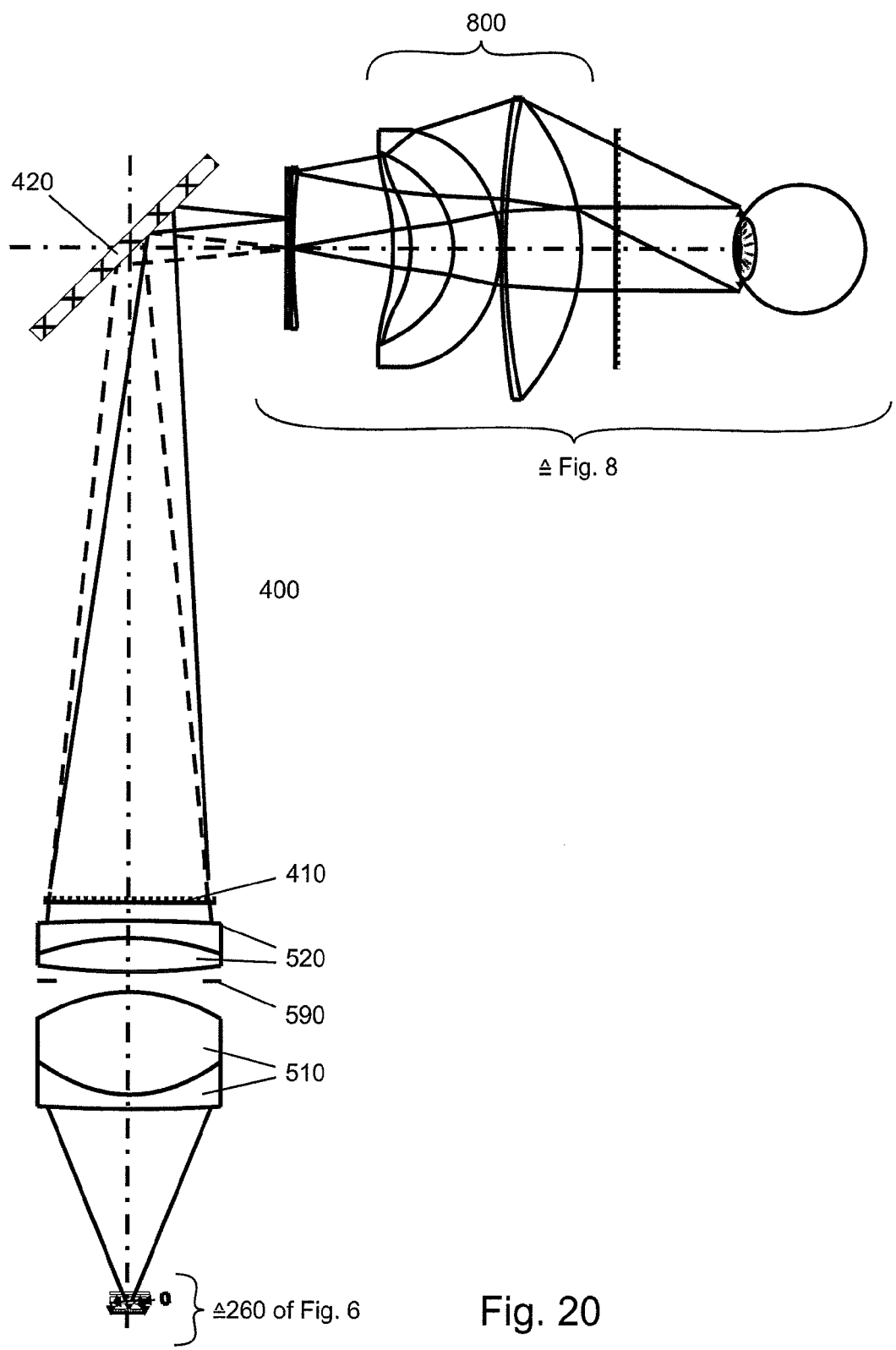
FIG. 20 illustrates the use of a light-deflecting device with a controllable deflection grating and a multiplex reflection volume grating for multiple imaging in a two-stage optical imaging system.

FIG. 20 illustrates the use of a light-deflecting device 400 with two light-deflecting means 410, 420, which are provided in the form of a controllable deflection grating and a multiplex reflection volume grating, for multiple imaging in a two-stage optical imaging system. Using a reflective volume grating facilitates an additional change in the direction of beam propagation, in contrast to a transmissive arrangement as shown in FIG. 14.

Referring to FIG. 19 and FIG. 20, the light-deflecting means 420 of the light-deflecting device 400, i.e. the one which faces the observer eye, can also be semi-transmissive or controllably semi-transmissive so to provide for AR applications. In addition, it can comprise a polariser, for example a wire grid polariser (WGP), which is preferably oriented such that light which is reflected from glass surfaces, puddles and other real objects, which would cause disturbing flare in the observer eye, is largely prevented from being transmitted through this polariser. The polarisation of the light of the holographic display device with AR properties, i.e. the light which carries the holographic information for reconstructing the 3D scene that as modulated by the light modulator unit 260, is, however, directed at the observer eye by the light-deflecting means 420.

Figure 21:
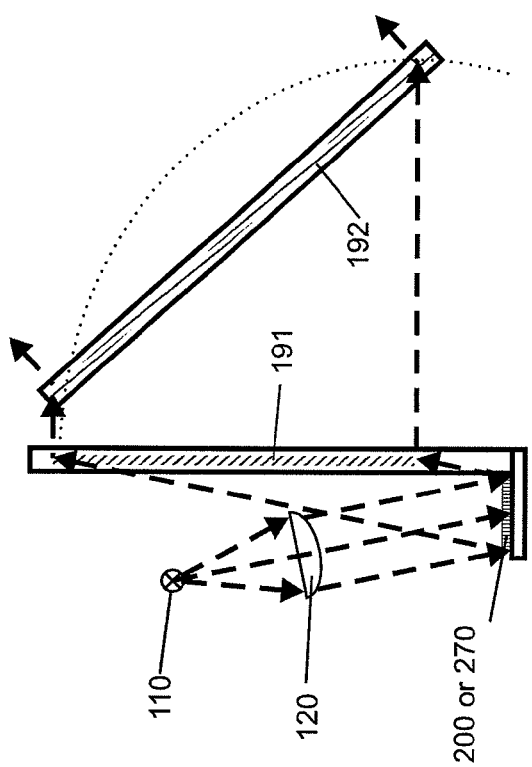
FIG. 21 illustrates the principle of an anamorphic expansion of an SLM or multiple compound image of an SLM with the help of two transmissive volume gratings, where the differences in the optical path lengths among the individual pencils of rays are compensated.

FIG. 21 illustrates the principle of an anamorphic stretching of an SLM 200 or multiple compound image 270 of an SLM with the help of two transmissive volume gratings 191, 192, where the differences in the optical path lengths among the individual pencils of rays are compensated. Thanks to this compensation of the optical path difference, the coherence length of the light that is emitted by a light source 110 and collimated by a collimation lens 120 can be kept small.

Such an arrangement can be integrated into the optical paths of the inventive device. This arrangement for anamorphic stretching does not necessarily have to be disposed next to the SLM, as shown in FIG. 21, it can, for example, be disposed in a section of the optical path where the angular spectrum of plane waves is sufficiently limited. Given a volume grating is used, an angular spectrum of plane waves is considered sufficiently limited if it is diffracted with a high diffraction efficiency. The usable angular range of a transmissive volume grating is the higher the thinner the transmissive volume grating. Reflective volume gratings generally show a wider angular selectivity than transmissive volume gratings.

The principle of compensating an occurring difference in the optical path length can also be implemented with two reflective volume gratings or with a combination of a reflective volume grating and a transmissive volume grating.

The arrangement shown in FIG. 21 can thus combine the function of anamorphic stretching with the function of deflecting a pencil of rays or deflecting a wave field in one light-deflecting means, so to achieve a space-saving folding of the optical path and to keep the number of components to a minimum.

The number of active optical elements can be reduced by optimising the optical design of the system.

Figure 22:
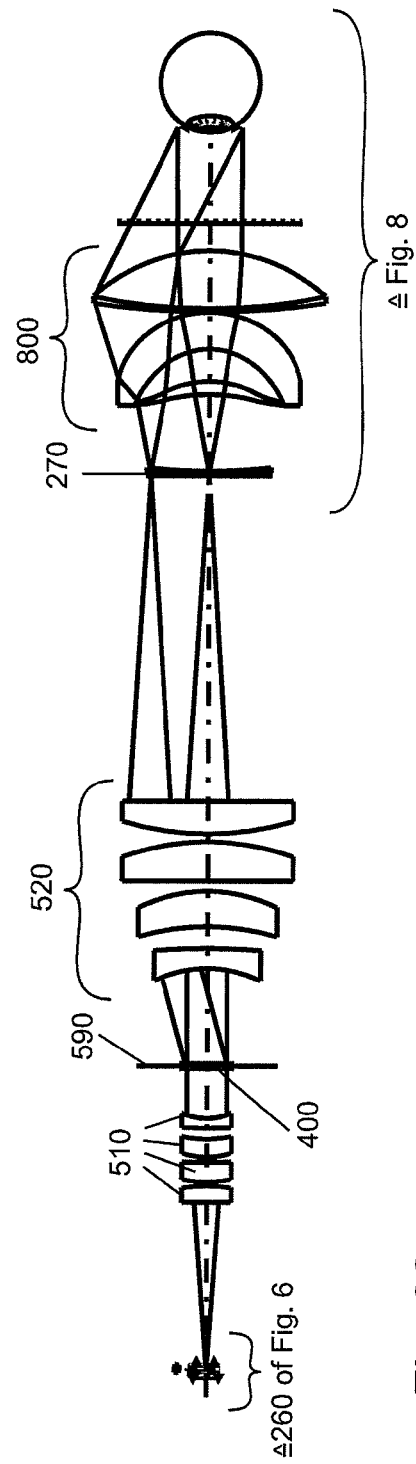
FIG. 22 illustrates the use of a light-deflecting device with a controllable deflection grating in the aperture plane of a telecentric imaging system for multiple imaging in a two-stage optical imaging system.

FIG. 22 illustrates schematically the use of a light-deflecting device 400 with a controllable deflection grating which is disposed in the common focal plane of a telecentric imaging system, which again comprises the two lens arrangements 510, 520. An aperture mask 590 can preferably be disposed in the common focal plane of the two lens arrangements 510, 520 for filtering out unwanted diffraction orders which are generated by the grid of the SLM of a light modulator unit 260. Owing to the telecentric design of the light-deflecting device 400 and its disposition in the common focal plane of the two lens arrangements 510, 520, it is possible to get a compound intermediate image 270 of the SLM solely by tilting the light-deflecting means of the light-deflecting device 400 in a controllable manner. This tilting can also be performed by another controllable light-deflecting means of the light-deflecting device 400, for example by a controllable prism. The position of the light-deflecting means that serves to tilt the optical path can also be out of the focal plane, for example in order to realise the function of an additional field lens. Any overlapping of light modulator images which may thereby occur can be allowed for when generating the hologram.

In an optical imaging system with magnifying lens 800, the compound intermediate image 270 is further greatly magnified virtually, so that it becomes perceivable to the observer eye in the plane of a virtual display screen, i.e. at a distance of 1-2 m, for example.

The principle proposed here can also be applied to optical systems which include more than two imaging stages.

If the volume of view is too small for the 3D reconstruction be viewed comfortably, an optional tracking device can be disposed, for example, close to the eyes, as is shown in FIG. 8.

If this tracking device is represented by an element that introduces an angle, then it effects the compound virtual light modulator image and thus the volume of view to be shifted. The tracking device should be synchronised with the light-deflecting device 400—in particular if its working principle depends on the angle of light incidence—so to get a light modulator image that is joined without gaps. The shifting of the compound light modulator image can be allowed for when generating the hologram that encodes the 3D scene to be reconstructed.

If a one-dimensional encoding method is used, a moving diffusing plate can be disposed in the plane of the aperture mask 590, said diffusing plate expanding the angular spectrum of plane waves in the incoherent direction in the volume of view or enlarging it to the required magnitude. This means, in turn, that this full angular spectrum of plane waves in the viewing window does not necessarily have to exist already when illuminating the SLM of the light modulator unit 260.

The light-deflecting device 400 can additionally fulfil correcting functions to minimise aberrations or the function of a cylindrical lens to implement an anamorphic stretching of the reproduction scale.

If positioned close to the entrance pupil of an observer eye, a single controllable light-deflecting means can be used to generate the volume of view sequentially. The larger the distance of this light-deflecting means to the entrance pupil of the observer eye, the smaller is the area of the actually usable viewing window. If the viewing window is sufficiently large, i.e. measuring 20 mm, for example, a single controllable liquid crystal grating which sequentially introduces an angle can, for example, be disposed at a distance of 10 mm from the observer eye in order to obtain a compound light modulator image. The precise distance of the grating from the observer eye depends on the distance of the image from the observer eye, the size of the non-tilted viewing window in the plane of the entrance pupil of the observer eye, the desired volume of view and the accuracy of an optionally provided tracking device for tracking the viewing window to the entrance pupil of the observer eye.

This is shown schematically in FIG. 23. In contrast to FIG. 7, the light-deflecting device 450 is here disposed so close to the observer eye 1000 that only a controlled beam tilting is required rather than a controlled beam offset for the observer eye 1000 to be able to watch a 3D scene which is encoded in the light modulator unit 260 in a volume of view that is composed of multiple segments. The light which is emitted by the light modulator unit 260 and controllably deflected by the light-deflecting device 450 generates the virtual compound light modulator image at the desired observer distance with the help of a magnifying lens 810. The optional aperture 580 serves to filter out higher diffraction orders of the SLM. It confines the viewing window and keeps high-intensity laser radiation, as it can occur in higher diffraction orders, away from the eyes.

The light-deflecting means of the light-deflecting device 450 can also be disposed on a surface that is curved in one or two dimensions in order to compose the volume of view of multiple segments in one or two dimensions, respectively. This is illustrated in FIG. 24 in contrast to FIG. 23.

The sequentially occurring position deviation of a curved virtual compound light modulator surface, as opposed to a plane compound surface, can be corrected during holographic encoding of the 3D objects, so that they are always shown correct and unbiased in the virtual volume of view.

The function of composing the virtual SLM and that of tracking it to the entrance pupil of the observer eye can both be realised by the light-deflecting means if the latter is designed accordingly. This makes sense in particular if the speed and useful angular range of the light-deflecting means would permit a larger compound modulator area than can be served by the SLM due to its limited speed. The compound light modulator image is then shifted as a whole within the usable angular range, where the section of the reconstructed 3D scene that is to be represented can be adapted.

Solely sequential composition of the volume of view makes great demands on the refresh rate of the spatial light modulators used.

The composition of the volume of view is of great interest mainly for the following reasons. Approx. 725 modulator cells are required per degree in the coherent direction to generate a viewing window of 15 mm, that is a size where observer tracking is not necessary if both observer and display device are situated at a fixed position. If an observer tracking is implemented, then it is possible to reduce this number to about a third so to cover an entrance pupil of an observer eye with a size of about 5 mm. In this case, however, it is still about 250 modulator cells that are required per degree of the volume of view apex angle in the coherent direction. In comparison, a two-dimensional or stereoscopic representation only requires 60 modulator cells per degree of the volume of view apex angle even at HD resolution. The number of modulator pixels of currently commercially available spatial light modulators does not suffice to create a large holographic volume of view. A desired large volume of view can be generated by way of sequentially joining multiple segments in particular in the coherent direction. At the same time, however, the demands made on the speed of the light modulator become greater due to the sequential working principle, all the more if the three primary colours, red, green and blue, are to be represented sequentially as well.

For the purpose of reducing cross-talking, i.e. interference among adjacent image points, which becomes apparent as speckle, the coherent image content can be represented sequentially in a thinned-out form, that is multiple thinned-out object point clusters are represented one after another. This again increases the demands made on the refresh rate of the spatial light modulators used.

In particular in a stationary holographic display device, where the demands that are made on the volume and weight of the device are somewhat lower, it can be preferable to use multiple spatial light modulators simultaneously. The three primary colours, red, green and blue, can, for example, be represented simultaneously to create a compound volume of view simultaneously or in a time division multiplexing process.

It is also possible to combine space division multiplexing and time division multiplexing. A large volume of view can, for example, be composed spatially through multiple light modulators in one dimension while it is composed in the other dimension by way of time division multiplexing of those spatial light modulators.

The optical paths of three spatial light modulators with different colours can be combined with beam combining means which are known in the art, such as dichroic mirrors, prism arrays, polarisation-sensitive optical systems or diffractive light-deflecting means.

Figure 25:
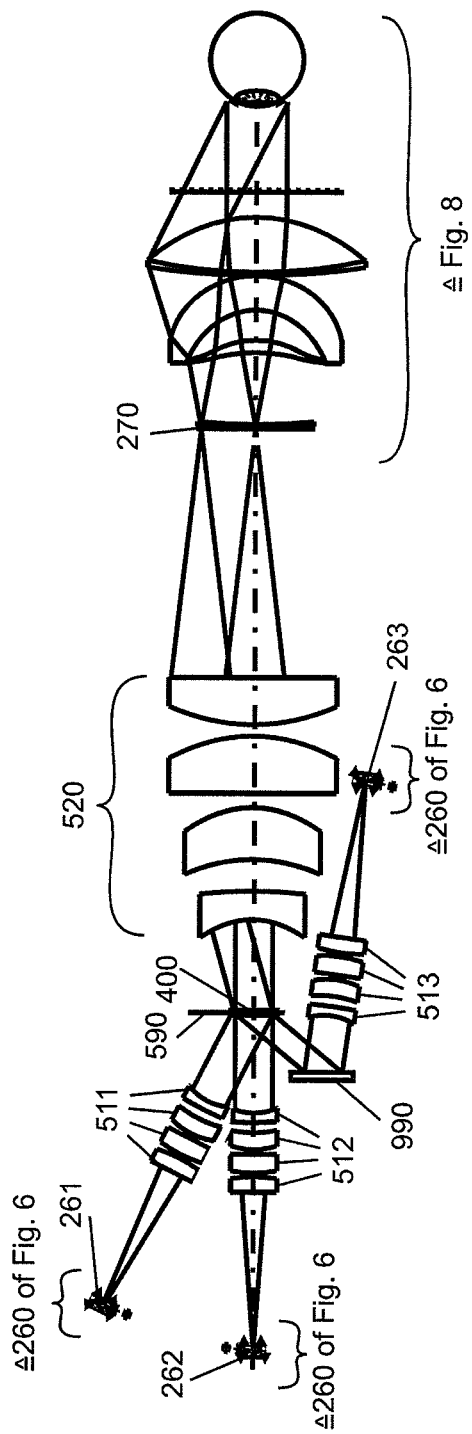
FIG. 25 illustrates an arrangement for colour multiplexing when using a light-deflecting device with a controllable deflection grating in the aperture plane of a telecentric imaging system for multiple imaging in a two-stage optical imaging system as shown in FIG. 22.

FIG. 25 shows schematically an arrangement for colour multiplexing when using a light-deflecting device 400 with a controllable deflection grating as the controllable light-deflecting means in the common focal plane of a telecentric imaging system for multiple imaging of the three spatial light modulators of the three light modulator means 261, 262, 263 of different spectral distribution in a two-stage optical imaging system as shown schematically without colour multiplexing in FIG. 22. The beam combination of the three light modulator images of the light modulator units 261, 262, 263 is here performed in the common intermediate image plane of the telecentric imaging system, which comprises a separate object-side lens arrangement 511, 512, 513 for each of the light modulator units 261, 262, 263 and a common image-side lens arrangement 520 behind the light-deflecting device 400. Again, an optional aperture mask 590 can be disposed in the focal plane of the telecentric imaging system.

The lens arrangement 520 is designed for a larger numerical aperture. In the illustrated arrangement, the blue light modulator unit 262 lies in the direct optical path, just to give an example. The light-deflecting device 400 is illuminated with the green and red light emitted by the two light modulator units 261, 263, respectively, at an angle. The optical path of the red light additionally features a reflective volume grating 990 for folding the optical path—again just an exemplary arrangement. In this arrangement, the angular selectivity of the volume grating 990 defines the size of the red SLM or, if this size is given, the effective focal length of the first lens arrangement 513, which is disposed directly behind the SLM.

Alternatively, a colour beam splitter cube (also called an X cube) can be disposed in front of the light-deflecting device 400. The light sources of the light modulator units 261, 262, 263 for illuminating the SLMs with the individual colours are synchronised by the light-deflecting device 400. In this arrangement, the light-deflecting device 400 should at least have the threefold switching speed of the three SLMs, unless it can be designed in an achromatic way. The individual SLMs are then preferably addressed with a time shift of one third of the refresh rate and illuminated with correspondingly time-shifted short light pulses, i.e. when the corresponding information is written to them completely. A controllable liquid crystal grating can, for example, be operated at 1.8 kHz, while a phase-modulating SLM, for example a LCoS panel, is run at 600 Hz.

Alternatively, the optical paths of red, green and blue light can also be combined in the plane of the compound intermediate image 270 after the multiple imaging. In this case, each of the three optical paths of red, green and blue light has a separate light-deflecting device, so that the demands which are made on their switching speed are not so high.

Figure 26:
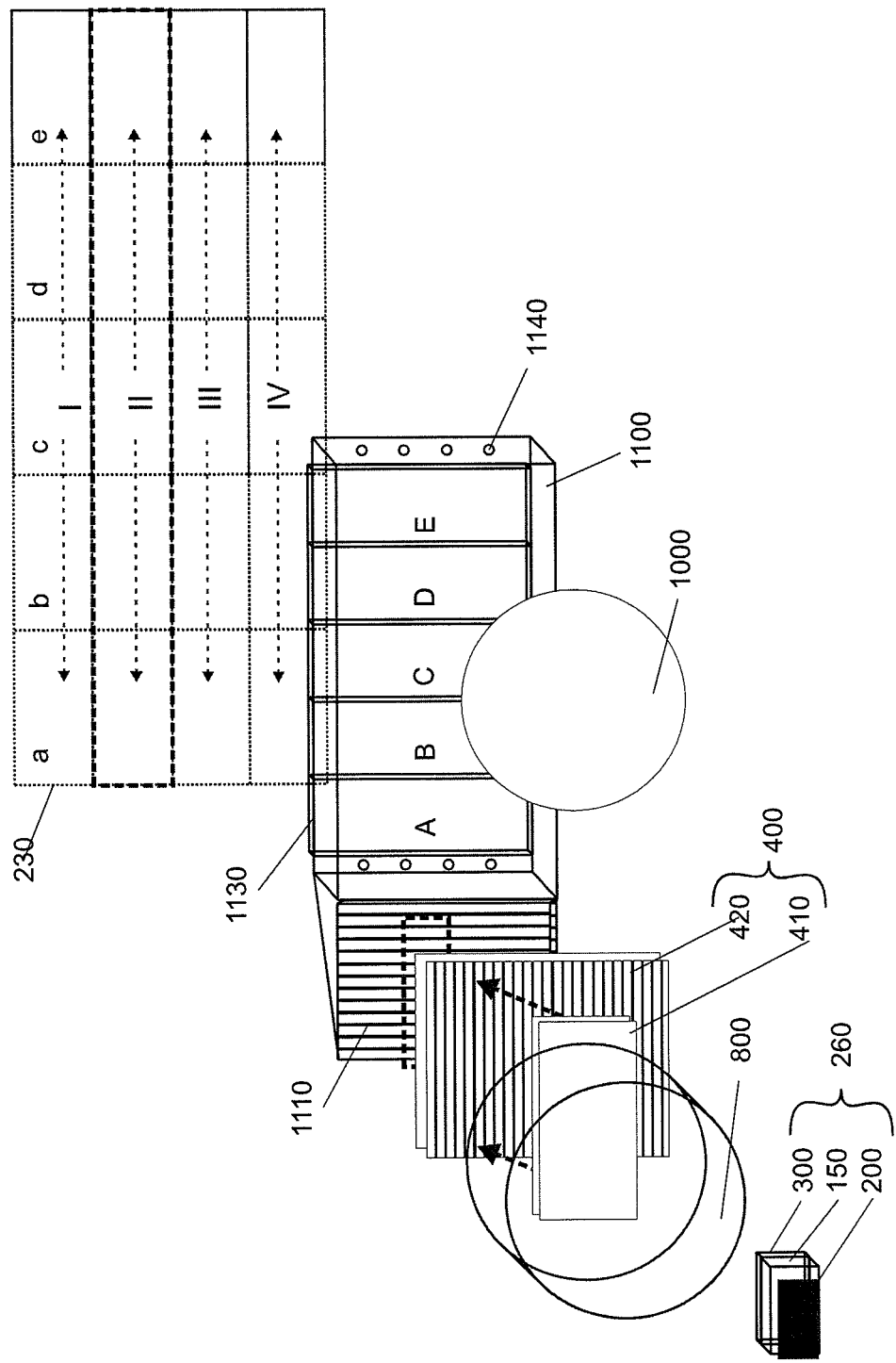
FIG. 26 illustrates a vertical multiple imaging process using a light-deflecting device through a thin waveguide.

FIG. 26 shows an embodiment of an HMD with vertical multiple imaging in combination with a thin waveguide 1100, as has already been described under FIG. 13. Again, a reflective SLM 200 is illuminated through a flat frontlight unit 150, just to give an example. For this purpose, coherent light which is emitted by a light source (not shown) is injected into the flat frontlight unit through a collimation lens (not shown). The SLM 200 can optionally be followed by a beam combiner 300 which optically combines always two phase values of adjacent modulator cells of the SLM 200 enabling two-phase encoding. SLM 200, frontlight unit 150 and beam combiner 300 are part of a light modulator unit 260 which receives data for holographic encoding of a 3D scene from a control unit (not shown). The light modulator unit 260 is preferably disposed in the object-side focal plane of a magnifying lens 800. The modulated wave front which is modulated by the light modulator unit 260 falls on a first controllable light-deflecting element 410 of a light-deflecting device 400. The controllable light-deflecting means 410 is preferably provided in the form of a controllable liquid crystal grating, where a voltage profile which is applied to an electrode structure generates a variable diffractive deflection grating. It directs the light of the SLM 200 sequentially into at least two different angular ranges in the vertical direction. Referring to FIG. 26, four different vertical directions are generated by four different vertical angular spectra, for example. A second light-deflecting means 420 deflects the light of the particular angular spectra such that mutually shifted segments are generated in the vertical direction in a time division multiplexing process. The light-deflecting means 420 of the light-deflecting device 400 can, for example, also comprise a controllable liquid crystal grating as the light-deflecting means. It can also comprise a multiplex volume grating which converts each of the different entry angle spectra to a corresponding exit angle spectrum. In a preferred colour HMD, this multiplex volume grating can additionally be designed for wavelength multiplexing, where it can also comprise multiple subsequently arranged volume gratings and/or multiplex volume gratings. The distance between the two light-deflecting means 410, 420 depends, among other factors, on the maximum deflection angle of the light-deflecting means 410 and on the number of segments to be generated in the vertical direction. The sequentially generated vertical segments are injected into a thin waveguide 1100 at a flat angle through an optical input coupling component 1110, which preferably comprises a volume grating, so that the light of all input coupling angles propagates in the direction of the waveguide 1100 by way of total internal reflection at the two parallel interfaces of the waveguide 1100. FIG. 26 shows the injection into a lateral interface of the waveguide 1100. Alternatively, it is of course also possible that the light is injected through the input coupling component 1110 into the side of the waveguide 1100 that faces the light-deflecting device 400, for example through a transmissive volume grating, or into the side of the waveguide 1100 that faces away from light-deflecting device 400, for example through a reflective volume grating. The input coupling component 1110 can preferably comprise at least one multiplex volume grating. Similar to what has been shown in FIG. 13, light injection into the waveguide 1100 through the input coupling component 1110 can also be performed in the form of multiple, for example five, horizontal angular spectra, which here divide the common horizontal range of modulator cells of the light modulator unit 260. In the arrangement according to FIG. 26, the waveguide 1100 does not have to be completely plane, its surfaces can be curved and/or have a small wedge angle. The second light-deflecting means 420 and the input coupling component 1110 can also be combined in one component for light deflection and injection. An output coupling component 1130 couples the light out of a plane waveguide 1100, directing it at the observer eye 1000. A viewing window (not shown) is thereby generated in which the eye pupil of the observer eye 1000 is situated. The magnified virtual compound image 230 of the SLM 200 is visible in this viewing window in the form of vertically arranged segments I-IV in the volume of view. To minimise disturbing flickering, the temporal sequence of the segments I-IV can be varied and optimised. The segments can also be generated at random sequence. The random distribution should be chosen such that flickering is suppressed to the greatest possible extent. While doing so, the delay until one and the same segment is represented again should not be too long.

The apparent distance of the multiple segmented virtual image 230 from the observer eye 1000 depends, among other factors, on the size of the active area of the SLM 200 and the magnification factor of the magnifying lens 800. It can be 2 meters, for example. Following the primary magnifying lens 800 in the optical path, further lens effects and/or wave-field-forming functions, such as anamorphic stretching or compressing, can be implemented in the individual components, that is for example in the first controllable light-deflecting means 410, in the second controllable light-deflecting means 420, in the input coupling component 1110, in the thin waveguide 1100 and in the output coupling component 1130 in addition to their respective main functions as described above.

The viewing window and the virtual compound image 230 of the SLM 200 define the volume of view, in which the object points of a three-dimensional scene are reconstructed through a holographic amplitude and/or phase distribution as written to the light modulator unit 260. It is, of course, also possible that a two-dimensional scene is generated holographically at an arbitrary distance from the observer eye. In a device with amplitude-modulating light modulator which uses, for example, the Burckhardt encoding method for holographic encoding, a scene can also be encoded two-dimensionally and directly, i.e. not holographically, in the plane of the virtual compound image 230.

If the horizontal modulator region of the SLM 200 is divided by the input coupling component 1110 into different horizontal injection angle ranges, then the output coupling component 1130 is designed such that it comprises multiple horizontal segments A-E each of which converting a specific horizontal injection angle range into a corresponding horizontal exit angle range, thereby generating a compound image 230 of the SLM 200, said image comprising the horizontal segments a-e. These horizontal regions simultaneously couple the light of a vertical segment I-IV out. Both the horizontal segments a-e and the vertical segments I-IV are joined without gap or overlap slightly, where a superimposition or overlapping of segments can be allowed for when generating the hologram values for the reconstructed object points.

The thin waveguide 1100 can have position sensors 1140 to detect the deviation of the individual horizontal segments a-e and/or vertical segments I-IV of the magnified virtual compound image 260 from their optimum positions. These sensors are preferably disposed in marginal areas of the waveguide 1100, in particular outside the viewing range of the observer. The light modulator 200 can have additional modulator cells at its margins for illuminating these position sensors 1140, where said additional modulator cells are only used for finding the correction values but not for writing hologram information. The correction values can be determined permanently while the device is in operation, which makes it possible to compensate drift effects, for example as caused by temperature fluctuations, too.

It is also possible that a larger maximum deflection angle is realised in the direction of light deflection by the light-deflecting means 410 and 420, so that no transparent sensors and no additional modulator cells are needed on the light modulator 200 for this adjustment. This additional region is then only used, for example, during an initialisation phase after switching the device on to determine correction values. It does generally not lie in the visible area but rather in the area of a field-of-sight-confining aperture, for example, as it would be represented by the glasses frame. The position sensors 1140 can also be provided in a transparent form and be situated in the field of sight of the observer eye 1000, so that they are hardly perceived, which makes it possible too to do without additional modulator cells on the light modulator. Any absorption caused by them can be allowed for when generating the hologram values. When the device is switched on, the correction values can be determined by generating suitable test patterns.

Suitable position sensors 1140 include, for example, one- or two-dimensional arrays of photosensitive elements, such as photo diodes or photo transistors, or CCD or CMOS sensors. They can serve, for example, for simple edge detection. Position-sensitive photo elements can also be used preferably where the centre of one or multiple light distributions can be determined through a lateral electrode structure. The position sensors 1140 can also be provided directly on the plane waveguide 1100, for example if they are made using thin-film technologies.

Vertical maladjustment can be compensated actively with the help of the liquid crystal grating used. A second, crossed controllable liquid crystal grating could be provided for correcting horizontal maladjustment.

The output coupling component 1130 can also be provided in the form of a transmissive volume grating and be disposed on the side of the thin waveguide 1100 which faces the observer eye 1000.

The numerical aperture of the magnifying lens 800 defines the resolution. The resolution shall be chosen such that at least the zeroth and one further diffraction order of the SLM 200 propagate beyond the—generally primary—magnifying lens 800.

Optical components which are disposed behind the magnifying lens 800 can have a reduced angular acceptance. This is the case, for example, in volume gratings. The angular spectrum of plane waves which is preferably present behind the magnifying lens 800 is defined by the angular acceptance, or angular selectivity, of the optical components which are disposed behind the magnifying lens 800.

The angular spectrum of plane waves which is preferably present behind the magnifying lens 800 defines the size of the light modulator unit 260 which is used in front of it and thus also the required size of the first controllable light-deflecting means 410 which is provided behind the magnifying lens 800.

The size of the used SLM 200 or light modulator unit 260 can be increased by increasing the focal length of the magnifying lens 800.

The numerical aperture of the used magnifying lens 800 should generally be as large as or larger than the numerical aperture which allows all encoded object points of the reconstructed three-dimensional scene to be resolved.

The controllable light-deflecting means 410 and 420 can also be arranged at a lateral shift to each other, so that their zeroth diffraction order can be filtered out if the effective higher diffraction orders show a diffraction efficiency that is too small, so that disturbing portions of the zeroth diffraction order would remain there when said higher diffraction orders are selected.

The magnified virtual compound image 230 of the light modulator unit 260 can preferably be generated anamorphically. The anamorphic stretching can be performed, for example, by the magnifying lens 800 and/or the input coupling component 1110. However, additional elements, such as cylindrical lenses, gratings or volume gratings, can also be disposed in the optical path between the light modulator unit 260 and the plane waveguide 1100. For this purpose, a cylindrical lens can be disposed behind the second controllable light-deflection means, for example.

Coupling the light into and out of the plane waveguide 1100 by the input coupling component 1110 and by the output coupling component 1130, respectively, can also be realised in a non-segmented manner, in that a continuous output coupling component is provided for coupling specific angles out at defined positions into defined directions.

For this purpose, transmissive or reflective volume gratings can be provided through whose thickness the angular selectivity is optimised. Reflective volume gratings generally show a wider angular acceptance than transmissive volume gratings. The angular acceptance of transmissive volume gratings can be reduced specifically by increasing their thickness. In reflective volume gratings, the angular acceptance can be affected by varying the modulation strength, i.e. the refractive index difference.

Doing so, it is preferable to suppress any side peaks of the angular selectivity. When using spectrally wider wavelength ranges, as is the case, for example, in conventional 2D or stereoscopic 3D HMD devices, where OLEDs are used, for example, it is preferable to suppress the side peaks of the angular and/or wavelength selectivity.

In a transmissive volume grating which was produced by way of exposure of a homogeneous recording medium to two mutually coherent plane waves, the envelope of the refractive index modulation is a rectangular function, neglecting any absorption in the recording medium. In transmissive and refractive volume gratings, the envelope of the refractive index modulation can, however, also be adapted specifically by choosing a suitable coherence of the wave fields which are used for exposure; it can, for example, have the form of a Gaussian distribution, Hamming window or Kaiser-Bessel window. This leads to a significant minimisation of side peaks of the angular and wavelength selectivity. This is preferable, for example, if angular and/or wavelength sensitivities of different reconstruction geometries lie close to each other. This is to avoid that ghost images appear in the represented volume of view caused by side peaks of the angular and/or wavelength selectivity.

In a preferred embodiment of the display device according to this invention, the controllable light-deflecting device thus includes a volume grating and/or a multiplex volume grating whose envelope of the refractive index modulation was set specifically by choosing a suitable coherence of the wave fields which were used for exposure during manufacture.

In addition to spatial light modulators which work in two-dimensional mode, whose modulator cells are arranged in a two-dimensional modulator cell matrix, one-dimensional light modulators can also preferably be used to generate a large high-resolution volume of view in an HMD or hocular. Such one-dimensional or linear light modulators only have one or very few columns of modulator cells. Owing to the fact that such light modulators do not require to be addressed in a matrix they can be manufactured inexpensively with a high resolution in the direction of the column. Due to the very short conductor lengths between electronic control unit and modulator cells, among other factors, these light modulators can have very high switching speeds. Suitable linear SLMs include, for example, one-dimensional arrangements of modulator cells which comprise controllable diffractive gratings, such as grating light valves (GLV) or grating electro-mechanical systems (GEMS). They work in reflective mode and allow the phase of the incident light to be modulated. One-dimensional LCoS or one-dimensional transparent liquid crystal modulators can be used as well.

In order to generate a two-dimensional image plane, these light modulators are sequentially imaged multiple times side by side in the direction perpendicular to the linear extent of the modulator cells. The devices for generating a magnified virtual compound image of an SLM that have already been described above are particularly suited for this if a controllable light-deflecting device is used which permits a continuous deflection angle in a defined angular range which defines, among other factors, the size of the volume of view. One-dimensional SLMs are particularly well suited for one-dimensional encoding of hologram values in the direction of the modulator column, i.e. across the scanning direction. In a device for colour reconstruction of 3D scenes, the SLMs are, similar to two-dimensional SLMs, sequentially illuminated with the individual colour components, red, green and blue, or each colour component is modulated by a separate SLM, where the optical paths are designed such that a magnified virtual compound image is generated, for example as shown in FIG. 25.

FIG. 27*a* shows how a one-dimensional SLM is scanned by a controllable light-deflecting means 410, merely as an example. The optical arrangement corresponds largely to what is shown in FIG. 22. However, the light modulator unit 260 comprises at least one linear SLM. The linear SLM is here scanned by a light-deflecting means 410 in the region of the mean focal plane of a telecentric lens arrangement. The light-deflecting means preferably comprises a controllable diffractive liquid crystal grating whose grating constant is variable very finely in a defined range through a voltage profile which is applied to an electrode structure. The maximum deflection angle is defined by the smallest possible grating constant which, in turn, is defined by the fineness of the electrode structure. The telecentric lens arrangement comprises a first lens system 510, which serves as a projection system that collimates the light which is emitted by the light modulator unit 260, and a second lens system 520, which serves the function of an optical F theta system. The scanning angles caused by the light-deflecting means 410 are converted by this lens system 520 to lateral shifts, thereby generating a compound intermediate image 270 which serves as a virtual two-dimensional SLM for the following magnifying optical imaging system. Such an optical imaging system has already be described under FIG. 8. Again, an aperture mask 590 can be disposed in the common focal plane of the telecentric imaging system. Higher diffraction orders can here only occur in the direction of the modulator cells.

FIG. 27b shows an exemplary physical form of a light modulator unit 260, comprising at least one linear SLM 205, for example as shown in FIG. 27a. The linear SLM 205 is illuminated by at least one light source 110, for example by a laser light source, with sufficiently coherent light through a collimation lens 120 and a beam splitter cube 130, which serves the purpose of a frontlight. Sufficient coherence here means that the spatial coherence of the collimated light of the light source 110 is large enough for illuminating at least a sub-region of the SLM 205 to which the code for a holographically reconstructed object point is written, i.e. the region of a sub-hologram. If a two-phase encoding method is used, the linear SLM 205 is preferably provided with a beam combiner which combines the light of always two adjacent modulator cells of the SLM 205, which is a phase-modulating light modulator, so to get complex hologram values. The two modulator cells do not strictly have to be directly adjacent modulator cells though. The distance between the two is defined by the path length by which light of different, i.e. orthogonal, polarisation is mutually shifted in a retardation plate 300. For this purpose, the light of the two involved modulator cells is given locally different, i.e. orthogonal polarisations by a structured retardation plate 320. An unstructured polariser 310 selects from the two superimposed light portions of different, i.e. orthogonal polarisation the common polarisation portion. Orthogonal polarisations can be vertical (TE) and horizontal linear (TM) polarised light, but also left-handed and right-handed circularly polarised light.

It is particularly preferable if two pixels are combined which are non-adjacent in the linear direction of the SLM 205, but if the linear SLM 205 comprises at least two adjacent columns of modulator cells. The latter can also have a greater distance to each other, so that, for example, the electrical control unit can be situated between the two. The structured retardation plate 320 then only comprises one stripe of a birefringent material per column which generates a polarisation which is orthogonal to that of the incident light after double passage. To increase the achromaticity of the orthogonalisation of the polarisation of adjacent columns of the SLM, it is possible, for example, to use a $+\lambda/4$ retardation column and a $-\lambda/4$ retardation column on adjacent reflective SLM columns which are to be combined.

The mutual shift of the optical path of the two polarisation portions in the retardation plate 330 corresponds with the distance of the two modulator cell columns. If the SLM 205 is illuminated with different colour portions in a time division multiplexing process, the polarisation-affecting elements 310, 320 and 30 should be largely achromatic. They can also have a controllable polarisation-specific phase shift which is synchronised with the wavelength. Liquid crystal layers with controllable birefringence are particularly well suited for this.

FIG. 27c shows another embodiment of an exemplary light modulator unit 260 that can be used in the arrangement shown in FIG. 27a. The complex modulation values are here generated by way of superimposing the phase-modulated light of corresponding modulator cell each of the linear SLMs 206, 207 with a beam splitter cube 130. For this purpose, the linear SLMs 206, 207 are each disposed in front of and parallel to a surface of a beam splitter cube 130, for example in front of two orthogonal surfaces. The two SLMs 206, 207 are illuminated with sufficiently coherent light by a common light source 110 and through a collimation lens 120 and the beam splitter cube 130. For this purpose, the collimation lens 120 is disposed in front of another surface of the beam splitter cube 130. The combined light of the two SLMs 206, 207 is coupled out through a fourth surface of the beam splitter cube 130.

Referring to FIG. 27a, the controllable light-deflecting means 410 can additionally fulfil correcting functions and/or the function of a cylindrical lens to implement an anamorphic stretching of the reproduction scale.

Figure 28:
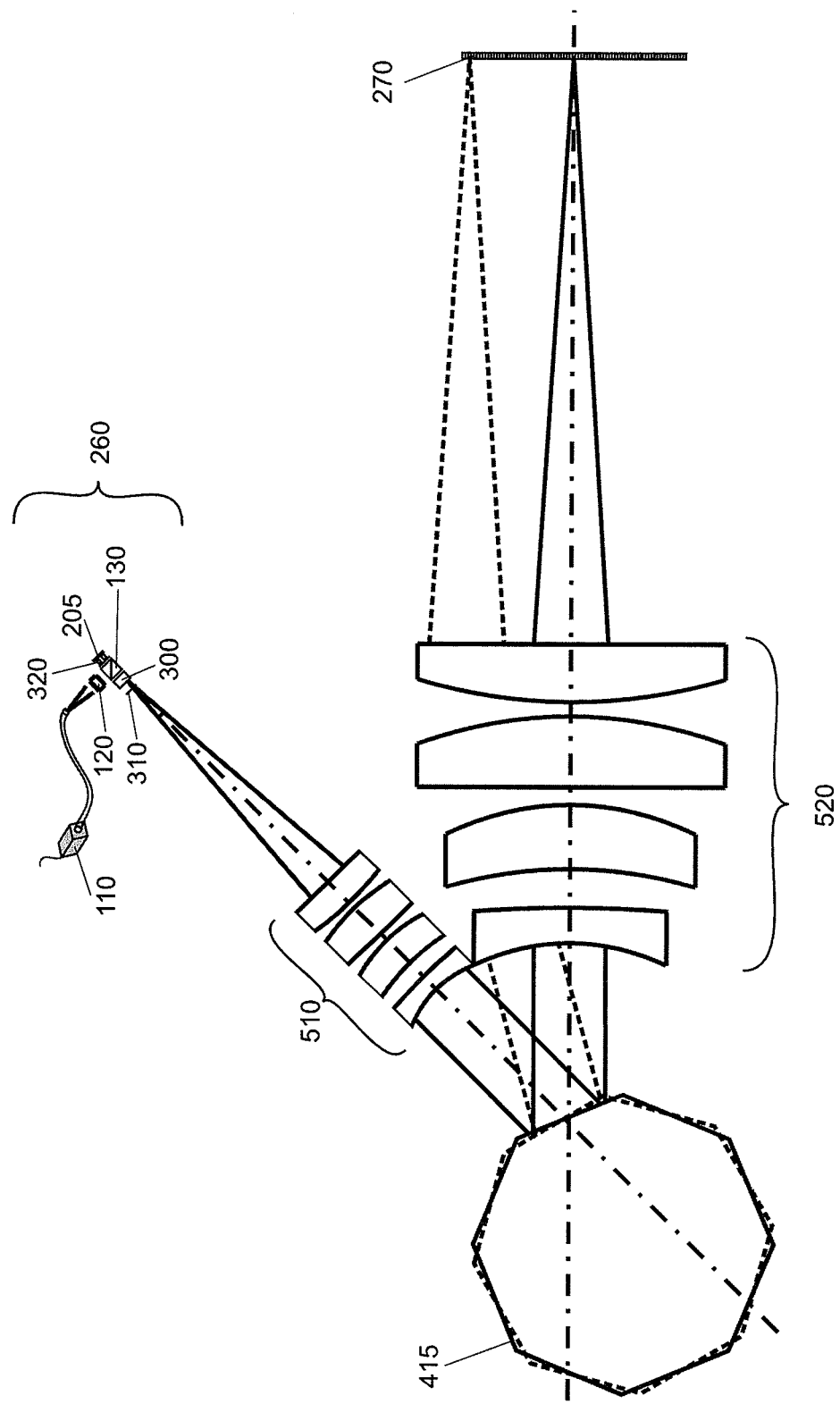
FIG. 28 illustrates the use of a polygon mirror as the light-deflecting device in the aperture plane of a telecentric imaging system for multiple imaging in a two-stage optical imaging system, combined with a one-dimensional light modulator.

Embodiments where at least one linear SLM is scanned mechanically to generate a magnified virtual compound image of an SLM are particularly well suited for hocular devices. This can be performed, for example, by galvanometer mirrors, which can also be designed in the form of micromechanical elements, and/or by polygon mirrors. FIG. 28 illustrates schematically an exemplary embodiment with a polygon mirror 415 for scanning the modulated light of the light modulator unit 260 in the common focal plane of a telecentric imaging system which comprises two lens arrangements 510, 520, as shown in FIGS. 27a-c. The optical path including the light modulator unit 260 corresponds largely with that in FIGS. 27a-c, so that a detailed description will be omitted here. The polygon mirror 415 serves as a controllable light-deflecting means which scans the linear light modulator unit 260 across the direction of its linear extent in a scanning stripe, thereby generating a virtual SLM in the intermediate image plane 270. A light-deflecting device (not shown) can be disposed in that plane, said light-deflecting device deflecting the modulated light of the light modulator unit 260 across the direction of movement of the polygon mirror 415 in order to generate a magnified virtual compound image of the intermediate image 270 through an optical imaging system (not shown) which comprises at least two superimposed magnified scanning stripes. For this purpose, the light-deflecting device is synchronised with the movement of the polygon mirror 415 and the light modulator unit 260 through a system controller (not shown).

In order to realise the necessary tilting of the optical path, such a light-deflecting device can also be disposed between the lens arrangement 510 and the polygon mirror 415 or between the polygon mirror 415 and the lens arrangement 520. Switchable or controllable liquid crystal gratings with variable grating period, switchable liquid crystal polarisation gratings or switchable volume gratings can be used for this purpose, for example.

As opposed to that, the necessary tilting can also be achieved by a light-deflecting device which is disposed between the lens arrangement 520 and the plane of the compound image 270. In this arrangement, for example two controllable light-deflecting means, such as two controllable liquid crystal gratings or two switchable volume grating elements, are disposed one after another so that the required lateral shift of a scanning stripe is created by two angle-introducing components in order to generate a compound image that is composed of multiple scanning stripes in the plane of the intermediate image 270. An arrangement of two angle-introducing components can also be disposed in front of the lens arrangement 510, i.e. between the light-modulator unit 260 and the lens arrangement 510. These arrangements can also be combined in that one angle-introducing element is disposed between the primary SLM and the lens arrangement

510 while another angle-introducing element is disposed between the lens arrangement 520 and the compound image 270.

The compound intermediate image 270 is followed by an optical imaging system (not shown) with magnifying function which generates the two-dimensional magnified virtual compound image of the SLM of the light modulator unit 260.

One polygon mirror 415 can be designed slightly achromatic, which facilitates the implementation of devices for colour reconstruction of 3D scenes.

Its reflecting surfaces can comprise an absorbing aperture across the direction of rotation in order to suppress higher diffraction orders. This aperture function can also be realised by way of limiting the structural height.

In a particularly preferable embodiment, adjacent surfaces of the polygon mirror 415 are designed such that they are tilted against each other, so that a multiple image composition is also realised in the direction of the linear extent of an SLM of a light modulator unit 260. The number of surfaces which are tilted against each other defines the number of multiple images in the direction of the linear extent of the SLM. The tilting sequence can be repeated multiple times in the SLM so to raise the number of reflecting surfaces and thus to reduce the required rotating speed of the polygon mirror 415. The tilting sequence of the individual reflecting surfaces can also be varied during each passage in order to minimise flickering.

Alternatively, for multiple imaging, the reflecting surfaces of the polygon mirror 415 can be designed in the form of reflective volume holograms which deflect the light in different directions across the direction of rotation. Each reflecting surface must be chosen to suit one reflection angle and, if colours are generated in a time division multiplexing process, one wavelength range only, which makes multiplex volume holograms superfluous. Such a sequence of reflecting surfaces in the form of reflective volume gratings can also be repeated multiple times on the polygon mirror 415.

The reflective volume gratings can be designed such that their deflection angle in the direction of deflection varies such that an additional lens function or change in the reproduction scale is achieved in this direction or that aberrations of one or more optical imaging systems in the optical path are additionally corrected by this deflection device. By varying the deflection angle over the reflecting surface in the direction of rotation, aberrations of one or more optical imaging systems in the optical path can be corrected in the direction of rotation. Minor aberrations in either direction can be corrected during encoding of the object points.

It is further possible to use linear SLMs with a relatively large distance or gaps between individual modulator cells. In this case, individual reflective surfaces of the polygon mirror 415 can only be tilted slightly against each other so that thanks to the temporal sequence a magnified gapless high-resolution virtual compound image is generated. Due to the fact that the maximum achievable diffraction angle is reduced during hologram encoding, such an embodiment is not preferred, but rather only advantageous if gaps between the modulator cells cannot be avoided for technological reasons.

The individual image stripes are preferably overlapped in the direction of the linear extent of the SLM to a degree that, due to the limited maximum diffraction angle, a sufficient number of coherently illuminated modulator cells are available in the overlapping region for the holographic encoding of object points.

Multiplexing in two dimensions can also be achieved in that two orthogonal polygon mirrors are used with the first one being imaged onto the second one. Although this extends the optical path, this is unproblematic in a stationary holographic display device.

If the linear SLM has multiple modulator cell columns, neighbouring reconstructed object points can be encoded in different columns so to reduce speckle. Individual modulator cells of the individual columns are preferably shifted against each other slightly in relation to a pixel matrix. Such an arrangement can also serve the purpose of increasing the resolution in the direction of the light modulator extent.

The optical paths can be designed for two observer eyes such that only one polygon mirror is required which scans at least one light modulator unit 260 each for the right and left observer eye.

The relative position of the individual image segments, or their absolute position, can be found or defined, for example, in a way known in the prior art with photosensitive sensors. Any necessary corrections can be allowed for when generating the hologram values.

If the individual colours are not generated in a time division multiplexing process, but rather by individual linear SLMs, a common polygon mirror 415 can be provided for all required colours. A separate light modulator unit 260 can, for example, be included for each colour and a separate lens arrangement 510 can be provided for each light modulator unit 260, similar to what is shown in FIG. 25. The optical paths can be situated with a slight shift in the direction of rotation of the polygon mirror 415, and they can use different, overlapping scanning regions of the polygon mirror 415. A colour reconstruction is only realised in the common overlapping region, which defines the size of the common magnified virtual compound image of the linear SLMs of the light modulator units 260.

The individual optical paths can also be arranged with a shift across the direction of rotation. In this case, the reflecting surfaces are preferably provided in the form of reflective multiplex volume gratings which have such a direction of deflection across the direction of rotation of the polygon mirror 415 depending on the shift of the modulator image stripe on the reflecting surface for each colour component that the colour components are superimposed behind the common lens arrangement 520. It is also possible to do without this offset, i.e. the individual colour components are only tilted against each other.

Alternatively, each reflecting surface can comprise an individual segment across the direction of rotation for each colour component, said segments being tilted against each other such that the individual colour components are largely superimposed behind the lens arrangement 520. There is no need for reflective volume holograms on the reflecting surfaces then.

The reflecting surfaces can comprise curved surfaces in order to fulfil additional lens functions or corrective functions.

The linear light modulator unit 260 can also preferably be designed such that all colour components are combined in it. This can be achieved, for example, with colour beam splitters which are disposed in front of the lens arrangement 510 which serves as optical imaging system.

Figure 29:
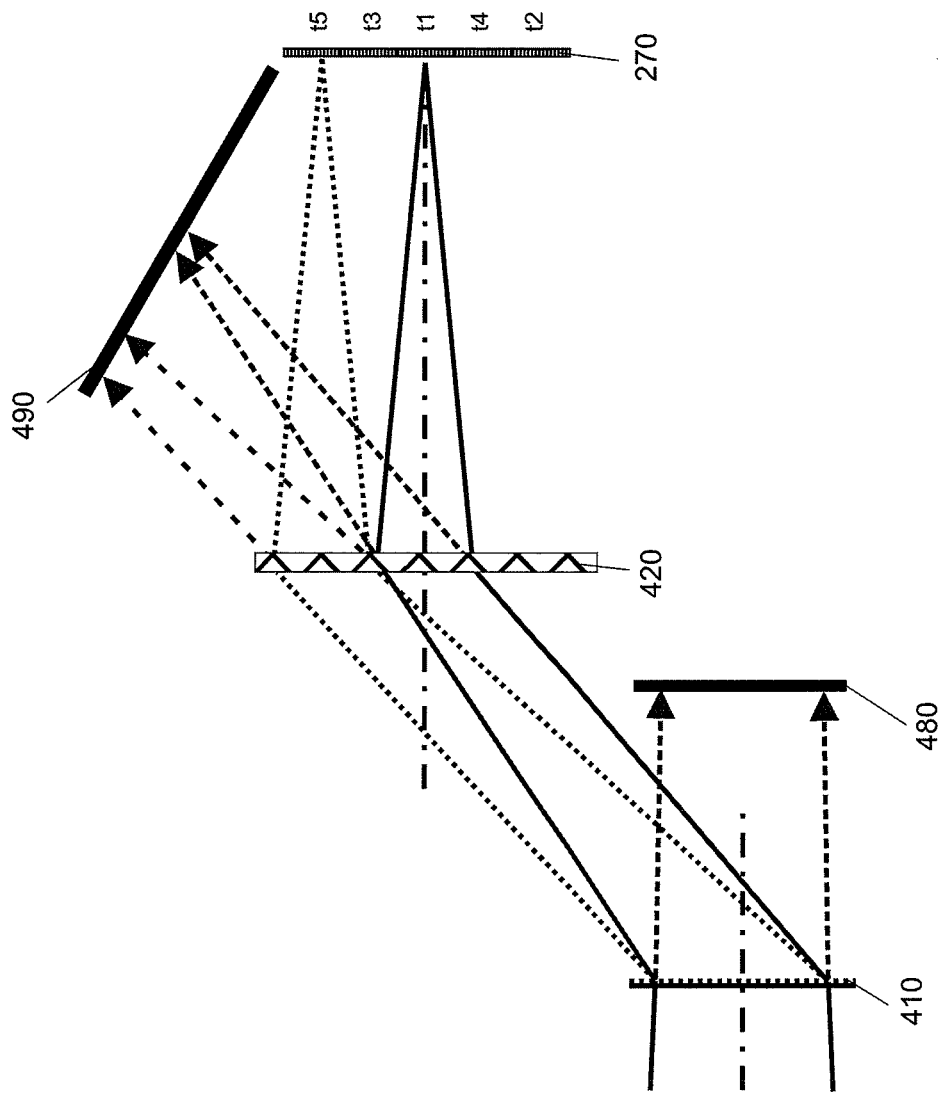
FIG. 29 shows how the zeroth diffraction order is avoided when using diffractive optical elements in controllable light-deflecting means for generating a magnified virtual compound image of a light modulator device.

FIG. 29 demonstrates once more how the zeroth diffraction order can be suppressed when using diffractive optical elements in controllable light-deflecting means 410, 420, as can be applied in most of the embodiments discussed herein. The zeroth diffraction order must always be suppressed if its remaining intensity would be disturbing when higher diffraction orders are used. The light of a light modulator unit (not shown) is controllably diffracted by a light-deflecting means 410. The non-diffracted light of the zeroth order passes through the light-deflecting means 410, for example in the direction of its optical axis, without being diffracted, where said light-deflecting means 410 can, for example, be a controllable liquid crystal grating. It is absorbed by an absorbing aperture 480 to avoid the presence of diffused light. The light which is diffracted away from the optical axis by the controllable light-deflecting means 410 then passes through a second light-deflecting means 420. Here, the light hits the second controllable light-deflecting means 420 at an angle, just for example. Again, the non-diffracted light which remains in the zeroth diffraction order is absorbed by an absorbing filter 490. The light-deflecting means 420 can, for example, also be a controllable liquid crystal grating or a multiplex volume grating. The compound intermediate image 270 is only generated by diffracted light and does not contain any portions of a zeroth diffraction order. The parallel disposition of the two light-deflecting means 410, 420 in the drawing is merely exemplary. These components can also be tilted against each other if required so by the optical path, for example in order to achieve a higher maximum deflection angle.

Tracking the viewing window to the entrance pupil of the observer eye is necessary if the viewing window is smaller than the freedom of movement of the entrance pupil. In an HMD or hocular, the range of movement of the entrance pupil can, for example, be 15 mm in the horizontal direction and 10 mm in the vertical direction. If a one-dimensional encoding method is used, a viewing window with a vertical extent of 15 mm and a horizontal extent of 20 mm can be used in order to do without a tracking device.

Reducing the size of the viewing window to 5 mm, however, allows the density of modulator cells to be reduced from 725 modulator cells per degree to about 240 modulator cells per degree, which corresponds with only the fourfold pixel density of that in HD TV applications. Besides the density of the modulator cells, the total number of modulator cells is also reduced by a factor of 9 in this case if the density of the modulator cells is reduced likewise in either dimension. In addition to a substantial reduction in the surface area of the SLM, and thus of the other optical components, this also leads to a significant energy saving effect in the SLM itself.

The viewing window is thus preferably kept small and tracked to the entrance pupil of the observer eye.

The viewing window can be shifted in various ways in order to follow the movement of the observer eye, or of its entrance pupil. The viewing window can be shifted laterally, for example. In a stationary display device, introducing a viewing window filtering plane appears practical to achieve this. The viewing window can, for example, be shifted behind this filtering plane. Alternatively, the viewing window aperture mask can be shifted actively, for example in the form of a mechanically moved aperture mask or in the form of a controllable liquid crystal shutter array. The latter can, for example, be addressed electrically or optically. Optically addressing a dynamically moving viewing window aperture allows to omit a matrix of modulator cells in the plane of the viewing window aperture mask and thus to prevent disturbing diffraction effects of this matrix of modulator cells in the plane of the dynamic aperture.

Tilting the viewing window in the plane of the entrance pupil of the observer eye corresponds with a shift of the region of the virtual SLM that is being imaged at that point of time. It should therefore be made sure that a possible tilting angle of the viewing window which is introduced for the purpose of viewing window tracking is considered. If there is sufficient overlapping of individual virtual SLM segments in the image plane, so that there are no gaps in the volume of view in which the reconstruction is situated, then it is sufficient to modify the generated holographic code of the 3D scene such that the tracking of the viewing window to a moving entrance pupil of the observer eye is introduced without being perceived by the user, i.e. the encoding is performed such that the reconstructed objects appear to remain in the same position in space while their actual position in the virtual SLM segment is changed. Minor tilting, i.e. of less than 1°, of the viewing window can be compensated by small shifts, i.e. by less than 725 pixels, of the sub-holograms which are generated on the SLM.

However, this method is generally not sufficient if the angles to be introduced for observer tracking become too large. It thus lends itself that the viewing window tilting angles that are introduced for observer tracking are compensated. This reduces the overlapping which must be provided among the individual virtual SLM segments in the image plane and allows the size of the volume of view to be maximised.

Figure 30:
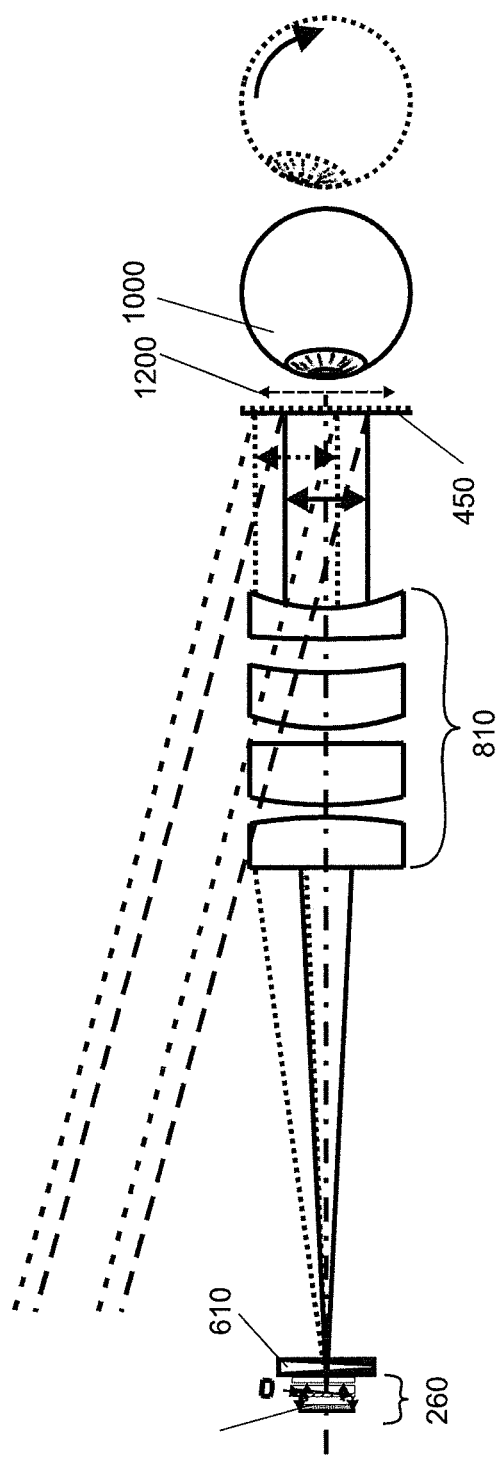
FIG. 30 illustrates how the viewing window is tracked to the movement of the entrance pupil of an observer eye by changing the mean emission angle of an SLM with the help of a prism.

FIG. 30 shows schematically an arrangement where a viewing window 1200 is tracked to the movement of an entrance pupil of an observer eye 1000 by changing the mean emission angle of the light modulator unit 260 with the aid of a prism with variable prism angle which serves as the controllable light-deflecting means 610. The arrangement for generating a magnified virtual compound image of an SLM of a light modulator unit 260 corresponds largely to that shown in FIG. 23. Here, this image is also generated with the help of the light-deflecting device 450, which is situated near the observer eye 1000, in conjunction with the magnifying lens 810. When the observer eye 1000 turns, a wave front which is modulated in the light modulator unit 260 can be deflected with the help of the controllable light-deflecting means 610, which can be disposed in a plane near the light modulator unit 260. The controllable light-deflecting means 610 is disposed in the object-side focal plane of the subsequent magnifying lens 810. It converts the deflection of the wave front into a lateral shift of the viewing window 1200. This shift can be 5 mm, for example, which means that the volume of view is also shifted by this distance. Now, this shift can be compensated by way of accordingly synchronised encoding of the three-dimensional scene, so that the apparent position of static objects within a 3D scene does not change in the observer's perception. It is also possible to introduce a correction angle in the light-deflecting unit 450 synchronously, so that the scene remains visible at the same angle without the need to re-encode it.

The controllable light-deflecting means 610 can, for example, also be provided in the form of a controllable diffractive deflection grating. It may be disposed behind the magnifying lens 810 and offset the optical path there. A rotatable coplanar plate, which can easily be provided as an achromatic component, is well suited for this purpose.

Disposing the controllable light-deflecting means 610 behind an optional beam combiner in the light modulator unit 260, as it is preferably used for two-phase encoding, has the advantage that the optical path length is not affected by such a beam combiner, since the angle of incidence of the beams which illuminate the SLM remains unaffected.

Deflecting the wave front which is modulated by an SLM by changing the angle of incidence of collimated light which illuminates an SLM can also serve the purpose of tracking a viewing window, where the light-deflecting means 410 between the light modulator unit 260 and the magnifying lens 810 can be omitted if a complex-valued SLM—or a phase-shifting SLM—is designed such that the reconstruction quality of the 3D scene remains unaffected even if it is illuminated at an angle. This is possible, for example, if multiple phase-shifting pixels are combined with an iterative computation of the optimum phase values. If the number of implemented tracking steps is small, for example, the phase values for the few shifted positions of the viewing window can be computed ex ante. A beam combiner can optionally also comprise controllable phase lagging means which serve to compensate changes in the phase shift caused by oblique passage of the rays of light. Such controllable phase lagging means can, for example, comprise controllable birefringent liquid crystal layers.

Generally, however, it is more preferable to twist the wave field that is emitted by the SLM only after it has left the SLM, i.e. to dispose the SLM very closely behind a beam combiner of the light modulator unit 260, for example. The light modulator unit 260 can, however, also be imaged to the controllable light-deflecting means 610.

Referring to FIG. 30, the optical path can be very short, so that it is preferably applicable in an HMD device, for example. In a stationary device, it lends itself to provide a viewing window filtering aperture plane or to image the SLM onto the light-deflecting means 610.

Since the entrance pupil of the observer eye 1000 moves relatively slowly, the light-deflecting means 610 can comprise a deflection element which is only slightly faster than the movement of the entrance pupil of the observer eye 1000. This makes it possible to use, for example, a refractive light-deflecting means 610 which works like an image stabilisation prism.

In the context of tracking the viewing window to the entrance pupil of the observer eye 1000, the position of the entrance pupil can be detected, for example, with a beam splitter and an optical imaging system which images the entrance pupil onto a CMOS camera detector, for example, whereupon the movement or position of the observer eye 1000, or more precisely of its entrance pupil, is detected using suitable image processing algorithms.

Figure 31:
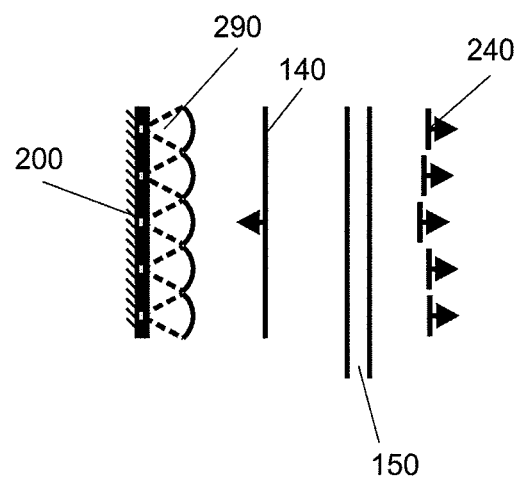
FIG. 31 illustrates how edge effects of the modulator cells are minimised and how the fill factor of the SLM is increased with the help of a micro-lens array with the example of a reflective SLM.

A strong light source is required for the reconstruction of a holographically encoded 3D scene by way of sequential composition of a magnified virtual image of an SLM in order to achieve sufficient brightness of the reconstructed scene, since the light emitted by the light source is distributed over all image segments. Great importance must therefore be attached to a high luminous efficacy of all optical components involved. FIG. 31 shows schematically an embodiment that illustrates how the fill factor of an SLM 200 can be increased and how its energy efficiency is thereby improved with the help of a micro-lens array 290. At the same time, edge effects are minimised, unless they have already been suppressed by a black matrix. Such edge effects occur, for example, due to stray fields at the margins of the active area of the modulator cells or in regions between these areas. The stray fields bias the desired phase and/or intensity values.

The reflective SLM 200 is illuminated with a plane wave front 140 by the flat frontlight unit 150. The individual lenses of the micro-lens array 290 concentrate the light to the reflective modulator cells of the SLM 200, and the transitional regions between the modulator cells receive as little light as possible so that they cannot generate any disturbing stray light. The light which is modulated by the individual modulator cells is expanded by the lenses of the micro-lens array 290 and passes through the flat frontlight unit 150 as a modulated wave front 240.

The individual lenses of the micro-lens array 290 are each assigned to a modulator cell of the SLM 200. The grid of the micro-lens array 290 can match the grid of modulator cells of the SLM 200. Both components can be adjusted in relation to each other such that the foci of the individual micro-lenses lie in the centre of the corresponding modulator cells. This arrangement serves to minimise or even fully prevent the edges of the SLM pixels to be illuminated. The transitional region between two neighbouring pixels is not precisely defined with respect to the phase, i.e. it represents a transitional region of two adjacent phase values. These regions, which spoil the reconstruction, are not illuminated.

In addition, an amplitude apodisation function can be implemented with the help of the intensity distribution in the foci of the micro-lenses. Moreover, an additional amplitude mask can, for example, be used for optimisation, so that a cosine-shaped or Gaussian amplitude distribution is effectively realised in individual SLM pixels. Such filtering functions, which also include, for example, a Kaiser-Bessel window, reduce the intensity of higher diffraction orders of the SLM.

The micro-lens array 290 can additionally be fitted with an apodisation mask in order to suppress higher diffraction orders which are caused by the grid of modulator cells as far as possible. An apodisation can, however, also be achieved in that the foci of the micro-lenses doe not lie precisely in the plane of the modulator cells, but are rather slightly maladjusted in relation to it. A slight defocus can serve to adapt the above-mentioned effects of the corresponding micro-lens to the size of the active area. Moreover, the lens shape can be optimised with view to its optical transfer function. It can even be plane and show a gradient index profile.

When using a transmissive light modulator, an micro-lens array can also be disposed in the optical path between a backlight and the modulator cells so to focus the non-modulated light which is emitted by the backlight on the active area of the modulator cells.

An apodisation mask can also be applied without using micro-lenses. Micro-lenses can, however, serve to increase the effective transmittance.

Figure 32:
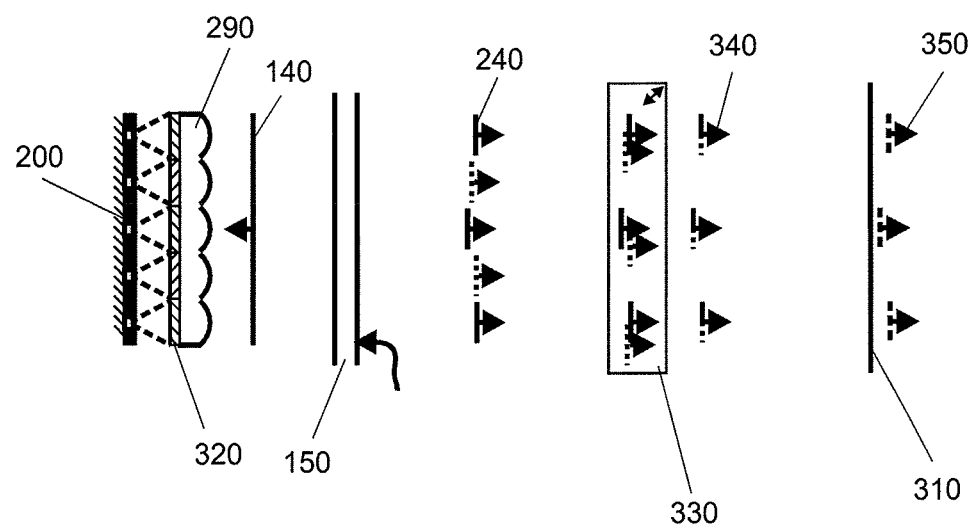
FIG. 32 illustrates how edge effects of the modulator cells are minimised and how the fill factor of the SLM is increased with the help of a micro-lens array with the example of a reflective SLM in conjunction with a beam combiner.

FIG. 32 illustrates the use of the micro-lens array 290 in conjunction with a beam combiner which comprises a structured retardation plate 320, a retardation plate 330 and a polariser 310.

If laser light is used, the waist of the pencils of rays is situated in the focal plane of the micro-lenses of the micro-lens array 290. The phase of the light is plane on this waistline. A complex-valued modulation is achieved by way of combining the light of two adjacent modulator cells in the beam combiner. The structured retardation plate 320 is arranged, for example, on the substrate of the micro-lens array 290 and serves to give the modulator columns alternately orthogonal polarisations.

For this purpose, the frontlight unit 150 illuminates the micro-lens array with a non-modulated wave front 140. The light which is emitted by a light source (not shown) propagates through the frontlight unit 150, which can also be of thick design, for example on a zig-zag course, for example at angles of 45°. It is further possible, for example, to use a volume grating which is illuminated at a very flat angle, for example at 84.26°, as the frontlight unit, thereby realising an exit angle of near 0°, for example. If the volume grating is sufficiently thick, a slightly oblique illumination of the SLM can be combined with a low angular acceptance to isolate the optical path towards the SLM from that back from the SLM in reflective SLM arrangements.

The non-modulated wave front 140 passes through the structured retardation plate 320 a first time, is then modulated by the reflective modulator cells, passes through the structured retardation plate 320 a second time and eventually leaves the frontlight unit 150 as a modulated wave front 240 with alternately orthogonal polarised columns. These alternately orthogonally polarised columns are paired in the unstructured retardation plate 320. The retardation plate 320 is followed by the polarisation filter 310 which lets the projections of the orthogonal polarisations pass under an angle of 45°. Behind the polarisation filter 310, there is the modulated complex-valued wave front 350 which carries the information of the holographically encoded three-dimensional scene.

Generally, the composition of the image plane can also be realised without active elements. It is possible, for example, to use five LCoS-type SLMs which are then tiled vertically in the virtual image plane. They can be written with RGB contents sequentially. Alternatively, three units each of which comprising five LCoS-type SLMs can serve as RGB-LCoS units for simultaneous colour representation. This means that there are 15 LCoS panels altogether to represent a large image plane in colour.

This multiplexing approach can also be applied to sub-colours. For example, two SLMs can be illuminated with different blue wavelengths which only differ by 5 nm, for example.

This can also be considered as a kind of thinning out the 3D object scene if the volume of views of the involved SLMs, which are imaged sequentially, coincide at least partly. One SLM then only represents some of the object points of the 3D scene, while another SLM or other SLMs represent the other object points in the common volume of view in order to reduce speckle and interference between neighbouring pixels. Thinning out thus serves to reduce coherent cross-talking between adjacent pixels.

This kind of thinning out does not necessarily require wavelength staggering in each embodiment. SLMs can, for example, be illuminated with light of the same wavelength which originates in different lasers or, more generally, in different light sources. For example, it is possible to use volume gratings in order to join the individual light modulator images through angle-division or polarisation-division multiplexing or, as in the example of thinning-out, to compose the total volume of view of partly coinciding individual volume of views. Polarisation-division multiplexing can resort to a number of classic optical components including, for example, polarisation beam splitter cubes, polarisation beam splitter plates, wire grid polarisers and volume gratings which have defined diffraction angles.

Another embodiment of a compact setup of an HMD can comprise a combination of a magnifying system and a field lens, where the spatial light modulator is only slightly magnified so that the image of the spatial light modulator can be represented virtually very close to the observer. A tracking device will not be necessary. Virtually imaging the complex-valued SLM with little magnification and at little distance to the eye is a preferred embodiment for 2D-encoded sub-holograms.

The light-deflecting device can, in a further embodiment which continues the previous teaching, comprise a light-deflecting element which comprises, for example, a defined number of refractive layers which serve to join multiple instances of a modulated wave front which is emitted by the spatial light modulator side by side in segments. The compound image then hits—directly or after another imaging stage—a shutter array whose pixels are controllable with respect to their transmittance. The light which is emitted by the SLM and which carries the correct code for the currently imaged segment is conveyed through the particular segments of the multiple compound image for the solid angle regions to be represented in a defined order towards the eye pupil with the help of accordingly addressed shutter segments.

The light-deflecting device can be combined with a lens with field lens function to get a beam combiner.

The holographic display according to this invention can not only be applied in an HMD device, but also in other display devices for 3D representation.

The embodiments of a holographic display described above can be provided twice in an HMD device to serve both eyes of the observer.

In particular where the virtual SLM is greatly magnified, the tracking device can be designed involving, for example, controllable liquid crystal gratings, controllable prism cells based on the electrowetting (EW) principle, controllable liquid crystal prism cells, controllable large prism cells, or, in a more spacious design, scanning mirrors.

The additional colour filters for generating the colour reconstruction reduce the refresh rate to ⅓ in a spatial light modulator, which can, for example, be an LCoS modulator, but increase the number of modulator cells needed on the SLM by a factor of 3. It can thus make sense to use a separate SLM for each of the primary colours, RGB, i.e. a red SLM, a green SLM and a blue SLM. These three separate SLMs can then be combined, for example, with a refractive colour combiner cube (X cube).

Where holographic optical elements (HOE) are used for the LCoS and RGB LCoS modulators, they should be used in combination for the two LCoS options, so that an HMD device can be of a lightweight and compact design. Further, reflective and catadioptric components can be used in HMD devices to ensure compact design.

It is further possible to use two SLMs, i.e., for example, two LCoS-type SLMs or two MEMS lifted mirror-type SLMs, for sequentially representing more than two colours. The temporal sequence can, for example, be as follows: R_SLM1, G_SLM2, B_SLM1, R_SLM2, G_SLM1, B_SLM2, R_SLM1, and so on. This can be a compromise of available refresh rate and structural depth. Sequential illumination shall then be organised such that each SLM can be illuminated with each colour.

The light-deflecting device can comprise one active and one or two passive controllable layers for segmenting the SLM.

The wave front which is modulated by the SLM can, for example, be deflected one-dimensionally by a liquid crystal grating into the plane of the field lens in the sequence 1, 2, 3, 4 and 5, where index 3, for example, does not cause any deflection, i.e. no phase grating is inscribed in the liquid crystal grating for index 3. Another volume grating, which follows at a defined distance, can then deflect wave fronts with angles of incidence which correspond with indices 1 to 5 in the plane of the field lens towards the observer eye. In addition to mere deflection of a modulated wave front which scans the SLM, the volume grating can at the same time fulfil the function of the field lens. This allows the number of components required in an HMD device to be reduced. In this example, the light-deflecting device only comprises one switchable light-deflecting element. The function of controllable or switchable light deflection can not only be fulfilled by a controllable liquid crystal grating with variable grating period but also by PDLC gratings or other switchable components.

The SLM can also be illuminated by a wave front which already carries a field lens function. These wave fields can have a concave or convex curvature. They can illuminate the SLM such that the zeroth diffraction order of the elements which generate the wave front, or of the light which is diffracted by the modulator cell structure of the SLM, does not contribute to generating the image, so to prevent disturbing stray light.

Diffusing elements with switchable or controllable diffusion characteristic can be provided though to be able to switch from 3D to 2D representation. For this purpose, the SLM or segments of the SLM and/or a virtual image of the multiple compound image of the SLM on the one hand and the diffusing element on the other should lie (almost) in one plane.

In a static representation of the SLM with a shutter array in the light-deflecting device, the SLM can, for example, be represented five times as a segment in the plane of the field lens. At any one time, the desired region on the shutter array is switched to transmissive while the information for the holographic reconstruction that corresponds with that region is written to the SLM. A shutter array is a display panel which only comprises one large switchable region or a small number of individually switchable sub-regions. It can, however, also be a high-resolution display panel where the modulator cells are addressed such that certain desired regions are switched to transmissive or not.

The multiplied SLMs can fill the entire frustum or parts of it, and the frustum can include representations of 3D or 2D/3D scenes side by side or at least partly overlapping.

The principle of multiple imaging can, for example, be modified in an arrangement with at least two SLMs in that each SLM only represents, for example, 50 percent of an object point cluster of a reconstructed three-dimensional scene. Using multiple narrow-band wavelength ranges for each of the primary colours, e.g. R1G1B1 and R2G2B2, or two orthogonal polarisations, or a combination of the two, is possible here too.

The thinned-out object point clusters are then represented in an interleaved manner. For example, wavelength-, polarisation- and/or angle-specific optical components, such as volume holograms, can be comprised for combining the beam paths of the used SLMs.

Further, it is also possible that at least two SLMs are disposed such that, given a one-dimensional encoding, the encoding directions are set at an angle, for example at a right angle. This can reduce the perceived expansion of the object points seen by the observer. The superimposition can be incoherent, partially coherent or coherent, i.e. capable of generating interference.

This setup can simultaneously reduce optical cross-talking among points of a scene and minimise speckle patterns in the reconstruction.

In the case of one-dimensional encoding, the 1D diffusion required for generating the viewing window can be of an active or passive type. Active diffusion elements, such as liquid crystal gratings, i.e. for example polarisation gratings which can generate variable grating periods and a superposition of different grating periods, are preferred, because they allow speckle to be reduced sufficiently in the direction of the viewing window even if highly coherent light sources are used.

The electrodes of liquid crystal polarisation gratings with liquid crystals which rotate in the plane of the grating, and which thus correspond with turned birefringent segments, can, for example, be supplied with sufficiently fast and statistically fluctuating voltages so to realise a diffusing function. The emission characteristic of the diffusing function can be adapted or optimised through the existing spatial frequencies of the synthetic phase grating.

Active diffusing elements can also be used in the plane of the light source in order to adapt the spatial coherence.

It is also possible to use switchable or controllable liquid crystal diffusers which are, for example, disposed one after another. It is further possible to use liquid crystal diffusers which realise a fast temporal fluctuation of the phase in just one liquid crystal layer.

Disposing rotating or, more generally, moving diffusing plates in the plane of the light source lends itself in stationary display devices.

However, it is also possible to move very thin 1D or 2D diffuser foils with electrically controlled actuators, for example piezo-ceramic (PZT) actuators or solenoid drives, at sufficiently high speed and sufficiently low vibration so that they can be used in HMD devices.

Flat backlight, frontlight and edge illumination devices can be implemented into the HMD device.

Further, the display device is provided to have control means with which all switchable or controllable components are controlled and, where necessary, synchronised.

Further, individual components can be combined to form separate modules so to reduce the weight of an HMD device. For example, it is possible that an electronic unit, light source unit and/or battery box are attached separately to the observer.

The embodiments of the display described above are applicable in further holographic and/or autostereoscopic display devices which are not explicitly mentioned herein.

Finally, it must be said that the embodiments described above shall solely be understood to illustrate the claimed teaching, but that the claimed teaching is not limited to these embodiments. In particular, the embodiments described above can be combined with each other as far as possible.

The invention claimed is:

1. A display device, in particular a head-mounted display or hocular, comprising a spatial light modulator, a light-deflecting device and at least one optical imaging system, where the spatial light modulator is illuminated with wave fronts which are coherent at least in one direction, where the light-deflecting device comprising at least one controllable liquid crystal grating with a variable grating period is designed such that a multiple image of the spatial light modulator is generated, said multiple image being composed of segments which are sequentially joined at least in one dimension in a controllable manner, where the multiple image includes at least a defined number of segments and defines the size of a volume of view in which the 3D scene which is holographically encoded on the spatial light modulator is reconstructed to be viewed by an observer eye.

2. The display device according to claim 1, where the controllable light-deflecting device is designed such that the segmented multiple compound image of the spatial light modulator is generated in the plane of a field lens.

3. The display device according to claim 1, where the light-deflecting device is designed such that the segments of the multiple virtual image of the spatial light modulator are joined substantially without gaps or that they partly overlap, where the overlapping areas can be allowed for when generating the holographic information.

4. The display device according to claim 1, where additional imaging means are provided in the optical path with which the multiple image of the spatial light modulator, which is composed of segments by the controllable light-deflecting device, is imaged in a further magnified manner.

5. The display device according to claim 1, where the light-deflecting device is designed such that the number or the size of segments for the composition of the multiple image of the spatial light modulator or the number and the size of segments for the composition of the multiple image of the spatial light modulator is variable.

6. The display device according to claim 1, where the controllable light-deflecting device comprises at least one controllable light-deflecting means which includes a controllable liquid crystal grating with variable grating period.

7. The display device according to claim 1, where the controllable light-deflecting device comprises at least one volume hologram which has at least two different diffraction angles which can be selected by at least two different angles of incidence or two different wavelengths of the light which illuminates the spatial light modulator or which can be selected by at least two different angles of incidence and two different wavelengths of the light which illuminates the spatial light modulator.

8. The display device according to claim 1, where at least one filter is disposed in the optical path for filtering higher diffraction orders of the wave fronts modulated by the spatial light modulator.

9. The display device according to claim 8, where the filter is disposed in the central focal plane of a telescopic optical imaging system.

10. The display device according to claim 1, where a controllable tracking device is provided which serves to track a viewing window to the eye movement controlled by that movement.

11. The display device according to claim 1, where the light-deflecting device is designed such that, in addition to generating a segmented multiple compound image of the spatial light modulator, a virtual viewing window is tracked to the eye movement controlled by that movement or that the controllable tracking device is supported.

12. The display device according to claim 1, where adjustment means are provided for adjusting the viewing window manually or automatically to the position of an eye pupil of an observer eye, and so to provide for the individual eye separation, for example.

13. The display device according to claim 1, where the light-deflecting device or the tracking device or the light-deflecting device and the tracking device are designed such that it adjusts the viewing window in a controllable manner to the position of the eye pupil or that it supports other adjustment means which serve that purpose.

14. The display device according to claim 1, where at least one of the following: the light-deflecting device and further optical components of the optical imaging system for generating and imaging the segments of the multiple compound image of the spatial light modulator, is designed such that this multiple image which is composed of segments is generated or imaged in a curved manner, and that this curvature is allowed for when encoding the three-dimensional scene.

15. The display device according to claim 1, where the optical imaging system or the light-deflecting device or the optical imaging system and the light-deflecting device are designed such that the segmented multiple compound image of the spatial light modulator is imaged anamorphically.

16. The display device according to claim 1, where at least one telecentric imaging system is provided in whose object-side focal plane a light-deflecting device is disposed which tilts the light which is emitted by the spatial light modulator in a controlled manner.

17. The display device according to claim 1, where at least one further light deflecting device is provided which generates a further segmented multiple compound image of a further spatial light modulator and where these segmented multiple compound images are interleaved or twisted or interleaved and twisted in relation to each other or offset against each other or staggered in depth and where they define a common volume of view together with the eye pupil of an observer eye and where their sub-regions can abut or wholly or partly overlap, where the superimposition is coherent, partly coherent or incoherent, and where at least one of the following is provided in each sub-region: a 2D representation and a 3D stereo representation and/or a holographic 3D reconstruction.

18. The display device according to claim 1, where a controllable liquid crystal grating with variable grating period or a multiplex volume grating or a controllable liquid crystal grating with variable grating period and a multiplex volume grating is disposed in the controllable light-deflecting device such that light of the zeroth diffraction order passes through it unused and is isolated from the further active optical path.

19. The display device according to claim 1, where the spatial light modulator is provided in the form of a linear spatial light modulator which is scanned by a light-deflecting means across its linear extent and whose scanning image is repeated multiple times one above the other in the direction of its linear extent sequentially by the controllable light-deflecting device.

20. The display device according to claim 19, where a polygon mirror is provided with at least two mirror surfaces being twisted against each other such that their respective scanning stripes lie one above the other perpendicular to the scanning direction or are slightly overlapped.

21. The display device according to claim 1, where at least one micro-lens array is provided in front of or behind or in front of and behind a spatial light modulator.

22. The display device according to claim 1, where at least one micro-lens array is provided at the position of an intermediate image or at the position of a segmented intermediate image of the spatial light modulator or at the position of an intermediate image and at the position of a segmented intermediate image of the spatial light modulator.

23. The display device according to claim 1, where an apodisation mask is provided on the side of the spatial light modulator that faces the observer eye or an apodisation mask is provided at the position of an intermediate image or at the position of a segmented intermediate image of the spatial light modulator.

24. The display device according to claim 1, where the controllable light-deflecting device includes a volume grating or a multiplex volume grating whose envelope of the refractive index modulation was set specifically by choosing a suitable coherence of the wave fields which were used for exposure during manufacture.

25. The display device according to claim 1, where the light-deflecting device is designed such that an at least one-dimensionally segmented multiple image of the spatial light modulator is generated sequentially in a controlled manner in a flat waveguide.

* * * * *